US012656651B2

(12) United States Patent
Brown et al.

(10) Patent No.: US 12,656,651 B2
(45) Date of Patent: Jun. 16, 2026

(54) CONTROL METHOD FOR TINTABLE WINDOWS

(71) Applicant: View, Inc., Milpitas, CA (US)

(72) Inventors: Stephen Clark Brown, San Mateo, CA (US); Jason Zedlitz, Rancho Cordova, CA (US)

(73) Assignee: View Operating Corporation, San Jose, CA (US)

(*) Notice: Subject to any disclaimer, the term of this patent is extended or adjusted under 35 U.S.C. 154(b) by 840 days.

(21) Appl. No.: 17/573,509

(22) Filed: Jan. 11, 2022

(65) Prior Publication Data

US 2022/0214592 A1     Jul. 7, 2022

Related U.S. Application Data

(63) Continuation-in-part of application No. 17/008,342, filed on Aug. 31, 2020, now Pat. No. 11,899,331, which is a continuation of application No. 16/013,770, filed on Jun. 20, 2018, now Pat. No. 10,802,372, which is a continuation of application No. 15/347,677, filed on Nov. 9, 2016, now Pat. No. 10,048,561, which is a continuation-in-part of application No. PCT/US2015/029675, filed on May 7, 2015, said application No. 15/347,677 is a continuation-in-part of application No. 13/772,969, (Continued)

(51) Int. Cl.
| | |
|---|---|
| *G02F 1/163* | (2006.01) |
| *G02B 5/20* | (2006.01) |
| *G05B 19/048* | (2006.01) |
| *E06B 9/24* | (2006.01) |

(52) U.S. Cl.
CPC ........... *G02F 1/163* (2013.01); *G05B 19/048* (2013.01); *E06B 2009/2464* (2013.01); *G02B 5/20* (2013.01)

(58) Field of Classification Search
CPC ................... G02F 1/163; G05B 19/048; E06B 2009/2464; G02B 5/20
USPC ........................................................ 359/265
See application file for complete search history.

(56) References Cited

U.S. PATENT DOCUMENTS

| | | | |
|---|---|---|---|
| 4,355,896 A | 10/1982 | Frosch | |
| 5,124,833 A | 6/1992 | Barton et al. | |

(Continued)

FOREIGN PATENT DOCUMENTS

| | | |
|---|---|---|
| CN | 1333807 A | 1/2002 |
| CN | 1359479 A | 7/2002 |

(Continued)

OTHER PUBLICATIONS

CN Office Action dated Apr. 21, 2022 in Application No. CN201811232377.4.

(Continued)

*Primary Examiner* — William Choi

(74) *Attorney, Agent, or Firm* — Cha & Reiter, LLC.

(57) ABSTRACT

Methods of controlling tint of a tintable window to account for occupant comfort in a room of a building. Some methods include receiving weather feed data from one or more weather services (or other data sources) over a communication network, determining a weather condition based on the weather feed data, and determining a tint level for the tintable window based on the weather condition and based on whether a current time is within a time delay period at sunrise or sunset.

25 Claims, 24 Drawing Sheets

Related U.S. Application Data filed on Feb. 21, 2013, now Pat. No. 9,638,978, application No. 17/573,509 is a continuation-in-part of application No. 16/527,554, filed on Jul. 31, 2019, now Pat. No. 11,445,025, which is a continuation of application No. 16/438,177, filed on Jun. 11, 2019, now Pat. No. 11,405,465, which is a continuation of application No. 14/391,122, filed as application No. PCT/US2013/036456 on Apr. 12, 2013, now Pat. No. 10,365,531, application No. 17/573,509 is a continuation-in-part of application No. 15/742,015, filed as application No. PCT/US2016/041344 on Jul. 7, 2016, now Pat. No. 11,261,654, which is a continuation-in-part of application No. PCT/US2015/029675, filed on May 7, 2015.

(60) Provisional application No. 61/991,375, filed on May 9, 2014, provisional application No. 61/624,175, filed on Apr. 13, 2012, provisional application No. 62/189,673, filed on Jul. 7, 2015.

(56) References Cited

U.S. PATENT DOCUMENTS

| | | |
|---|---|---|
| 5,170,108 A | 12/1992 | Peterson et al. |
| 5,204,778 A | 4/1993 | Bechtel |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,384,578 A | 1/1995 | Lynam et al. |
| 5,402,144 A | 3/1995 | Ripoche |
| 5,451,822 A | 9/1995 | Bechtel et al. |
| 5,598,000 A | 1/1997 | Popat |
| 5,621,526 A | 4/1997 | Kuze |
| 5,663,621 A | 9/1997 | Popat |
| 5,673,028 A | 9/1997 | Levy |
| 5,694,144 A | 12/1997 | Lefrou et al. |
| 5,760,558 A | 6/1998 | Popat |
| 5,764,402 A | 6/1998 | Thomas et al. |
| 5,822,107 A | 10/1998 | Lefrou et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen |
| 6,002,511 A | 12/1999 | Varaprasad et al. |
| 6,039,390 A | 3/2000 | Agrawal et al. |
| 6,039,850 A | 3/2000 | Schulz |
| 6,055,089 A | 4/2000 | Schulz et al. |
| 6,064,949 A | 5/2000 | Werner et al. |
| 6,084,231 A | 7/2000 | Popat |
| 6,084,700 A | 7/2000 | Knapp et al. |
| 6,130,448 A | 10/2000 | Bauer et al. |
| 6,130,772 A | 10/2000 | Cava |
| 6,222,177 B1 | 4/2001 | Bechtel et al. |
| 6,262,831 B1 | 7/2001 | Bauer et al. |
| 6,386,713 B1 | 5/2002 | Turnbull et al. |
| 6,398,118 B1 | 6/2002 | Rosen et al. |
| 6,407,468 B1 | 6/2002 | LeVesque et al. |
| 6,407,847 B1 | 6/2002 | Poll et al. |
| 6,449,082 B1 | 9/2002 | Agrawal et al. |
| 6,471,360 B2 | 10/2002 | Rukavina et al. |
| 6,493,128 B1 | 12/2002 | Agrawal et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,819,367 B1 | 11/2004 | Cava |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 6,965,813 B2 | 11/2005 | Granqvist et al. |
| 7,085,609 B2 | 8/2006 | Bechtel et al. |
| 7,111,952 B2 | 9/2006 | Veskovic |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Whitesides et al. |
| 7,417,397 B2 | 8/2008 | Berman et al. |
| 7,542,809 B2 | 6/2009 | Bechtel et al. |
| 7,548,833 B2 | 6/2009 | Ahmed |
| 7,567,183 B2 | 7/2009 | Schwenke |
| 7,588,067 B2 | 9/2009 | Veskovic |
| 7,610,910 B2 | 11/2009 | Ahmed |
| 7,800,812 B2 | 9/2010 | Moskowitz |
| 7,817,326 B1 | 10/2010 | Rennig et al. |
| 7,822,490 B2 | 10/2010 | Bechtel et al. |
| 7,873,490 B2 | 1/2011 | MacDonald |
| 7,941,245 B1 | 5/2011 | Popat |
| 7,950,827 B2 | 5/2011 | Veskovic |
| 7,963,675 B2 | 6/2011 | Veskovic |
| 7,972,021 B2 | 7/2011 | Scherer |
| 7,977,904 B2 | 7/2011 | Berman et al. |
| 7,990,603 B2 | 8/2011 | Ash et al. |
| 8,004,739 B2 | 8/2011 | Letocart |
| 8,018,644 B2 | 9/2011 | Gustavsson et al. |
| 8,102,586 B2 | 1/2012 | Albahri |
| 8,213,074 B1 | 7/2012 | Shrivastava et al. |
| 8,254,013 B2 | 8/2012 | Mehtani et al. |
| 8,270,059 B2 | 9/2012 | Friedman et al. |
| 8,288,981 B2 | 10/2012 | Zaharchuk et al. |
| 8,292,228 B2 | 10/2012 | Mitchell et al. |
| 8,300,298 B2 | 10/2012 | Wang et al. |
| 8,380,393 B1 | 2/2013 | Ohtomo |
| 8,432,603 B2 | 4/2013 | Wang et al. |
| 8,456,729 B2 | 6/2013 | Brown et al. |
| 8,547,624 B2 | 10/2013 | Ash et al. |
| 8,582,193 B2 | 11/2013 | Wang et al. |
| 8,705,162 B2 | 4/2014 | Brown et al. |
| 8,723,467 B2 | 5/2014 | Berman et al. |
| 8,764,950 B2 | 7/2014 | Wang et al. |
| 8,764,951 B2 | 7/2014 | Wang et al. |
| 8,836,263 B2 | 9/2014 | Berman et al. |
| 8,864,321 B2 | 10/2014 | Mehtani et al. |
| 8,890,456 B2 | 11/2014 | Berman et al. |
| 8,902,486 B1 | 12/2014 | Chandrasekhar |
| 8,934,170 B2 | 1/2015 | Takeda et al. |
| 8,976,440 B2 | 3/2015 | Berland et al. |
| 9,016,630 B2 | 4/2015 | Mitchell et al. |
| 9,030,725 B2 | 5/2015 | Pradhan et al. |
| 9,078,299 B2 | 7/2015 | Ashdown |
| 9,081,246 B2 | 7/2015 | Rozbicki |
| 9,081,247 B1 | 7/2015 | Pradhan et al. |
| 9,128,346 B2 | 9/2015 | Shrivastava et al. |
| 9,226,366 B2 | 12/2015 | Orillard et al. |
| 9,261,751 B2 | 2/2016 | Pradhan et al. |
| 9,298,203 B2 | 3/2016 | Wenzel |
| 9,341,912 B2 | 5/2016 | Shrivastava et al. |
| 9,348,192 B2 | 5/2016 | Brown et al. |
| 9,404,793 B2 | 8/2016 | Yang et al. |
| 9,406,028 B2 | 8/2016 | Humann |
| 9,423,664 B2 | 8/2016 | Brown et al. |
| 9,454,055 B2 | 9/2016 | Brown et al. |
| 9,523,902 B2 | 12/2016 | Parker |
| 9,546,515 B2 | 1/2017 | Hall et al. |
| 9,574,934 B2 | 2/2017 | Verbeek et al. |
| 9,638,978 B2 | 5/2017 | Brown et al. |
| 9,645,465 B2 | 5/2017 | Brown et al. |
| 9,664,974 B2 | 5/2017 | Kozlowski et al. |
| 9,668,315 B2 | 5/2017 | Shearer et al. |
| 9,674,924 B2 | 6/2017 | Lashina et al. |
| 9,709,869 B2 | 7/2017 | Baumann et al. |
| 9,807,857 B2 | 10/2017 | Huang |
| 9,927,674 B2 | 3/2018 | Brown et al. |
| 9,938,765 B2 | 4/2018 | Berman et al. |
| 10,048,561 B2 | 8/2018 | Brown |
| 10,234,596 B2 | 3/2019 | Frank et al. |
| 10,254,618 B2 | 4/2019 | Parker |
| 10,316,581 B1 | 6/2019 | Nagel et al. |
| 10,495,939 B2 | 12/2019 | Brown et al. |

(56) References Cited

U.S. PATENT DOCUMENTS

| | | | |
|---|---|---|---|
| 10,520,784 B2 | 12/2019 | Brown et al. |
| 10,539,854 B2 | 1/2020 | Brown et al. |
| 10,605,970 B2 | 3/2020 | Blair et al. |
| 10,690,540 B2 | 6/2020 | Brown et al. |
| 10,712,627 B2 | 7/2020 | Brown et al. |
| 10,802,372 B2 | 10/2020 | Brown |
| 10,908,470 B2 | 2/2021 | Brown et al. |
| 10,921,675 B2 | 2/2021 | Barnum et al. |
| 10,982,487 B2 | 4/2021 | Ramirez |
| 11,126,057 B2 | 9/2021 | Brown et al. |
| 11,255,722 B2 | 2/2022 | Zedlitz et al. |
| 11,261,654 B2 | 3/2022 | Brown et al. |
| 11,899,331 B2 | 2/2024 | Brown |
| 11,940,705 B2 | 3/2024 | Brown et al. |
| 11,950,340 B2 | 4/2024 | Rozbicki et al. |
| 11,960,190 B2 | 4/2024 | Zedlitz et al. |
| 11,966,142 B2 | 4/2024 | Khanna et al. |
| 2002/0075472 A1 | 6/2002 | Holton |
| 2002/0135881 A1 | 9/2002 | Rukavina et al. |
| 2002/0144831 A1 | 10/2002 | Kalt |
| 2002/0152298 A1 | 10/2002 | Kikta et al. |
| 2003/0142140 A1 | 7/2003 | Brown et al. |
| 2003/0191546 A1 | 10/2003 | Bechtel et al. |
| 2003/0210355 A1 | 11/2003 | Dao |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0108191 A1 | 6/2004 | Su et al. |
| 2004/0135989 A1 | 7/2004 | Klebe |
| 2004/0160322 A1 | 8/2004 | Stilp |
| 2005/0046920 A1 | 3/2005 | Freeman et al. |
| 2005/0063036 A1 | 3/2005 | Bechtel et al. |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0207730 A1 | 9/2006 | Berman et al. |
| 2006/0209007 A1 | 9/2006 | Pyo et al. |
| 2006/0245024 A1 | 11/2006 | Greer |
| 2007/0002007 A1 | 1/2007 | Tam |
| 2007/0055757 A1 | 3/2007 | Mairs et al. |
| 2007/0067048 A1 | 3/2007 | Bechtel et al. |
| 2007/0162233 A1 | 7/2007 | Schwenke |
| 2007/0285759 A1 | 12/2007 | Ash et al. |
| 2008/0018979 A1 | 1/2008 | Mahe et al. |
| 2008/0043316 A2 | 2/2008 | Moskowitz |
| 2009/0020233 A1 | 1/2009 | Berman et al. |
| 2009/0027759 A1 | 1/2009 | Albahri |
| 2009/0066157 A1 | 3/2009 | Tarng et al. |
| 2009/0139669 A1 | 6/2009 | Robin |
| 2009/0143141 A1 | 6/2009 | Wells et al. |
| 2009/0187287 A1 | 7/2009 | Bruhnke et al. |
| 2009/0204269 A1 | 8/2009 | Bechtel et al. |
| 2009/0231092 A1 | 9/2009 | Maegawa et al. |
| 2009/0243732 A1 | 10/2009 | Tarng et al. |
| 2009/0243802 A1 | 10/2009 | Wolf et al. |
| 2009/0296188 A1 | 12/2009 | Jain et al. |
| 2009/0323160 A1 | 12/2009 | Egerton et al. |
| 2010/0039410 A1 | 2/2010 | Becker et al. |
| 2010/0066484 A1 | 3/2010 | Hanwright et al. |
| 2010/0071856 A1 | 3/2010 | Zaharchuk et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0245973 A1 | 9/2010 | Wang et al. |
| 2010/0294330 A1 | 11/2010 | Huang et al. |
| 2010/0296081 A1 | 11/2010 | Granqvist |
| 2010/0315693 A1 | 12/2010 | Lam et al. |
| 2011/0035061 A1 | 2/2011 | Altonen et al. |
| 2011/0046810 A1 | 2/2011 | Bechtel et al. |
| 2011/0063708 A1 | 3/2011 | Letocart |
| 2011/0066302 A1 | 3/2011 | McEwan |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0266137 A1 | 11/2011 | Wang et al. |
| 2011/0266138 A1 | 11/2011 | Wang et al. |
| 2011/0266419 A1 | 11/2011 | Jones et al. |
| 2011/0267674 A1 | 11/2011 | Wang et al. |
| 2011/0267675 A1 | 11/2011 | Wang et al. |
| 2011/0292488 A1 | 12/2011 | McCarthy et al. |
| 2011/0304898 A1 | 12/2011 | Letocart |
| 2011/0304899 A1 | 12/2011 | Kwak et al. |
| 2012/0007507 A1 | 1/2012 | Niemann et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0091315 A1 | 4/2012 | Moskowitz |
| 2012/0095601 A1 | 4/2012 | Abraham et al. |
| 2012/0133315 A1 | 5/2012 | Berman et al. |
| 2012/0147449 A1 | 6/2012 | Bhatnagar et al. |
| 2012/0188627 A1 | 7/2012 | Chen et al. |
| 2012/0190386 A1 | 7/2012 | Anderson |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0261078 A1 | 10/2012 | Adams et al. |
| 2012/0268803 A1 | 10/2012 | Greer et al. |
| 2012/0275008 A1 | 11/2012 | Pradhan et al. |
| 2012/0293855 A1 | 11/2012 | Shrivastava et al. |
| 2013/0021659 A1 | 1/2013 | Friedman et al. |
| 2013/0057157 A1 | 3/2013 | Nackaerts et al. |
| 2013/0057937 A1 | 3/2013 | Berman et al. |
| 2013/0158790 A1 | 6/2013 | McIntyre, Jr. et al. |
| 2013/0173926 A1 | 7/2013 | Morese et al. |
| 2013/0242370 A1 | 9/2013 | Wang |
| 2013/0263510 A1 | 10/2013 | Gassion |
| 2013/0264948 A1 | 10/2013 | Orillard et al. |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0321923 A1 | 12/2013 | Thuot et al. |
| 2014/0043667 A1 | 2/2014 | Bergh et al. |
| 2014/0067733 A1 | 3/2014 | Humann |
| 2014/0104667 A1 | 4/2014 | Greer et al. |
| 2014/0160550 A1 | 6/2014 | Brown et al. |
| 2014/0177028 A1 | 6/2014 | Shrivastava et al. |
| 2014/0236323 A1 | 8/2014 | Brown et al. |
| 2014/0259931 A1 | 9/2014 | Plummer |
| 2014/0262057 A1 | 9/2014 | Chambers et al. |
| 2014/0268287 A1 | 9/2014 | Brown et al. |
| 2014/0300945 A1 | 10/2014 | Parker |
| 2014/0303788 A1 | 10/2014 | Sanders et al. |
| 2014/0330538 A1 | 11/2014 | Conklin et al. |
| 2014/0371931 A1 | 12/2014 | Lin et al. |
| 2015/0002919 A1 | 1/2015 | Jack et al. |
| 2015/0035440 A1 | 2/2015 | Spero |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0092259 A1 | 4/2015 | Greer et al. |
| 2015/0116811 A1 | 4/2015 | Shrivastava et al. |
| 2015/0122474 A1 | 5/2015 | Petersen |
| 2015/0185581 A1 | 7/2015 | Pradhan et al. |
| 2015/0219975 A1 | 8/2015 | Phillips et al. |
| 2015/0293422 A1 | 10/2015 | Pradhan et al. |
| 2015/0338713 A1 | 11/2015 | Brown |
| 2015/0368967 A1 | 12/2015 | Lundy et al. |

(56) References Cited

U.S. PATENT DOCUMENTS

| | | |
|---|---|---|
| 2016/0040478 A1 | 2/2016 | Lundy et al. |
| 2016/0054633 A1 | 2/2016 | Brown et al. |
| 2016/0054634 A1 | 2/2016 | Brown et al. |
| 2016/0124283 A1 | 5/2016 | Brown et al. |
| 2016/0154290 A1 | 6/2016 | Brown et al. |
| 2016/0202589 A1 | 7/2016 | Nagel et al. |
| 2016/0203403 A1 | 7/2016 | Nagel et al. |
| 2017/0053068 A1 | 2/2017 | Pillai et al. |
| 2017/0075183 A1 | 3/2017 | Brown |
| 2017/0097259 A1 | 4/2017 | Brown et al. |
| 2017/0122802 A1 | 5/2017 | Brown et al. |
| 2017/0123286 A1 | 5/2017 | Parker |
| 2017/0130523 A1 | 5/2017 | Shrivastava et al. |
| 2017/0168368 A1 | 6/2017 | Brown et al. |
| 2017/0219907 A1 | 8/2017 | Brown et al. |
| 2017/0276542 A1 | 9/2017 | Klawuhn et al. |
| 2017/0279876 A1 | 9/2017 | Prasad et al. |
| 2017/0365908 A1 | 12/2017 | Hughes et al. |
| 2018/0073712 A1 | 3/2018 | Baaijens et al. |
| 2018/0129172 A1 | 5/2018 | Shrivastava et al. |
| 2018/0157141 A1 | 6/2018 | Brown et al. |
| 2018/0231860 A1 | 8/2018 | Podbelski et al. |
| 2018/0284555 A1 | 10/2018 | Klawuhn et al. |
| 2018/0307114 A1 | 10/2018 | Brown et al. |
| 2018/0373111 A1 | 12/2018 | Brown |
| 2019/0025661 A9 | 1/2019 | Brown et al. |
| 2019/0171081 A1 | 6/2019 | Zedlitz et al. |
| 2019/0230776 A1 | 7/2019 | Casey et al. |
| 2019/0250029 A1 | 8/2019 | Zedlitz et al. |
| 2019/0257143 A1 | 8/2019 | Nagel et al. |
| 2020/0057346 A1 | 2/2020 | Zedlitz et al. |
| 2020/0063490 A1 | 2/2020 | Hebeisen et al. |
| 2020/0072674 A1 | 3/2020 | Baker et al. |
| 2020/0096831 A1 | 3/2020 | Brown et al. |
| 2020/0260556 A1 | 8/2020 | Rozbicki et al. |
| 2020/0355977 A1 | 11/2020 | Brown et al. |
| 2020/0393733 A1 | 12/2020 | Brown |
| 2021/0003899 A1 | 1/2021 | Zedlitz et al. |
| 2021/0080319 A1 | 3/2021 | Brown et al. |
| 2021/0190991 A1 | 6/2021 | Frank et al. |
| 2021/0325754 A1 | 10/2021 | Brown et al. |
| 2022/0113184 A1 | 4/2022 | Zedlitz et al. |
| 2024/0103332 A1 | 3/2024 | Brown et al. |
| 2024/0160076 A1 | 5/2024 | Brown |
| 2024/0168354 A1 | 5/2024 | Brown et al. |
| 2024/0210781 A1 | 6/2024 | Zedlitz et al. |
| 2024/0369893 A1 | 11/2024 | Khanna et al. |

FOREIGN PATENT DOCUMENTS

| | | | |
|---|---|---|---|
| CN | 1380482 | A | 11/2002 |
| CN | 1097760 | C | 1/2003 |
| CN | 2590732 | Y | 12/2003 |
| CN | 1534413 | A | 10/2004 |
| CN | 1659080 | A | 8/2005 |
| CN | 1672189 | A | 9/2005 |
| CN | 1704556 | A | 12/2005 |
| CN | 1822951 | A | 8/2006 |
| CN | 201104273 | Y | 8/2008 |
| CN | 101421558 | A | 4/2009 |
| CN | 101501757 | A | 8/2009 |
| CN | 101600604 | A | 12/2009 |
| CN | 101641618 | A | 2/2010 |
| CN | 101678209 | A | 3/2010 |
| CN | 101702036 | A | 5/2010 |
| CN | 101707892 | A | 5/2010 |
| CN | 101762920 | A | 6/2010 |
| CN | 101969207 | A | 2/2011 |
| CN | 102168517 | A | 8/2011 |
| CN | 102203370 | A | 9/2011 |
| CN | 102330530 | A | 1/2012 |
| CN | 202110359 | U | 1/2012 |
| CN | 202230346 | U | 5/2012 |
| CN | 102183237 | B | 8/2012 |
| CN | 102749781 | A | 10/2012 |

| | | | |
|---|---|---|---|
| CN | 202794021 | U | 3/2013 |
| CN | 103168269 | A | 6/2013 |
| CN | 103370192 | A | 10/2013 |
| CN | 103370490 | A | 10/2013 |
| CN | 103370649 | A | 10/2013 |
| CN | 103370986 | A | 10/2013 |
| CN | 203271490 | U | 11/2013 |
| CN | 103987909 | A | 8/2014 |
| CN | 203870367 | U | 10/2014 |
| CN | 104181612 | A | 12/2014 |
| CN | 104321497 | A | 1/2015 |
| CN | 104429162 | A | 3/2015 |
| CN | 104685428 | A | 6/2015 |
| CN | 104781493 | A | 7/2015 |
| CN | 105549293 | A | 5/2016 |
| CN | 106462023 | A | 2/2017 |
| CN | 106796305 | A | 5/2017 |
| CN | 110214293 | A | 9/2019 |
| DE | 10124673 | A1 | 11/2002 |
| DE | 102014220818 | A1 | 4/2016 |
| EP | 0445314 | A1 | 9/1991 |
| EP | 0869032 | A2 | 10/1998 |
| EP | 0920210 | A1 | 6/1999 |
| EP | 1078818 | A2 | 2/2001 |
| EP | 1441269 | A2 | 7/2004 |
| EP | 0835475 | B1 | 9/2004 |
| EP | 1510854 | A1 | 3/2005 |
| EP | 1417535 | B1 | 11/2005 |
| EP | 1619546 | A2 | 1/2006 |
| EP | 2161615 | A1 | 3/2010 |
| EP | 2357544 | A2 | 8/2011 |
| EP | 2590095 | A1 | 5/2013 |
| EP | 2764998 | A1 | 8/2014 |
| EP | 3114903 | A1 | 1/2017 |
| FR | 3026496 | A1 | 4/2016 |
| GB | 2462754 | A | 2/2010 |
| JP | S6122897 | U | 2/1986 |
| JP | S6282194 | A | 4/1987 |
| JP | S63208830 | A | 8/1988 |
| JP | H02132420 | A | 5/1990 |
| JP | H0431833 | A | 2/1992 |
| JP | H04363495 | A | 12/1992 |
| JP | H05178645 | A | 7/1993 |
| JP | H1063216 | A | 3/1998 |
| JP | H10159465 | A | 6/1998 |
| JP | 2000008476 | A | 1/2000 |
| JP | 2000096956 | A | 4/2000 |
| JP | 2002148573 | A | 5/2002 |
| JP | 2004170350 | A | 6/2004 |
| JP | 2004245985 | A | 9/2004 |
| JP | 2005054356 | A | 3/2005 |
| JP | 2005282106 | A | 10/2005 |
| JP | 2005314870 | A | 11/2005 |
| JP | 2006009281 | A | 1/2006 |
| JP | 2006029027 | A | 2/2006 |
| JP | 2007120090 | A | 5/2007 |
| JP | 2007308971 | A | 11/2007 |
| JP | 2009508387 | A | 2/2009 |
| JP | 2010101151 | A | 5/2010 |
| JP | 2010529488 | A | 8/2010 |
| JP | 4694816 | B2 | 6/2011 |
| JP | 4799113 | B2 | 10/2011 |
| JP | 2013057975 | A | 3/2013 |
| JP | 2016516921 | A | 6/2016 |
| KR | 200412640 | Y1 | 3/2006 |
| KR | 100752041 | B1 | 8/2007 |
| KR | 20080022319 | A | 3/2008 |
| KR | 20090026181 | A | 3/2009 |
| KR | 100904847 | B1 | 6/2009 |
| KR | 100931183 | B1 | 12/2009 |
| KR | 20100034361 | A | 4/2010 |
| KR | 20110003698 | A | 1/2011 |
| KR | 20110052721 | A | 5/2011 |
| KR | 20110094672 | A | 8/2011 |
| KR | 20110118783 | A | 11/2011 |
| KR | 20130018527 | A | 2/2013 |
| KR | 20140139894 | A | 12/2014 |
| KR | 101815919 | B1 | 1/2018 |
| RU | 29501 | U1 | 5/2003 |

(56)  References Cited

FOREIGN PATENT DOCUMENTS

| | | | |
|---|---|---|---|
| TW | 200532346 | A | 10/2005 |
| TW | 200920987 | A | 5/2009 |
| TW | M368189 | U | 11/2009 |
| TW | 201029838 | A | 8/2010 |
| TW | 201215981 | A | 4/2012 |
| TW | 201231789 | A | 8/2012 |
| TW | 201243470 | A | 11/2012 |
| TW | 201248286 | A | 12/2012 |
| TW | I395809 | B | 5/2013 |
| TW | 201447089 | A | 12/2014 |
| WO | WO-9632560 | A1 | 10/1996 |
| WO | WO-9816870 | A1 | 4/1998 |
| WO | WO-0209338 | A2 | 1/2002 |
| WO | WO-0213052 | A2 | 2/2002 |
| WO | WO-2004003649 | A1 | 1/2004 |
| WO | WO-2005098811 | A1 | 10/2005 |
| WO | WO-2005103807 | A2 | 11/2005 |
| WO | WO-2007016546 | A2 | 2/2007 |
| WO | WO-2007146862 | A2 | 12/2007 |
| WO | WO-2008030018 | A1 | 3/2008 |
| WO | WO-2008048181 | A1 | 4/2008 |
| WO | WO-2008147322 | A1 | 12/2008 |
| WO | WO-2009044330 | A1 | 4/2009 |
| WO | WO-2009124647 | A1 | 10/2009 |
| WO | WO-2010079388 | A1 | 7/2010 |
| WO | WO-2010120771 | A1 | 10/2010 |
| WO | WO-2011020478 | A1 | 2/2011 |
| WO | WO-2011087684 | A1 | 7/2011 |
| WO | WO-2011087687 | A1 | 7/2011 |
| WO | WO-2011124720 | A2 | 10/2011 |
| WO | WO-2011127015 | A1 | 10/2011 |
| WO | WO-2012079159 | A1 | 6/2012 |
| WO | WO-2012080589 | A1 | 6/2012 |
| WO | WO-2012080618 | A1 | 6/2012 |
| WO | WO-2012080656 | A1 | 6/2012 |
| WO | WO-2012080657 | A1 | 6/2012 |
| WO | WO-2012125332 | A2 | 9/2012 |
| WO | WO-2012145155 | A1 | 10/2012 |
| WO | WO-2013059674 | A1 | 4/2013 |
| WO | WO-2013102932 | A2 | 7/2013 |
| WO | WO-2013105244 | A1 | 7/2013 |
| WO | WO-2013109881 | A2 | 7/2013 |
| WO | WO-2013130781 | A1 | 9/2013 |
| WO | WO-2013155467 | A1 | 10/2013 |
| WO | WO-2014121863 | A1 | 8/2014 |
| WO | WO-2014130471 | A1 | 8/2014 |
| WO | WO-2014134451 | A2 | 9/2014 |
| WO | WO-2014150153 | A1 | 9/2014 |
| WO | WO-2014165692 | A1 | 10/2014 |
| WO | WO-2014209812 | A1 | 12/2014 |
| WO | WO-2015023842 | A2 | 2/2015 |
| WO | WO-2015023843 | A1 | 2/2015 |
| WO | WO-2015077097 | A1 | 5/2015 |
| WO | WO-2015095615 | A1 | 6/2015 |
| WO | WO-2015171886 | A1 | 11/2015 |
| WO | WO-2016004109 | A1 | 1/2016 |
| WO | WO-2016029156 | A1 | 2/2016 |
| WO | WO-2016029165 | A2 | 2/2016 |
| WO | WO-2016053960 | A1 | 4/2016 |
| WO | WO-2016054112 | A1 | 4/2016 |
| WO | WO-2016058695 | A1 | 4/2016 |
| WO | WO-2016085964 | A1 | 6/2016 |
| WO | WO-2016094445 | A1 | 6/2016 |
| WO | WO-2016191406 | A1 | 12/2016 |
| WO | WO-2017007942 | A1 | 1/2017 |
| WO | WO-2017059362 | A1 | 4/2017 |
| WO | WO-2017062592 | A1 | 4/2017 |
| WO | WO-2017075472 | A1 | 5/2017 |
| WO | WO-2017189437 | A1 | 11/2017 |
| WO | WO-2018034935 | A1 | 2/2018 |
| WO | WO-2018038972 | A1 | 3/2018 |
| WO | WO-2018039433 | A1 | 3/2018 |
| WO | WO-2018067996 | A1 | 4/2018 |
| WO | WO-2018098089 | A1 | 5/2018 |
| WO | WO-2018112095 | A2 | 6/2018 |
| WO | WO-2018112095 | A3 | 7/2018 |
| WO | WO-2018140495 | A1 | 8/2018 |
| WO | WO-2018157063 | A1 | 8/2018 |
| WO | WO-2019183232 | A1 | 9/2019 |
| WO | WO-2019183289 | A1 | 9/2019 |

OTHER PUBLICATIONS

Humann, C., "Glare Control", VELUX Build for Life Conference, presented Nov. 18, 2021. Retrieved from the internet from https://vimeo.com/647274396.

Subramaniam, S., "Daylighting Simulations with Radiance using Matrix-based Methods", Lawrence Berkeley National Laboratory, Oct. 3, 2017, 145 pages.

TW Office Action dated Mar. 16, 2022, in Application No. TW106143996 with English translation.

"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.

American Chemical Society, "Solar smart window could offer privacy and light control on demand (video)," EurakAlert! Pub Release, Nov. 16, 2016 [https://www.eurekalert.org/pub_releases/2016-11/acs-ssw111616.php].

APC by Schneider Electric, Smart-UPS 120V Product Brochure, 2013, 8 pp.

AU Examination Report dated Aug. 28, 2021, in the AU Application No. 2020202011.

AU Office Action dated Feb. 22, 2022, in Application No. AU2021200070.

Australian Examination Report dated Dec. 19, 2018 in AU Application No. 2017270472.

Australian Examination Report dated Feb. 21, 2019 in AU Application No. 2018201341.

Australian Examination Report dated Feb. 28, 2022, in Application No. 2017376447.

Australian Examination Report dated Mar. 31, 2017 in AU Application No. 2014219076.

Australian Examination Report dated May 20, 2021 in AU Application No. 2020202135.

Australian Examination Report dated Sep. 9, 2016 in AU Application No. 2013249621.

Australian Examination Report No. 2 dated Feb. 12, 2020 in AU Application No. 2018201341.

Australian Notice of Acceptance for Patent Application, dated Sep. 29, 2020, for Australian Patent Application No. 2015255913.

Australian Office Action dated Jul. 1, 2019 in AU Application No. 2015255913.

Benson D. K. et al., "Design goals and challenges for a photovoltaic-powered electrochromic window covering", Solar Energy Materials and Solar Cells, vol. 39, No. 2/04, Dec. 1995, pp. 203-211.

Boltwood Cloud Sensor II by Diffraction Limited, 2016, [online], [retrieved Dec. 15, 2016]. Retrieved from the internet URL http://diffractionlimited.com/product/boltwood-cloud-sensor-ii/.

CA Office Action dated Feb. 11, 2022, in Application No. CA2902106.

CA Office Action dated Dec. 24, 2021, in Application No. CA2948668.

Campbell-Burns, Peter, "Building a Cloud Sensor", Farnham Astronomical Society, (Apr. 15, 2013), Retrieved from the internet: URL: https://www.farnham-as.co.uk/2813/84/building-a-cloud-sensor/ [retrieved on 2828-84-24].

Canadian Notice of Allowance dated Aug. 12, 2020 in Canadian Application No. 2,902,106.

Canadian Notice of Allowance dated Jan. 18, 2021 in Canadian Application No. 2,902,106.

Canadian Office Action dated Feb. 11, 2021 in CA Application No. 2,870,627.

Canadian Office Action dated Jan. 28, 2020 in Canadian Application No. 2,902,106.

Canadian Office Action dated Jun. 10, 2021 in CA Application No. 2,948,668.

(56)　　　　　References Cited

OTHER PUBLICATIONS

Chinese Notice of Allowance & Search Report dated Sep. 12, 2019 in CN Application No. 201580035315.2.

Chinese Notice of Allowance dated Jun. 3, 2021 in CN Application No. 201680043725.6, No Translation.

Chinese Office Action dated Apr. 5, 2016 in Chinese Application No. 201280023631.4.

Chinese Office Action dated Aug. 19, 2019 in CN Application No. 201610645398.3.

Chinese Office Action dated Aug. 23, 2019 in CN Application No. 201680063892.7.

Chinese Office Action dated Dec. 1, 2016 in Chinese Application No. 201280023631.4.

Chinese Office Action dated Dec. 16, 2020 in CN Application No. 201680063892.7, with English Translation.

Chinese Office Action dated Dec. 19, 2018 in CN Application No. 201610645398.3.

Chinese Office Action dated Dec. 25, 2018 in CN Application No. 201710111979.3.

Chinese Office Action dated Feb. 2, 2021 in Chinese Application No. 201880022572.6, with English Translation.

Chinese Office Action dated Feb. 3, 2020 in Chinese Application No. 201710600395.2, with English Translation.

Chinese Office Action dated Feb. 9, 2018 in CN Application No. 201480022064.X.

Chinese Office Action dated Jan. 12, 2021 in CN Application No. 201780065447.9 with Translation.

Chinese Office Action dated Jan. 13, 2021 in Chinese Application No. 201811232377.4, with English Translation.

Chinese Office Action dated Jan. 14, 2019 in CN Application No. 201580035315.2.

Chinese Office Action dated Jan. 21, 2020 in Chinese Application No. 201811232377.4, with English Translation.

Chinese Office Action dated Jul. 14, 2020 in CN Application No. 201680063892.7, with English Translation.

Chinese Office Action dated Jul. 2, 2018 in Chinese Application No. 201710111979.3.

Chinese Office Action dated Jun. 23, 2021 in Chinese Application No. 201811232377.4, with English Translation.

Chinese Office Action dated Jun. 26, 2015 in Chinese Application No. 201280023631.4.

Chinese Office Action dated Jun. 27, 2016 in Chinese Application No. 201480022064.X.

Chinese Office Action dated Jun. 28, 2020 in CN Application No. 201680043725.6.

Chinese Office Action dated Mar. 10, 2020 in CN Application No. 201610645398.3, with English Translation.

Chinese Office Action dated Mar. 26, 2015 in CN Application No. 201280060910.8.

Chinese Office Action dated May 15, 2017 in Chinese Application No. 201480022064.X.

Chinese Office Action dated May 20, 2021 in Chinese Application No. 201710600395.2, with English Translation.

Chinese Office Action dated Nov. 27, 2015 in Chinese Application No. 201280060910.8.

Chinese Office Action dated Nov. 3, 2020 in Chinese Application No. 201710600395.2, with English Translation.

Chinese Office Action dated Oct. 10, 2015 in CN Application No. 201380026428.7.

CN Office Action dated Mar. 8, 2022, in Application No. CN201680063892.7.

CN Office Action dated Aug. 4, 2021, in CN Application No. 201780039437.8 with English translation.

CN Office Action dated Aug. 17, 2021, in CN Application No. 201680063892.7 with English translation.

CN Office Action dated Mar. 9, 2022, in Application No. CN201911184096.0.

CN Office Action dated Nov. 3, 2021, in Application No. 201780065447.9 with English translation.

CN Office Action dated Nov. 8, 2021, in Application No. 201880022572.6 with English translation.

CN Office Action dated Nov. 10, 2021, in Application No. CN201811232377.4 with English Translation.

CN office action dated Nov. 24, 2021, in application No. 201780084583.2 with English Translation.

CN Office action dated Oct. 29, 2021 in CN Application No. CN201710600395.2 with English translation.

Communication re Third-Party Observation dated Dec. 4, 2014 and Third-Party Observation dated Dec. 3, 2014 in PCT/US2014/016974.

Co-pending U.S. Appl. No. 17/753,098, filed Feb. 18, 2022.

Decision to Grant, dated Oct. 27, 2020, for Japanese Patent Application No. JP 2019-031229, with partial translation.

Duchon, Claude E. et al., "Estimating Cloud Type from Pyranometer Observations," Journal of Applied Meteorology, vol. 38, Jan. 1999, pp. 132-141.

English translation of CN201104273 description form worldwide. espacenet.com.

English translation of JP2004170350 description form worldwide. espacenet.com.

EP Extended Search Report dated Apr. 29, 2020 in EP Application No. 17881918.1.

EP Extended Search Report dated Dec. 4, 2020 in EP Application No. 18756696.3.

EP Extended Search Report dated Mar. 23, 2020 in EP Application No. 17807428.2.

EP Extended Search Report dated May 12, 2020 in EP Application No. 17859286.1.

EP Extended Search Report dated May 16, 2019 in EP Application No. 16852784.4.

EP Invitation to Indicate Search dated Jun. 22, 2016 in EP Application No. 14753897.9.

EP Office Action dated Mar. 4, 2022, in Application No. EP17859286.1.

EP Office Action dated Oct. 1, 2021, in application No. EP17807428.2.

EP Partial Supplemental Search Report dated Apr. 12, 2019 in EP Application No. 16852784.4.

EP Search Report dated Nov. 25, 2021, in Application No. EP21171305.2.

EPO Communication dated Sep. 2, 2015 in EP Application No. 14753897.9 re Third-Party Observations.

European Extended Search Report dated Jan. 17, 2019 in EP Application No. 16821984.8.

European Extended Search Report dated Jan. 18, 2019 in EP Application No. 18208971.4.

European Extended Search Report dated Jun. 18, 2019 in EP Application No. 19165771.7.

European Extended Search Report dated Oct. 12, 2016 in EP Application No. 14753897.9.

European Intention to Grant, dated Jan. 18, 2021, in EP Application No. 18208971.4.

European Intention to Grant, dated Jul. 9, 2020, in EP Application No. 18208971.4.

European Intention to Grant, dated Mar. 23, 2021, in EP Application No. 18208971.4.

European Intention to Grant, dated Sep. 21, 2020, in EP Application No. 19165771.7.

European Office Action dated Dec. 12, 2017 in EP Application No. 14753897.9.

European Office Action dated Dec. 2, 2015 in EP Application No. 12841714.4.

European Office Action dated Jul. 15, 2019 in EP Application No. 13777540.9.

European Office Action dated Mar. 12, 2021 in EP Application No. 16852784.4.

European office action dated Mar. 18, 2022, in Application No. 13777540.9.

European Office Action dated Mar. 20, 2020 in EP Application No. 16852784.4.

European Office Action dated May 15, 2017 in EP Application No. EP 12841714.4.

(56) References Cited

OTHER PUBLICATIONS

European Office Action dated May 3, 2021 in EP Application No. 17881918.1.
European Office Action dated Oct. 2, 2020 in EP Application No. 13777540.9.
European (Partial) Search Report dated Dec. 17, 2019 in EP Application No. 17807428.2.
European Search Report dated Aug. 11, 2014 in European Application No. 12757877.1.
European Search Report dated Jul. 23, 2014 in European Application No. 12756917.6.
European Search Report dated Jul. 29, 2014 in European Application No. 12758250.0.
European Search Report dated Mar. 5, 2015 in European Application No. 12841714.4.
European Search Report dated May 11, 2016 in EP Application No. 13777540.9.
Ex Parte Quayle Action, dated Feb. 2, 2021, in U.S. Appl. No. 16/335,222.
Extended European Search Report dated Apr. 3, 2018 in EP Application No. 15789108.6.
Extended European Search Report dated Oct. 13, 2021, for EP Application No. EP21163294.8.
Extended European Search Report dated Oct. 15, 2020 in EP Application No. 20182982.7.
Final Office Action dated Jun. 5, 2015 in U.S. Appl. No. 13/968,258.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [http://theweatherprediction.com/habyhints2/512/].
Halio Automation Brochure, halioglass.com, dated Aug. 2019, 13 pages.
"Halio Rooftop Sensor Kit (Model SR500)," Product Data Sheet, Kinestral Technologies, 2020, 4 pp.
"Halio Smart-Tinting Glass System," Product Data Sheet, Kinestral Technologies, www.kinestral.com, copyright 2017, 4 pp.
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&nl=11774).
"How Cleantech wants to make a 2012 comeback" http://mountainview.patch.com/articles/how-cleantech-wants-to-make-a-2012-comeback, Jan. 23, 2012.
Idso, Sherwood B., "Humidity measurement by infrared thermometry," Remote Sensing of Environment, vol. 12, 1982, pp. 87-91.
IN First Examination Report dated Jul. 7, 2021 in Indian Patent Application No. 201917013204.
IN Office Action dated Dec. 17, 2021, in Application No. IN201917027304.
IN Office Action dated Dec. 18, 2019 in Application No. IN202038052140.
IN Office Action dated Feb. 25, 2022 in Application No. IN202138016166.
IN office action dated Mar. 4, 2022, in application No. 202038052140.
Indian Office Action dated Dec. 18, 2019 in IN Application No. 2371/KOLNP/2014.
Indian Office Action dated Jul. 9, 2020 in IN Application No. 201637038970.
Indian Office Action dated Jun. 10, 2021, in IN Application No. 202038025893.
Indian Office Action dated Sep. 3, 2019 in IN Application No. 3074/KOLNP/2015.
International Preliminary Report on Patentability dated Apr. 12, 2018 in PCT/US16/55005.
International Preliminary Report on Patentability dated Apr. 18, 2019 in PCT/US17/55631.
International Preliminary Report on Patentability dated Dec. 13, 2018 in PCT/US17/35290.
International Preliminary Report on Patentability dated Feb. 19, 2015 issued in PCT/US2013/053625.

International Preliminary Report on Patentability dated Jan. 18, 2018 in PCT/US2016/041344.
International Preliminary Report on Patentability dated Jun. 17, 2019 in PCT/US2017/066198.
International Preliminary Report on Patentability dated May 1, 2014 in PCT/US2012/061137.
International Preliminary Report on Patentability dated Nov. 24, 2016 in PCT/US2015/029675.
International Preliminary Report on Patentability dated Oct. 1, 2020 issued in PCT/US2019/023268.
International Preliminary Report on Patentability dated Oct. 23, 2014 issued in PCT/US2013/036456.
International Preliminary Report on Patentability dated Oct. 30, 2014 issued in PCT/US2013/034998.
International Preliminary Report on Patentability dated Oct. 30, 2014 issued in PCT/US2013/036235.
International Preliminary Report on Patentability dated Sep. 26, 2013, issued in PCT/US2012/027742.
International Preliminary Report on Patentability dated Sep. 26, 2013, issued in PCT/US2012/027828.
International Preliminary Report on Patentability dated Sep. 26, 2013, issued in PCT/US2012/027909.
International Preliminary Report on Patentability dated Sep. 3, 2015, issued in PCT/US2014/016974.
International Preliminary Report on Patentability dated Sep. 6, 2019 issued in PCT/US2018/019737.
International Search Report and Written Opinion dated Dec. 13, 2016 in PCT/US16/55005.
International Search Report and Written Opinion dated Dec. 26, 2013, issued in PCT/US2013/053625.
International Search Report and Written Opinion dated Jan. 25, 2018 in PCT/US17/55631.
International Search Report and Written Opinion dated Jul. 11, 2013, issued in PCT/US2013/034998.
International Search Report and Written Opinion dated Jul. 23, 2013, issued in PCT/US2013/036235.
International Search Report and Written Opinion dated Jul. 23, 2015 in PCT/US2015/029675.
International Search Report and Written Opinion dated Jul. 26, 2013, issued in PCT/US2013/036456.
International Search Report and Written Opinion dated Mar. 28, 2013 in PCT/US2012/061137.
International Search Report and Written Opinion dated Mar. 30, 2018 in PCT/US2017/066198.
International Search Report and Written Opinion dated May 26, 2014 in PCT/US2014/016974.
International Search Report and Written Opinion dated Nov. 25, 2020, in PCT Application No. PCT/US2020/047525.
International Search Report and Written Opinion dated Oct. 13, 2016, issued in PCT/US2016/041344.
International Search Report and Written Opinion dated Oct. 16, 2014, issued in PCT/US2014/043514.
International Search Report and Written Opinion dated Sep. 24, 2012, issued in PCT/US2012/027742.
International Search Report and Written Opinion dated Sep. 24, 2012, issued in PCT/US2012/027909.
International Search Report and Written Opinion dated Sep. 26, 2012, issued in PCT/US2012/027828.
International Search Report and Written Opinion dated Sep. 4, 2019, issued in PCT/US2019/023268.
International Search Report and Written Opinion dated Sep. 8, 2017, issued in PCT/US17/35290.
International Search Report and Written Opinion (ISA: KIPO) dated Jun. 11, 2018 issued in PCT/US2018/019737.
Invitation to Pay Fees and Communication Relating to the Result of the Partial International Search, dated Jul. 12, 2019, issued in PCT/US2019/023268.
Japanese Decision of Rejection dated Oct. 24, 2018 in JP Application No. JP 2015-558909.
Japanese Office Action dated Apr. 2, 2019 in JP Application No. 2016-567021.
Japanese Office Action dated Feb. 6, 2018 in JP Application No. 2015-558909.

(56)         References Cited

OTHER PUBLICATIONS

Japanese Office Action dated Jan. 27, 2021 in JP Application No. 2019-232669.
Japanese Office Action dated Mar. 10, 2020 in JP Application No. 2019-031229.
JP Decision to Grant a Patent dated Jul. 29, 2021, in JP Application No. 2019-232669.
JP Office Action dated Jan. 4, 2022, in Application No. JP2020-215729.
JP Office Action dated Oct. 12, 2021, in application No. JP2019531271 with Machine Translation.
Kipp & Zonen, "Solar Radiation" (known as of Sep. 3, 2014) [http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Korean Notice of Decision to Grant dated Jun. 22, 2021 in KR Application No. KR10-2015-7026041, with English Translation.
Korean Notice of First Refusal dated Feb. 18, 2021 in KR Application No. KR10-2015-7026041.
Korean Notification of Provisional Rejection dated Jun. 22, 2021 in KR Application No. KR10-2016-7032512.
Korean Office Action, dated Feb. 16, 2021, for Korean Patent Application No. 10-2020-7002032 with English Translation.
Korean Office Action, dated Jun. 15, 2020, for Korean Patent Application No. 10-2020-7002032 with English Translation.
Korean Office Action, dated Jun. 7, 2021, for Korean Patent Application No. 10-2020-7002032, with English Translation.
Korean Office Action dated Mar. 30, 2020 in KR Application No. KR 10-2015-7026041, no translation.
KR Office Action dated Dec. 23, 2021, in application No. 1020197011968 with English Translation.
Letter dated Dec. 1, 2014 re Prior Art re U.S. Appl. No. 13/772,969 from Ryan D. Ricks representing MechoShade Systems, Inc.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
Maghrabi, A., et al., "Design and development of a simple infrared monitor for cloud detection," Energy Conversion and Management, vol. 50, 2009, pp. 2732-2737.
Maghrabi, A., et al., "Precipitable water vapour estimation on the basis of sky temperatures measured by a single-pixel IR detector and screen temperatures under clear skies," Meteorological Applications, vol. 17, 2010, pp. 279-286.
"Smart Glazing: Making smart-tinting glazing even smarter", Daylighting: Design & Technology for Better Buildings, Issue 20 (Jan./Feb. 2020), 5 pages.
Melexis "MLX90614 family Datasheet" (3901090614, Rev. 004), Jul. 30, 2008, 42 pp.
Mims III, Forrest M., et al., "Measuring total column water vapor by pointing an infrared thermometer at the sky," Bulletin of the American Meteorological Society, Oct. 2011, pp. 1311-1320.
Morris, V.R. et al., "Deployment of an infrared thermometer network at the atmospheric radiation measurement program southern great plains climate research facility," Sixteenth ARM Science Team Meeting Proceedings, Albuquerque, NM, Mar. 27-31, 2006, 11 pp.
National Aeronautics & Space Administration, "Cloud Radar System (CRS)," (known as of Sep. 3, 2014), published date of Jun. 16, 2014, [http://har.gsfc.nasa.gov/index.php?section=12].
National Aeronautics & Space Administration, "Cloud Remote Sensing and Modeling," (known as of Sep. 3, 2014), published date of Sep. 15, 2014, [http://atmospheres.gsfc.nasa.gov/climate/index.php?section=134].
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.

Notice of Allowance dated Aug. 16, 2021 in U.S. Appl. No. 16/695,004.
Notice of Allowance dated Aug. 24, 2021 in U.S. Appl. No. 16/695,004.
Notice of Allowance, dated Jun. 18, 2020 in CN Application No. 201610645398.3, No Translation.
Notice of Allowance dated Oct. 27, 2021 in U.S. Appl. No. 16/335,222.
Office Action dated Oct. 6, 2014 in U.S. Appl. No. 13/968,258.
Partial EP Supplemental Search Report dated Nov. 29, 2017 in EP Application No. 15789108.6.
Partial European Search Report dated Jul. 6, 2021 for EP Application No. EP21163294.8.
PCT International Preliminary Report on Patentability and Written Opinion dated Mar. 3, 2022, issued in PCT/US2020/047525.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Preliminary Amendment dated Aug. 21, 2019 for U.S. Appl. No. 16/487,802.
Preliminary Amendment dated Jul. 1, 2021, in U.S. Appl. No. 17/305,132.
Preliminary Amendment dated Jul. 10, 2020 for U.S. Appl. No. 15/929,958.
Preliminary Amendment dated Mar. 8, 2021, in U.S. Appl. No. 17/249,595.
Preliminary Amendment dated Nov. 9, 2020 for U.S. Appl. No. 17/008,342.
Preliminary Amendment No. 2, dated Dec. 9, 2020 for U.S. Appl. No. 16/695,004.
"Remote Sensing: Clouds," Department of Atmospheric and Ocean Science, University of Maryland, (known as of Sep. 3, 2014) [http://www.atmos.umd.edu/~pinker/remote_sensing_clouds.htm].
Russian Decision to Grant with Search Report dated Feb. 28, 2018 in RU Application No. 2015139884.
Russian Office Action dated Apr. 13, 2017 in RU Application No. 2014144632.
Russian Office Action dated Dec. 7, 2018 in RU Application No. 2016148196.
Russian Office Action dated Nov. 22, 2017 in RU Application No. 2014144632.
Science and Technology Facilities Council. "Cloud Radar: Predicting The Weather More Accurately." ScienceDaily, Oct. 1, 2008. [www.sciencedaily.com/releases/2008/09/080924085200.htm].
Selkowitz, S. et al., "Dynamic, Integrated Façade Systems for Energy Efficiency and Comfort," Journal of Buiding Enclosure Design, Summer 2006, pp. 11-17.
Singapore Search Report dated May 29, 2020 in SG Application No. 10201608572S.
Singapore Supplementary Examination Report dated Dec. 7, 2016 in SG Application No. 11201406676Q.
Smith, et al. "Measuring Cloud Cover and Brightness Temperature with a Ground Based Thermal Infrared Camera", (Feb. 2008), American Meteorological Society, vol. 47, pp. 683-693.
Taiwan Office Action dated May 13, 2021 in Taiwan Patent Application No. 106134521 with English Translation.
Taiwan Office Action dated Jul. 30, 2020 in ROC (Taiwan) Pat. Appln. No. 105121480, with English Translation.
Taiwanese Office Action dated Apr. 17, 2020 in TW Application No. TW 107102210, no translation.
Taiwanese Office Action dated Aug. 22, 2017 in TW Application No. 103105957.
Taiwanese Office Action dated Jan. 11, 2016 in TW Application No. 101108958.
Taiwanese Office Action dated Jan. 30, 2019 in TW Application No. 104114812.
Taiwanese Office Action dated Jun. 21, 2021 in TW Application No. TW 107106439, no translation.
Taiwanese Office Action dated May 8, 2019 in TW Application No. 107122055.
Taiwanese Office Action dated Nov. 23, 2016 in TW Application No. 105129854.

(56) References Cited

OTHER PUBLICATIONS

Taiwanese Office Action dated Oct. 17, 2017 in TW Application No. 106115702.
Taiwanese Office Action dated Sep. 11, 2020 in TW Application No. 109103256, with English Translation.
Taiwanese Office Action dated Sep. 16, 2020 in TW Application No. 108143706, with English Translation.
Third-Party Submission dated Feb. 2, 2015 and Feb. 18, 2015 PTO Notice re Third- Party Submission for U.S. Appl. No. 13/772,969.
Thompson, Marcus, "Boltwood cloud sensor," Cloudynights.com, Nov. 25, 2005, 6 pp. [online], [retrieved Dec. 15, 2016]. Retrieved from the internet URL http://www.cloudynights.com/page/articles/cat/user-reviews/photography/photography-accessories/boltwood-cloud-sensor-r1222.
TW Notice of Allowance dated Sep. 9, 2021, in application No. TW110106134.
TW Office Action dated Dec. 29, 2021, in application No. TW110124070 with English Translation.
TW Office Action dated Mar. 16, 2022, in Application No. TW106143996.
TW Office Action dated Oct. 26, 2021 in TW Application No. TW20170143996 with English translation.
TW Reissued Office Action dated Jul. 8, 2021, in Taiwanese Application No. 107106439.
U.S. Corrected Notice of Allowability dated Jan. 12, 2022, in U.S. Appl. No. 16/335,222.
US Corrected Notice of Allowability dated Nov. 24, 2021, in U.S. Appl. No. 16/335,222.
U.S. Corrected Notice of Allowance dated Feb. 22, 2022 in U.S. Appl. No. 15/762,077.
US Corrected Notice of Allowance dated Jan. 21, 2022 in U.S. Appl. No. 15/742,015.
US Final Office Action dated Apr. 30, 2012 in U.S. Appl. No. 13/049,750.
US Final Office Action dated Apr. 30, 2020 in U.S. Appl. No. 15/891,866.
U.S. Final Office Action dated Aug. 19, 2013 in U.S. Appl. No. 13/049,756.
US Final Office Action dated Feb. 26, 2015 in U.S. Appl. No. 13/479,137.
US Final Office Action dated Jan. 11, 2019 in U.S. Appl. No. 15/891,866.
US Final Office Action dated Jan. 27, 2014 in U.S. Appl. No. 13/479,137.
U.S. Final Office Action dated Jul. 2, 2015 in U.S. Appl. No. 13/049,756.
US Final Office Action dated Jul. 29, 2016 in U.S. Appl. No. 13/772,969.
U.S. Final Office Action dated Mar. 10, 2022, in U.S. Appl. No. 16/487,802.
US Final Office Action dated May 15, 2014 in U.S. Appl. No. 13/449,251.
US Final Office Action dated May 16, 2014 in U.S. Appl. No. 13/449,248.
U.S. Non Final Office Action dated Feb. 16, 2022 in U.S. Appl. No. 15/929,958.
U.S. Non Final Office Action dated Jan. 21, 2022, in U.S. Appl. No. 16/303,384.
US Notice of Allowability (corrected) dated Jul. 28, 2016 in U.S. Appl. No. 14/163,026.
US Notice of Allowance (corrected) dated Jun. 9, 2020 in U.S. Appl. No. 15/442,509.
US Notice of Allowance dated Apr. 13, 2015 in U.S. Appl. No. 14/657,380.
US Notice of Allowance dated Apr. 14, 2021 in U.S. Appl. No. 16/335,222.
US Notice of Allowance dated Apr. 22, 2021 in U.S. Appl. No. 15/742,015.
US Notice of Allowance dated Apr. 4, 2016 in U.S. Appl. No. 14/535,080.
US Notice of Allowance dated Aug. 3, 2021 in U.S. Appl. No. 16/335,222.
US Notice of Allowance dated Aug. 12, 2016 in U.S. Appl. No. 14/352,973.
US Notice of Allowance dated Aug. 12, 2020 in U.S. Appl. No. 16/013,770.
US Notice of Allowance dated Aug. 12, 2021 in U.S. Appl. No. 16/335,222.
US Notice of Allowance dated Aug. 16, 2018 in U.S. Appl. No. 15/349,860.
US Notice of Allowance dated Aug. 19, 2021 in U.S. Appl. No. 15/742,015.
US Notice of Allowance dated Aug. 7, 2020 in U.S. Appl. No. 15/891,866.
U.S Notice of Allowance dated Dec. 20, 2021, in U.S. Appl. No. 15/742,015.
US Notice of Allowance dated Dec. 22, 2016 in U.S. Appl. No. 13/772,969.
U.S. Notice of Allowance dated Dec. 30, 2021, in U.S. Appl. No. 15/742,015.
U.S. Notice of Allowance dated Feb. 8, 2022 in U.S. Appl. No. 15/762,077.
US Notice of Allowance dated Jan. 10, 2014 in U.S. Appl. No. 13/449,235.
US Notice of Allowance dated Jan. 12, 2018 in U.S. Appl. No. 14/932,474.
US Notice of Allowance dated Jan. 22, 2015 in U.S. Appl. No. 13/682,618.
US Notice of Allowance dated Jan. 22, 2018 in U.S. Appl. No. 15/464,837.
US Notice of Allowance dated Jan. 27, 2017 in U.S. Appl. No. 14/931,390.
U.S. Notice of Allowance dated Jan. 8, 2016 in U.S. Appl. No. 13/049,756.
US Notice of Allowance dated Jul. 20, 2012 in U.S. Appl. No. 13/049,623.
US Notice of Allowance dated Jul. 23, 2020 in U.S. Appl. No. 16/013,770.
US Notice of Allowance dated Jun. 17, 2014 in U.S. Appl. No. 13/309,990.
U.S. Notice of Allowance dated Jun. 22, 2016 in U.S. Appl. No. 13/049,756.
US Notice of Allowance dated Jun. 8, 2016 in U.S. Appl. No. 14/163,026.
US Notice of Allowance dated Mar. 20, 2018 in U.S. Appl. No. 15/347,677.
US Notice of Allowance dated Mar. 31, 2021 in U.S. Appl. No. 15/742,015.
U.S. Notice of Allowance dated May 12, 2021 for U.S. Appl. No. 15/762,077.
US Notice of Allowance dated May 13, 2021 in U.S. Appl. No. 16/695,004.
US Notice of Allowance dated May 14, 2015 in U.S. Appl. No. 13/479,137.
US Notice of Allowance dated May 27, 2020 in U.S. Appl. No. 15/442,509.
US Notice of Allowance dated May 3, 2018 in U.S. Appl. No. 14/993,822.
US Notice of Allowance dated May 8, 2012 in U.S. Appl. No. 13/049,750.
US Notice of Allowance dated Nov. 16, 2018 in U.S. Appl. No. 15/349,860.
US Notice of Allowance dated Oct. 2, 2019 in U.S. Appl. No. 15/464,837.
US Notice of Allowance dated Sep. 25, 2018 in U.S. Appl. No. 15/442,509.
US Notice of Allowance dated Sep. 3, 2019 in U.S. Appl. No. 15/442,509.
US Notice of Allowance dated Sep. 6, 2019 in U.S. Appl. No. 14/993,822.
US Notice of Allowance (supplemental) dated Jun. 12, 2015 in U.S. Appl. No. 13/479,137.
US Office Action dated Apr. 1, 2022, in U.S. Appl. No. 16/469,851.

(56) References Cited

OTHER PUBLICATIONS

US Office Action dated Apr. 14, 2016 in U.S. Appl. No. 14/163,026.
US Office Action dated Aug. 28, 2017 in U.S. Appl. No. 14/932,474.
US Office Action dated Dec. 10, 2020 in U.S. Appl. No. 16/695,004.
US Office Action dated Dec. 24, 2013 in U.S. Appl. No. 13/309,990.
US Office Action dated Feb. 22, 2016 in U.S. Appl. No. 14/535,080.
US Office Action dated Feb. 24, 2015 in U.S. Appl. No. 14/163,026.
US Office Action dated Feb. 3, 2012 in U.S. Appl. No. 13/049,750.
US Office Action dated Jan. 16, 2015 in U.S. Appl. No. 14/468,778.
U.S. Office Action dated Jan. 18, 2013 in U.S. Appl. No. 13/049,756.
US Office Action dated Jan. 2, 2020 in U.S. Appl. No. 15/442,509.
US Office Action dated Jan. 23, 2020 in U.S. Appl. No. 15/762,077.
US Office Action dated Jan. 5, 2016 in U.S. Appl. No. 13/772,969.
US Office Action dated Jan. 5, 2018 in U.S. Appl. No. 15/442,509.
US Office Action dated Jul. 3, 2014 in U.S. Appl. No. 13/479,137.
US Office Action dated Jun. 11, 2020 in U.S. Appl. No. 16/303,384.
US Office Action dated Jun. 23, 2020 in U.S. Appl. No. 15/742,015.
US Office Action dated Jun. 3, 2015 in U.S. Appl. No. 13/449,251.
US Office Action dated Jun. 6, 2017 in U.S. Appl. No. 15/442,509.
US Office Action dated Mar. 12, 2019 in U.S. Appl. No. 15/464,837.
US Office Action dated Mar. 18, 2020 in U.S. Appl. No. 16/013,770.
US Office Action dated Mar. 27, 2012 in U.S. Appl. No. 13/049,623.
US Office Action dated Mar. 27, 2019 in U.S. Appl. No. 14/993,822.
US Office Action dated Mar. 3, 2021 in U.S. Appl. No. 16/303,384.
US Office Action dated Mar. 5, 2019 in U.S. Appl. No. 15/442,509.
US Office Action dated Mar. 8, 2017 in U.S. Appl. No. 14/993,822.
US Office Action dated May 18, 2018 in U.S. Appl. No. 15/891,866.
US Office Action dated May 30, 2018 in U.S. Appl. No. 15/464,837.
US Office Action dated Nov. 19, 2015 in U.S. Appl. No. 14/535,080.
US Office Action dated Nov. 2, 2017 in U.S. Appl. No. 15/349,860.
US Office Action dated Nov. 27, 2015 in U.S. Appl. No. 14/352,973.
US Office Action dated Nov. 27, 2015 in U.S. Appl. No. 14/163,026.
US Office Action dated Nov. 29, 2013 in U.S. Appl. No. 13/449,248.
US Office Action dated Nov. 29, 2013 in U.S. Appl. No. 13/449,251.
US Office Action dated Oct. 11, 2013 in U.S. Appl. No. 13/449,235.
US Office Action dated Oct. 11, 2017 in U.S. Appl. No. 14/993,822.
US Office Action dated Oct. 21, 2019 in U.S. Appl. No. 15/742,015.
US Office Action dated Oct. 27, 2020 in U.S. Appl. No. 15/762,077.
US Office Action dated Oct. 28, 2014 in U.S. Appl. No. 13/449,251.
U.S. Office Action dated Oct. 6, 2014 in U.S. Appl. No. 13/049,756.
US Office Action dated Sep. 14, 2018 in U.S. Appl. No. 14/993,822.
US Office Action dated Sep. 15, 2014 in U.S. Appl. No. 13/682,618.
US Office Action dated Sep. 16, 2021, in U.S. Appl. No. 16/469,851.
US Office Action dated Sep. 19, 2019 in U.S. Appl. No. 15/891,866.
US Office Action dated Sep. 21, 2021, in U.S. Appl. No. 16/487,802.
US Office Action dated Sep. 23, 2013 in U.S. Appl. No. 13/479,137.
US Office Action dated Sep. 29, 2014 in U.S. Appl. No. 13/449,248.
U.S. Appl. No. 17/304,832, filed Jun. 25, 2021.
US Preliminary Amendment dated Oct. 30, 2019 for U.S. Appl. No. 16/013,770.
U.S. Appl. No. 63/080,899, inventor Makker et al., filed Sep. 21, 2020.
Werner, Christian, "Automatic cloud cover indicator system," Journal of Applied Meteorology, vol. 12, Dec. 1973, pp. 1394-1400.
CA Office Action dated Feb. 7, 2024 in CA Application No. 3039606.
CA Office Action dated Feb. 23, 2024 in CA Application No. 3155214.
CN Notice of Allowance dated Jun. 3, 2021 in CN Application No. 201680043725.6 with English Translation.
CN Office Action dated Aug. 8, 2024 in CN Application No. 202080075246.9, with English Translation.

CN Office Action dated Jan. 15, 2024 in CN Application No. 202080075246.9 with EnglishTranslation.
CN Office Action dated Sep. 26, 2023, in Application No. CN202210751723.X withEnglish Translation.
EP Extended European Search Report dated Apr. 12, 2024 in EP Application No. 23215819.6.
EP Extended European Search report dated Jan. 2, 2024 in EP Application No. 23172663.9.
EP Office Action dated Feb. 2, 2024 in EP Application No. 18756696.3.
EP Office Action dated Jun. 25, 2024 in EP Application No. 21163294.8.
EP Office Action dated Nov. 19, 2024 in EP Application No. 22197030.4.
JP Office Action dated Apr. 2, 2024 in JP Application No. 2022-180244, with Englishtranslation.
Kastner W., et al., "Communication Systems for Building Automation and Control," Proceedings of the IEEE, 2005, vol. 93 (6), pp. 1178-1203.
KR Office Action dated Mar. 30, 2020 in KR Application No. 10-2015-7026041 with English Translation.
TW Office Action dated Apr. 17, 2020 in TW Application No. 107102210 with EnglishTranslation.
U.S. Advisory Action dated Apr. 15, 2024 in U.S. Appl. No. 17/931,014.
U.S. Corrected Notice of Allowance dated Dec. 18, 2024 in U.S. Appl. No. 18/404,661.
U.S. Corrected Notice of Allowance dated Feb. 14, 2024 in U.S. Appl. No. 16/487,802.
U.S. Corrected Notice of Allowance dated Feb. 23, 2024 in U.S. Appl. No. 17/305,132.
U.S. Corrected Notice of Allowance dated Jan. 29, 2024 in U.S. Appl. No. 17/305,132.
U.S. Corrected Notice of Allowance dated Sep. 13, 2024 in U.S. Appl. No. 18/404,661.
U.S. Non-Final Office Action dated Aug. 16, 2024 in U.S. Appl. No. 18/486,197.
U.S. Non-Final Office Action dated Dec. 12, 2024 in U.S. Appl. No. 17/931,014.
U.S. Non-Final Office Action dated Sep. 5, 2024 in U.S. Appl. No. 18/338,296.
U.S. Non-Final Office Action dated Sep. 19, 2024 in U.S. Appl. No. 18/592,365.
U.S. Non-Final Office Action dated Sep. 20, 2024 in U.S. Appl. No. 18/429,181.
U.S. Non-Final Office Action dated Sep. 24, 2024 in U.S. Appl. No. 18/608,299.
U.S. Notice of Allowance dated Aug. 28, 2024 in U.S. Appl. No. 18/404,661.
U.S. Notice of Allowance dated Jan. 16, 2024 in U.S. Appl. No. 17/753,098.
U.S. Notice of Allowance dated Jan. 17, 2024 in U.S. Appl. No. 17/305,132.
U.S. Notice of Allowance dated Jan. 18, 2024 in U.S. Appl. No. 17/008,342.
U.S. Notice of Allowance dated Jan. 21, 2025 in U.S. Appl. No. 18/486,197.
U.S. Notice of Allowance dated Sep. 29, 2023 in U.S. Appl. No. 17/008,342.
U.S. Appl. No. 18/961,314, inventor Brown S.C, filed Nov. 26, 2024.
U.S. Restriction Requirement dated Dec. 11, 2024 in U.S. Appl. No. 18/150,146.
European Search report dated Oct. 10, 2022.

Module A –
Sunlight Penetration

Module B –
Clear Sky

Module C –
Irradiance
determined by
system inputs

A - Direct Sunlight Penetration
B - Clear Sky Prediction
C - Real-time Irradiance accounting for obstructed and reflected

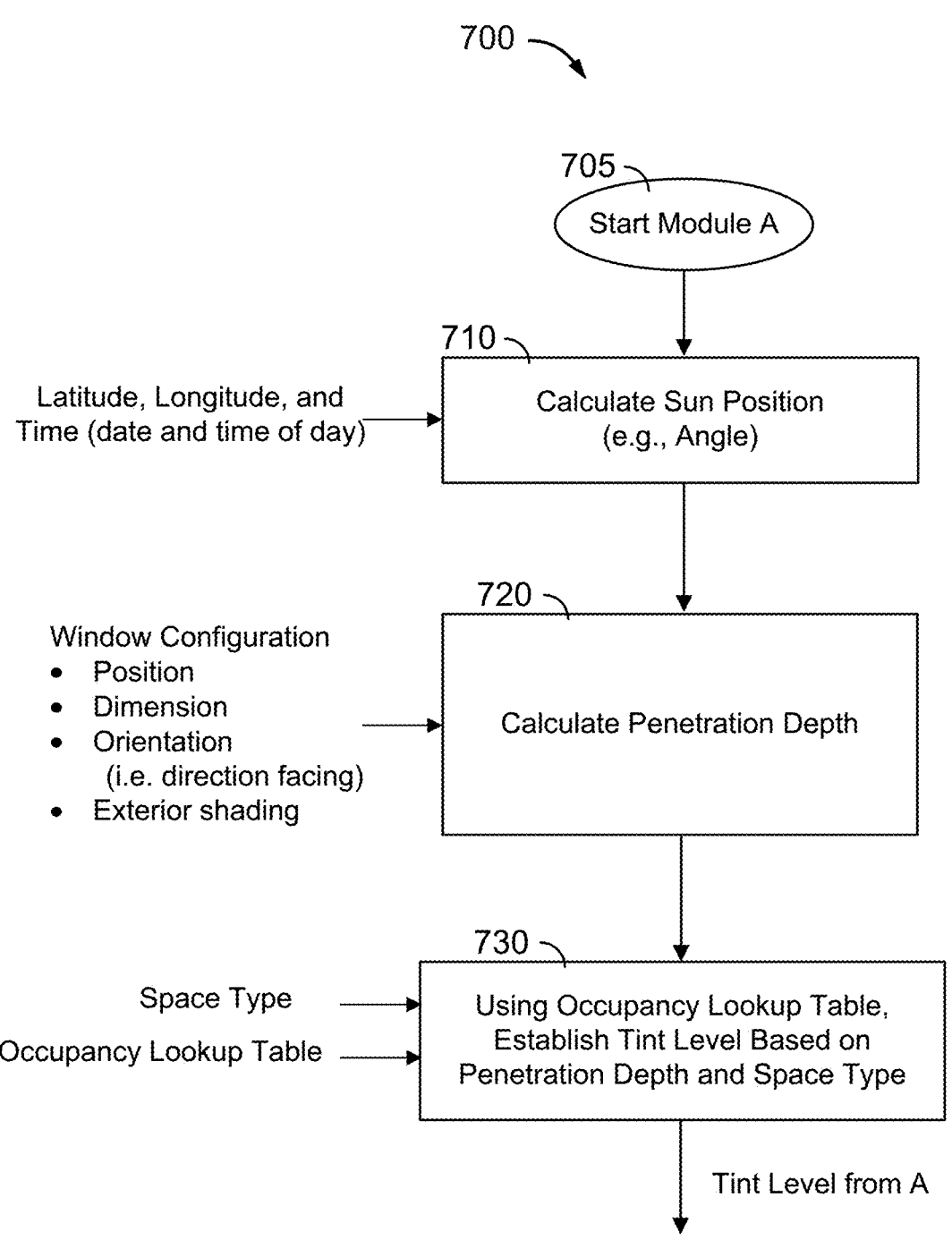

700

705
Start Module A

Latitude, Longitude, and
Time (date and time of day)

710
Calculate Sun Position
(e.g., Angle)

Window Configuration
• Position
• Dimension
• Orientation
  (i.e. direction facing)
• Exterior shading 720
Calculate Penetration Depth Space Type Occupancy Lookup Table 730
Using Occupancy Lookup Table,
Establish Tint Level Based on
Penetration Depth and Space Type Tint Level from A

*FIG. 7*

Occupancy Lookup Table

Tint level (SHGC value)

| Penetration Depth \ Space Type | Desk 1 | Desk 2 | Lobby |
|---|---|---|---|
| 2 feet | 10 (0.60) | 0 (0.80) | 0 (0.80) |
| 4 feet | 20 (0.40) | 5 (0.70) | 0 (0.80) |
| 6 feet | 30 (0.20) | 10 (0.60) | 5 (0.70) |
| 8 feet | 35 (0.10) | 20 (0.40) | 10 (0.60) |
| 10 feet | 35 (0.10) | 35 (0.10) | 10 (0.60) |
| 12 feet | 35 (0.10) | 35 (0.10) | 15 (0.50) |

*FIG. 8*

A - Sunlight Penetration
B - Clear Sky Radiation Determination
C - Real-time Irradiance accounting for obstructed and reflected

Acceptance Angle between $\Theta_1$ to $\Theta_2$

If $\Theta_1 < \Theta_{sun} < \Theta_2$ and

| Penetration Depth | $T_{vis}$ | $\Theta_1$ | $\Theta_2$ |
|---|---|---|---|
| 2 feet | 63% | 30° | 120° |
| 4 feet | 40% | 30° | 120° |
| 8 feet | 20% | 30° | 120° |
| 15 feet | 4% | 30° | 120° |

CONTROL METHOD FOR TINTABLE WINDOWS

CROSS-REFERENCES TO RELATED APPLICATIONS

An Application Data Sheet is filed concurrently with this specification as part of the present application. Each application that the present application claims benefit of or priority to as identified in the concurrently filed Application Data Sheet is incorporated by reference herein in their entireties and for all purposes.

FIELD

The embodiments disclosed herein relate generally to window controllers and related control logic for implementing methods of controlling tint and other functions of tintable windows (e.g., electrochromic windows).

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960s, electrochromic devices, and particularly electrochromic windows, still unfortunately suffer various problems and have not begun to realize their full commercial potential despite many recent advances in electrochromic technology, apparatus and related methods of making and/or using electrochromic devices.

SUMMARY

Systems, methods, and apparatus for controlling transitions of electrochromic windows and other tintable windows to different tint levels are provided. Generally, embodiments include control logic for implementing methods of controlling tint levels of electrochromic windows or other tintable windows. Typically, the control logic can be used in a building or other architecture having one or more electrochromic windows located between the interior and exterior of the building. The windows may have different configurations. For example, some may be vertical windows in offices or lobbies and others may be skylights in hallways. More particularly, disclosed embodiments include control logic that implement methods for determining tint levels for one or more tintable windows that account for occupant comfort. In some cases, certain methods can determine a tint level for a tintable window that is appropriate at a time in the future, for example, to allow for transition time to the tint level.

Occupant comfort has to do with reducing direct glare and/or total radiant energy directed onto an occupant or the occupant's area of activity. In some cases, the comfort also has to do with allowing sufficient natural lighting into the area. The control logic may also make use of considerations for energy conservation. In a particular implementation, control logic may include one or more modules with at least one of the modules being associated with occupant comfort considerations. One or more of the modules may be concerned with energy consumption as well.

In one aspect, one or more modules of the control logic may determine a tint level that is determined based on occupant comfort from direct sunlight or glare on the occupant or their activity area such as their desk. These modules may determine how far into the room the sunlight penetrates at a particular instant in time. The modules may then determine an appropriate tint level that will transmit the level of light that will be comfortable to the occupant.

In another aspect, one or more modules of the control logic may modify the tint level determined based on occupant comfort to also take into account energy considerations from calculated irradiance under clear sky conditions. In this aspect, the tint level may be darkened to make sure that it performs at least as well as a reference window required in the building as specified by the local municipality codes or standards. The modified tint level will provide at least as much energy savings in cooling as the reference window. In some cases, the tint level may be lightened instead to provide energy savings in heating.

In yet another aspect, one or more modules of the control logic may modify the tint level determined based on occupant comfort and calculated clear sky irradiance to account for actual irradiance. The actual irradiance may be different than the calculated irradiance irradiance due to obstructions and reflection of light. A photosensor or other sensor that can measure radiation levels can be used to determine the actual irradiance. These one or more modules determine the lightest tint level that transmits as much or less light into the room than the tint level determined based on occupant comfort and calculated clear sky irradiance.

One embodiment is a method of controlling tint of a tintable window to account for occupant comfort in a room of a building. The tintable window is located between the interior and exterior of the building. The method determines an appropriate tint level for the tintable window at a future time based on a penetration depth of sunlight through the tintable window into the room at the future time and space type in the room. The method provides instructions over a network to transition tint of the tintable window to the tint level.

Another embodiment is a controller for controlling tint of a tintable window to account for occupant comfort in a room of a building. The tintable window is located between the interior and exterior of the building. The controller comprises a processor configured to determine a tint level for the tintable window based on a penetration depth of direct sunlight through the tintable window into a room and space type in the room. The controller also comprises a pulse width modulator ("PWM") in communication with the processor and with the tintable window over a network. The pulse width modulator is configured to receive the tint level from the processor and send a signal with tint instructions over the network to transition the tint of the tintable window to the determined tint level.

Another embodiment is a master controller for controlling tint of a tintable window to account for occupant comfort in a building. The tintable window is located between the interior and exterior of the building. The master controller comprises a computer readable medium and a processor in communication with the computer readable medium and in communication with a local window controller for the tintable window. The computer readable medium has a configuration file with a space type associated with the tintable window. The processor is configured to receive the space type from the computer readable medium, determine a tint level for the tintable window based on a penetration depth of direct sunlight through the tintable window into a room and the space type, and send tint instructions over a network to the local window controller to transition tint of the tintable window to the determined tint level.

Another embodiment is a method of controlling tint of one or more tintable windows in a zone of a building to account for occupant comfort. The method calculates a future time based on a current time and based on a calculated transition time of a representative window of the zone. The method also calculates a solar position at the future time and determines a program designated by a user in schedule. The program includes logic for determining a tint level based on one or more independent variables. The method also employs the determined program to determining the tint level based on the calculated solar position at the future time and occupant comfort. The method also communicates instructions to the one or more tintable windows to transition tint to the determined tint level.

Another embodiment is a window controller for controlling tint of one or more tintable windows in a zone of a building to account for occupant comfort. The window controller comprises a computer readable medium having control logic, and site data and zone/group data associated with the zone. The window controller further comprises a processor in communication with the computer readable medium and in communication with the tintable window. The processor is configured to calculate a future time based on a current time and a calculated transition time of a representative window of the zone. The processor is also configured to calculate a solar position at the future time and determine a program designated by a user in a schedule. The program includes logic for determining a tint level based on one or more independent variables. The processor is also configured to employ the determined program to determine a tint level using the calculated solar position at the future time and based on occupant comfort. The processor is also configured to communicate instructions to the one or more tintable windows in the zone to transition tint to the determined tint level.

Certain aspects pertain to control methods of controlling tint of a tintable window. The methods comprise receiving weather feed data from one or more weather services (or other data sources) over a communication network and determining a weather condition based on the weather feed data. The methods further comprise, if a current time is within in a time delay period at sunrise or sunset, determining a tint level for the tintable window based on the weather condition. The methods further comprise sending a tint command to transition the tintable window to the tint level. In some cases, the methods further comprise calculating a solar azimuthal angle based on the current time and the latitude and longitude of a building having the tintable window. In some cases, the weather condition is determined based on whether the cloud coverage percentage is above a threshold, for example, the weather condition may be a cloudy condition if it is determined that the cloud coverage percentage is above the threshold, and the weather condition may be a not cloudy condition if it is determined that the cloud coverage percentage is at or below the threshold.

Certain aspects pertain to control methods for controlling tint of a tintable window to account for occupancy comfort in a building with the tintable window. The control methods comprise if a current time is before a sunrise time or after a time delay after a sunrise time, then determining whether a light sensor reading is between a lower limit and an upper limit, and if the light sensor reading is between a lower limit and an upper limit, determining an end tint level based on sunlight penetration and/or clear sky irradiance calculation, and if the light sensor reading is not between a lower limit and an upper limit, determining the end tint level based on the light sensor reading. If the current time is after the sunrise time and before the time delay after the sunrise time or the tintable window is in a demo mode, determining whether it is a cloudy condition or a not cloudy condition based on weather feed data received from one or more weather services (or other data sources) over a communication network, wherein if it is determined to be the cloudy condition, then setting the end state to a clear state and wherein if it is determined to be the not cloudy condition, then determining the end state based on a predicted sunlight penetration and/or a clear sky prediction.

Certain aspects are directed to controllers for controlling tint of a tintable window to account for occupancy comfort in a building having the tintable window, the controller comprising. The controllers comprise an interface with a communication network and a processor a processor in communication with the interface. The processor is configured to execute instructions to determine whether a current time is before a sunrise time or after a time delay after the sunrise time. If the current time is determined to be before the sunrise time or after the time delay after the sunrise time, the processor determines whether a light sensor reading received from a light sensor is between a lower limit and an upper limit, wherein if the light sensor reading is between a lower limit and an upper limit, the processor determines an end tint level based on direct sunlight penetration and/or clear sky prediction, and if the light sensor reading is not between a lower limit and an upper limit, the processor determines the end tint level based on the light sensor reading. If the current time is determined to be after the sunrise time and before the time delay after the sunrise time or the tintable window is in a demo mode, the processor determines whether it is a cloudy condition or a not cloudy condition based on weather feed data received from one or more weather services (or other data sources) over the communication network, wherein the processor determines it to be the cloudy condition, the processor sets the end state to a clear state and wherein if the processor determines it to be the not cloudy condition, then the processor determines the end state based on a predicted sunlight penetration and/or a clear sky prediction.

These and other features and embodiments will be described in more detail below with reference to the drawings.

BRIEF DESCRIPTION OF THE DRAWINGS

FIG. 7 is a flowchart showing details of Module A according to disclosed embodiments.

FIG. 8 is an example of an occupancy lookup table according to disclosed embodiments.

DETAILED DESCRIPTION

In the following description, numerous specific details are set forth in order to provide a thorough understanding of the presented embodiments. The disclosed embodiments may be practiced without some or all of these specific details. In other instances, well-known process operations have not been described in detail to not unnecessarily obscure the disclosed embodiments. While the disclosed embodiments will be described in conjunction with the specific embodiments, it will be understood that it is not intended to limit the disclosed embodiments.

I. Overview of Electrochromic Devices

It should be understood that while disclosed embodiments focus on electrochromic windows (also referred to as smart windows), the concepts disclosed herein may apply to other types of tintable windows. For example, a tintable window incorporating a liquid crystal device or a suspended particle device, instead of an electrochromic device could be incorporated in any of the disclosed embodiments.

In order to orient the reader to the embodiments of systems, window controllers, and methods disclosed herein, a brief discussion of electrochromic devices is provided. This initial discussion of electrochromic devices is provided for context only, and the subsequently described embodiments of systems, window controllers, and methods are not limited to the specific features and fabrication processes of this initial discussion.

Figure 1A:
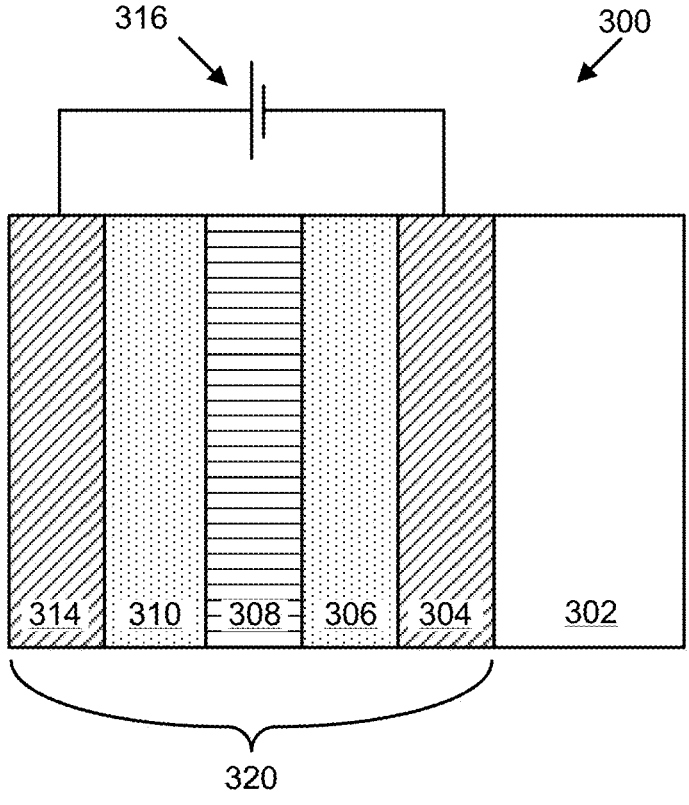
FIG. 1A depicts a schematic cross-section of an electrochromic device.

FIG. 1A schematically depicts an electrochromic device 300, in cross-section. Electrochromic device 300 includes a substrate 302, a first conductive layer (CL) 304, an electrochromic layer (EC) 306, an ion conducting layer (IC) 308, a counter electrode layer (CE) 310, and a second conductive layer (CL) 314. Layers 304, 306, 308, 310, and 314 are collectively referred to as an electrochromic stack 320. A voltage source 316 operable to apply an electric potential across electrochromic stack 320 effects the transition of the electrochromic device from, for example, a bleached state to a colored state (depicted). The order of layers can be reversed with respect to the substrate.

Electrochromic devices having distinct layers as described can be fabricated as all solid state devices and/or all inorganic devices having low defectivity. Such devices and methods of fabricating them are described in more detail in U.S. patent application Ser. No. 12/645,111, titled "Fabrication of Low-Defectivity Electrochromic Devices," filed on Dec. 22, 2009, and naming Mark Kozlowski et al. as inventors, and in U.S. patent application Ser. No. 12/645, 159, titled, "Electrochromic Devices," filed on Dec. 22, 2009 and naming Zhongchun Wang et al. as inventors, both of which are hereby incorporated by reference in their entireties. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition.

Additionally, it should be understood that the reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In embodiments described herein, the electrochromic device reversibly cycles between a bleached state and a colored state. In some cases, when the device is in a bleached state, a potential is applied to the electrochromic stack 320 such that available ions in the stack reside primarily in the counter electrode 310. When the potential on the electrochromic stack is reversed, the ions are transported across the ion conducting layer 308 to the electrochromic material 306 and cause the material to transition to the colored state. In a similar way, the electrochromic device of embodiments described herein can be reversibly cycled between different tint levels (e.g., bleached state, darkest colored state, and intermediate levels between the bleached state and the darkest colored state).

Referring again to FIG. 1A, voltage source 316 may be configured to operate in conjunction with radiant and other environmental sensors. As described herein, voltage source 316 interfaces with a device controller (not shown in this figure). Additionally, voltage source 316 may interface with an energy management system that controls the electrochromic device according to various criteria such as the time of year, time of day, and measured environmental conditions. Such an energy management system, in conjunction with large area electrochromic devices (e.g., an electrochromic window), can dramatically lower the energy consumption of a building.

Any material having suitable optical, electrical, thermal, and mechanical properties may be used as substrate 302. Such substrates include, for example, glass, plastic, and mirror materials. Suitable glasses include either clear or tinted soda lime glass, including soda lime float glass. The glass may be tempered or untempered.

In many cases, the substrate is a glass pane sized for residential window applications. The size of such glass pane can vary widely depending on the specific needs of the residence. In other cases, the substrate is architectural glass. Architectural glass is typically used in commercial buildings, but may also be used in residential buildings, and typically, though not necessarily, separates an indoor environment from an outdoor environment. In certain embodiments, architectural glass is at least 20 inches by 20 inches, and can be much larger, for example, as large as about 80 inches by 120 inches. Architectural glass is typically at least about 2 mm thick, typically between about 3 mm and about 6 mm thick. Of course, electrochromic devices are scalable to substrates smaller or larger than architectural glass. Further, the electrochromic device may be provided on a mirror of any size and shape.

On top of substrate 302 is conductive layer 304. In certain embodiments, one or both of the conductive layers 304 and 314 is inorganic and/or solid. Conductive layers 304 and 314 may be made from a number of different materials, including conductive oxides, thin metallic coatings, conductive metal nitrides, and composite conductors. Typically, conductive layers 304 and 314 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used, as well as combinations of TCOs and metallic coatings.

The function of the conductive layers is to spread an electric potential provided by voltage source 316 over surfaces of the electrochromic stack 320 to interior regions of the stack, with relatively little ohmic potential drop. The electric potential is transferred to the conductive layers though electrical connections to the conductive layers. In some embodiments, bus bars, one in contact with conductive layer 304 and one in contact with conductive layer 314, provide the electric connection between the voltage source 316 and the conductive layers 304 and 314. The conductive layers 304 and 314 may also be connected to the voltage source 316 with other conventional means.

Overlaying conductive layer 304 is electrochromic layer 306. In some embodiments, electrochromic layer 306 is inorganic and/or solid. The electrochromic layer may contain any one or more of a number of different electrochromic materials, including metal oxides. Such metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($CO_2O_3$) and the like. During operation, electrochromic layer 306 transfers ions to and receives ions from counter electrode layer 310 to cause optical transitions.

Generally, the colorization (or change in any optical property—e.g., absorbance, reflectance, and transmittance) of the electrochromic material is caused by reversible ion insertion into the material (e.g., intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions (Li+) and hydrogen ions (H+) (that is, protons). In some cases, however, other ions will be suitable. In various embodiments, lithium ions are used to produce the electrochromic phenomena. Intercalation of lithium ions into tungsten oxide ($WO_{3-y}(0<y\leq\sim0.3)$) causes the tungsten oxide to change from transparent (bleached state) to blue (colored state).

Referring again to FIG. 1A, in electrochromic stack 320, ion conducting layer 308 is sandwiched between electrochromic layer 306 and counter electrode layer 310. In some embodiments, counter electrode layer 310 is inorganic and/or solid. The counter electrode layer may comprise one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions.

In some embodiments, suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue.

When charge is removed from a counter electrode 310 made of nickel tungsten oxide (that is, ions are transported from counter electrode 310 to electrochromic layer 306), the counter electrode layer will transition from a transparent state to a colored state.

In the depicted electrochromic device, between electrochromic layer 306 and counter electrode layer 310, there is the ion conducting layer 308. Ion conducting layer 308 serves as a medium through which ions are transported (in the manner of an electrolyte) when the electrochromic device transitions between the bleached state and the colored state. Preferably, ion conducting layer 308 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain embodiments, the ion conducting layer 308 is inorganic and/or solid.

Examples of suitable ion conducting layers (for electrochromic devices having a distinct IC layer) include silicates, silicon oxides, tungsten oxides, tantalum oxides, niobium oxides, and borates. These materials may be doped with different dopants, including lithium. Lithium doped silicon oxides include lithium silicon-aluminum-oxide. In some embodiments, the ion conducting layer comprises a silicate-based structure. In some embodiments, a silicon-aluminum-oxide (SiAlO) is used for the ion conducting layer 308.

Electrochromic device 300 may include one or more additional layers (not shown), such as one or more passive layers. Passive layers used to improve certain optical properties may be included in electrochromic device 300. Passive layers for providing moisture or scratch resistance may also be included in electrochromic device 300. For example, the conductive layers may be treated with anti-reflective or protective oxide or nitride layers. Other passive layers may serve to hermetically seal electrochromic device 300.

Figure 1B:
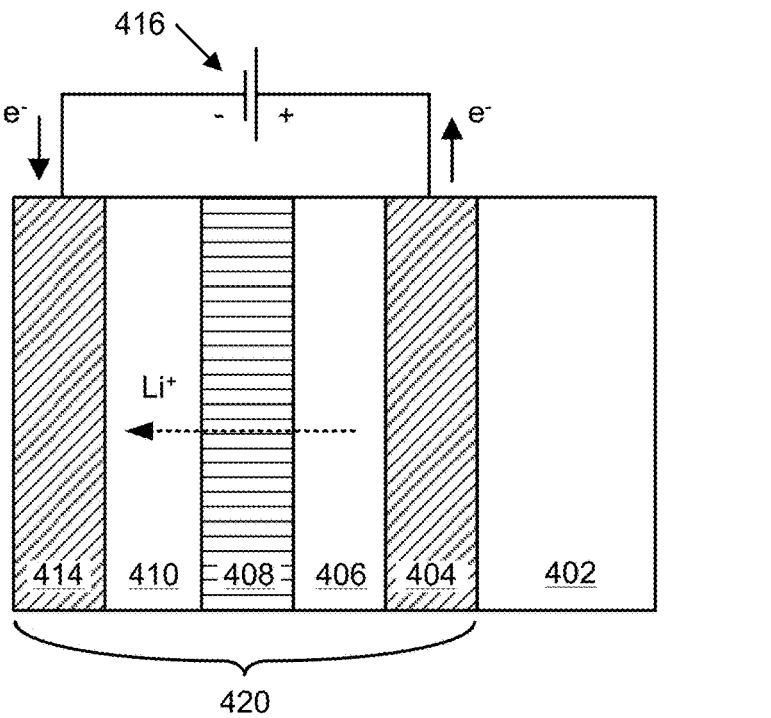
FIG. 1B depicts a schematic cross-section of an electrochromic device in a bleached state (or transitioning to a bleached state).

FIG. 1B is a schematic cross-section of an electrochromic device in a bleached state (or transitioning to a bleached state). In accordance with specific embodiments, an electrochromic device 400 includes a tungsten oxide electrochromic layer (EC) 406 and a nickel-tungsten oxide counter electrode layer (CE) 410. Electrochromic device 400 also includes a substrate 402, a conductive layer (CL) 404, an ion conducting layer (IC) 408, and conductive layer (CL) 414.

A power source 416 is configured to apply a potential and/or current to an electrochromic stack 420 through suitable connections (e.g., bus bars) to the conductive layers 404 and 414. In some embodiments, the voltage source is configured to apply a potential of a few volts in order to drive a transition of the device from one optical state to another. The polarity of the potential as shown in FIG. 1A is such that the ions (lithium ions in this example) primarily reside (as indicated by the dashed arrow) in nickel-tungsten oxide counter electrode layer 410

Figure 1C:
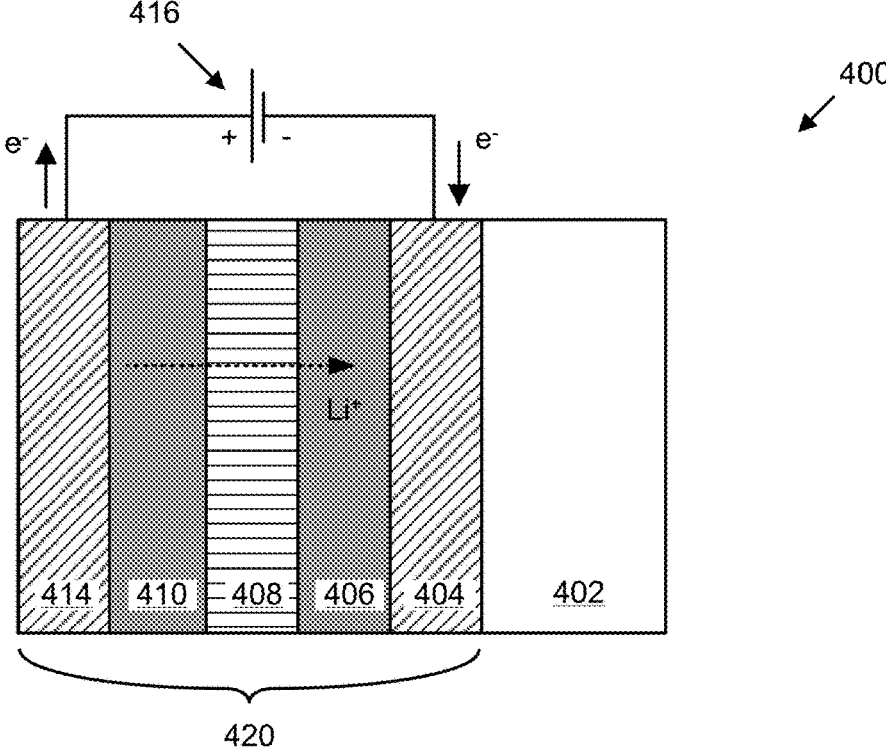
FIG. 1C depicts a schematic cross-section of the electrochromic device shown in FIG. 1B, but in a colored state (or transitioning to a colored state).

FIG. 1C is a schematic cross-section of electrochromic device 400 shown in FIG. 3B but in a colored state (or transitioning to a colored state). In FIG. 1C, the polarity of voltage source 416 is reversed, so that the electrochromic layer is made more negative to accept additional lithium ions, and thereby transition to the colored state. As indicated by the dashed arrow, lithium ions are transported across ion conducting layer 408 to tungsten oxide electrochromic layer 406. Tungsten oxide electrochromic layer 406 is shown in the colored state. Nickel-tungsten oxide counter electrode 410 is also shown in the colored state. As explained, nickel-tungsten oxide becomes progressively more opaque as it gives up (deintercalates) lithium ions. In this example, there is a synergistic effect where the transition to colored states for both layers 406 and 410 are additive toward reducing the amount of light transmitted through the stack and substrate.

As described above, an electrochromic device may include an electrochromic (EC) electrode layer and a counter electrode (CE) layer separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain embodiments, the counter electrode and electrochromic electrodes are formed immediately adjacent one another, sometimes in direct contact, without separately depositing an ionically conducting layer. In some embodiments, electrochromic devices having an interfacial region rather than a distinct IC layer are employed. Such devices, and methods of fabricating them, are described in U.S. Pat. Nos. 8,300,298, 8,582,193, 8,764, 950, and 8,764,951—each of the patents is titled "Electrochromic Devices," each names Zhongchun Wang et al. as inventors, and each is incorporated by reference herein in its entirety.

In certain embodiments, an electrochromic device may be integrated into an insulated glass unit (IGU) of an electrochromic window or may be in a single pane electrochromic window. For example, an electrochromic window may have an IGU including a first electrochromic lite and a second lite. The IGU also includes a spacer separating the first electrochromic lite and the second lite. The second lite in the IGU may be a non-electrochromic lite or otherwise. For example, the second lite may have an electrochromic device thereon and/or one or more coatings such as low-E coatings and the like. Either of the lites can also be laminated glass. Between the spacer and the first TCO layer of the electrochromic lite is a primary seal material. This primary seal material is also between spacer and second glass lite. Around the perimeter of spacer is a secondary seal. These seals aid in keeping moisture out of the interior space of the IGU. They also serve to prevent argon or other gas that may be introduced into the interior space of the IGU from escaping. The IGU also includes bus bar wiring for connection to a window controller. In some embodiments, one or both of the bus bars are inside the finished IGU, however in one embodiment one bus bar is outside the seal of the IGU and one bus bar is inside the IGU. In the former embodiment, an area is used to make the seal with one face of the spacer used to form the IGU. Thus, the wires or other connection to the bus bars runs between the spacer and the glass. As many spacers are made of metal, e.g., stainless steel, which is conductive, it is desirable to take steps to avoid short circuiting due to electrical communication between the bus bar and connector thereto and the metal spacer.

II. Window Controllers

A window controller is used to control the tint level of the electrochromic device of an electrochromic window. In some embodiments, the window controller is able to transition the electrochromic window between two tint states (levels), a bleached state and a colored state. In other embodiments, the controller can additionally transition the electrochromic window (e.g., having a single electrochromic device) to intermediate tint levels. In some disclosed embodiments, the window controller is able to transition the electrochromic window to four or more tint levels. Certain electrochromic windows allow intermediate tint levels by using two (or more) electrochromic lites in a single IGU, where each lite is a two-state lite. This is described in reference to FIGS. 1A and 1B in this section.

In some embodiments, an electrochromic window can include an electrochromic device 300 on one lite of an IGU and another electrochromic device 300 on the other lite of the IGU. If the window controller is able to transition each electrochromic device between two states, a bleached state and a colored state, the electrochromic window is able to attain four different states (tint levels), a colored state with both electrochromic devices being colored, a first intermediate state with one electrochromic device being colored, a second intermediate state with the other electrochromic device being colored, and a bleached state with both electrochromic devices being bleached. Embodiments of multi-pane electrochromic windows are further described in U.S. Pat. No. 8,270,059, naming Robin Friedman et al. as inventors, titled "MULTI-PANE ELECTROCHROMIC WINDOWS," which is hereby incorporated by reference in its entirety.

In some embodiments, the window controller is able to transition an electrochromic window having an electrochromic device capable of transitioning between two or more tint levels. For example, a window controller may be able to transition the electrochromic window to a bleached state, one or more intermediate levels, and a colored state. In some other embodiments, the window controller is able to transition an electrochromic window incorporating an electrochromic device between any number of tint levels between the bleached state and the colored state. Embodiments of methods and controllers for transitioning an electrochromic window to an intermediate tint level or levels are further described in U.S. Pat. No. 8,254,013, naming Disha Mehtani et al. as inventors, titled "CONTROLLING TRANSITIONS IN OPTICALLY SWITCHABLE DEVICES," which is hereby incorporated by reference in its entirety.

In some embodiments, a window controller can power one or more electrochromic devices in an electrochromic window. Typically, this function of the window controller is augmented with one or more other functions described in more detail below. Window controllers described herein are not limited to those that have the function of powering an electrochromic device to which it is associated for the purposes of control. That is, the power source for the electrochromic window may be separate from the window controller, where the controller has its own power source and directs application of power from the window power source to the window. However, it is convenient to include a power source with the window controller and to configure the controller to power the window directly, because it obviates the need for separate wiring for powering the electrochromic window.

Further, the window controllers described in this section are described as standalone controllers which may be configured to control the functions of a single window or a plurality of electrochromic windows, without integration of the window controller into a building control network or a building management system (BMS). Window controllers, however, may be integrated into a building control network or a BMS, as described further in the Building Management System section of this disclosure.

Figure 2:
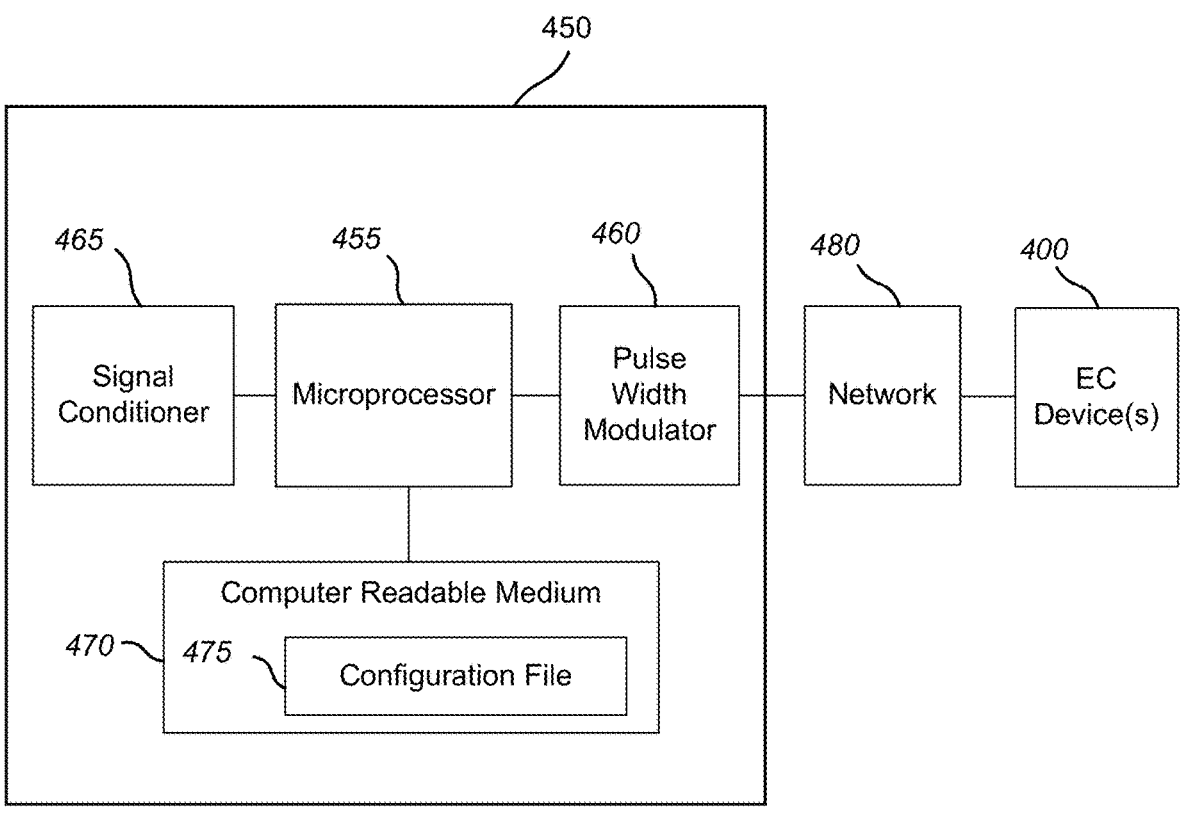
FIG. 2 depicts a simplified block diagram of components of a window controller.

FIG. 2 depicts a block diagram of some components of a window controller 450 and other components of a window controller system of disclosed embodiments. FIG. 2 is a simplified block diagram of a window controller, and more detail regarding window controllers can be found in U.S. patent application Ser. Nos. 13/449,248 and 13/449,251, both naming Stephen Brown as inventor, both titled "CONTROLLER FOR OPTICALLY-SWITCHABLE WINDOWS," and both filed on Apr. 17, 2012, and in U.S. patent Ser. No. 13/449,235, titled "CONTROLLING TRANSITIONS IN OPTICALLY SWITCHABLE DEVICES," naming Stephen Brown et al. as inventors and filed on Apr. 17, 2012, all of which are hereby incorporated by reference in their entireties.

In FIG. 2, the illustrated components of the window controller 450 include a window controller 450 having a microprocessor 455 or other processor, a pulse width modulator 460, a signal conditioning module 465, and a computer readable medium (e.g., memory) having a configuration file 475. Window controller 450 is in electronic communication with one or more electrochromic devices 400 in an electrochromic window through network 480 (wired or wireless) to send instructions to the one or more electrochromic devices 400. In some embodiments, the window controller 450 may be a local window controller in communication through a network (wired or wireless) to a master window controller.

In disclosed embodiments, a building may have at least one room having an electrochromic window between the exterior and interior of a building. One or more sensors may be located to the exterior of the building and/or inside the room. In embodiments, the output from the one or more sensors may be input to the signal conditioning module 465 of the window controller 450. In some cases, the output from the one or more sensors may be input to a BMS, as described further in the Building Management Systems section. Although the sensors of depicted embodiments are shown as located on the outside vertical wall of the building, this is for the sake of simplicity, and the sensors may be in other locations, such as inside the room or on other surfaces to the exterior, as well. In some cases, two or more sensors may be used to measure the same input, which can provide redundancy in case one sensor fails or has an otherwise erroneous reading.

Figure 3:
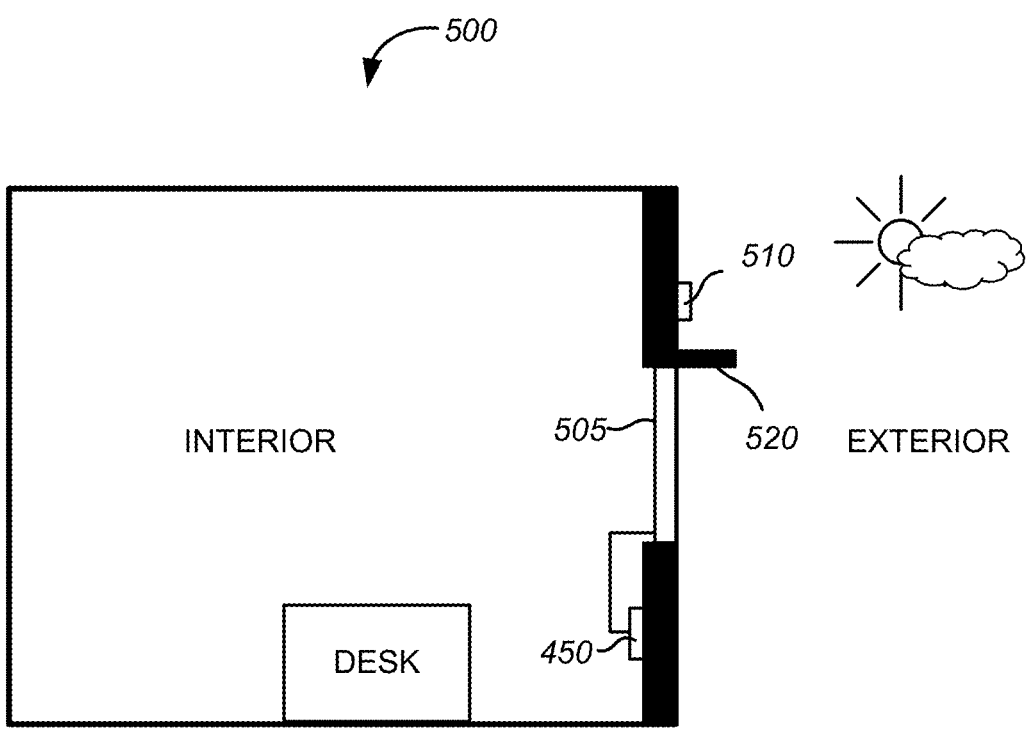
FIG. 3 depicts a schematic diagram of a room including a tintable window and at least one sensor, according to disclosed embodiments.

FIG. 3 depicts a schematic (side view) diagram of a room 500 having an electrochromic window 505 with at least one electrochromic device. The electrochromic window 505 is located between the exterior and the interior of a building, which includes the room 500. The room 500 also includes a window controller 450 connected to and configured to control the tint level of the electrochromic window 505. An exterior sensor 510 is located on a vertical surface in the exterior of the building. In other embodiments, an interior sensor may also be used to measure the ambient light in room 500. In yet other embodiments, an occupant sensor may also be used to determine when an occupant is in the room 500.

Exterior sensor 510 is a device, such as a photosensor, that is able to detect radiant light incident upon the device flowing from a light source such as the sun or from light reflected to the sensor from a surface, particles in the atmosphere, clouds, etc. The exterior sensor 510 may generate a signal in the form of electrical current that results from the photoelectric effect and the signal may be a function of the light incident on the sensor 510. In some cases, the device may detect radiant light in terms of irradiance in units of watts/$m^2$ or other similar units. In other cases, the device may detect light in the visible range of wavelengths in units of foot candles or similar units. In many cases, there is a linear relationship between these values of irradiance and visible light.

Irradiance values from sunlight can be determined based on the time of day and time of year as the angle at which sunlight strikes the earth changes. Exterior sensor 510 can detect radiant light in real-time, which accounts for reflected and obstructed light due to buildings, changes in weather (e.g., clouds), etc. For example, on cloudy days, sunlight would be blocked by the clouds and the radiant light detected by an exterior sensor 510 would be lower than on cloudless days.

In some embodiments, there may be one or more exterior sensors 510 associated with a single electrochromic window 505. Output from the one or more exterior sensors 510 could be compared to one another to determine, for example, if one of exterior sensors 510 is shaded by an object, such as by a bird that landed on exterior sensor 510. In some cases, it may be desirable to use relatively few sensors in a building because some sensors can be unreliable and/or expensive. In certain implementations, a single sensor or a few sensors may be employed to determine the current level of radiant light from the sun impinging on the building or perhaps one side of the building. A cloud may pass in front of the sun or a construction vehicle may park in front of the setting sun. These will result in deviations from the amount of radiant light from the sun calculated to normally impinge on the building.

Exterior sensor 510 may be a type of photosensor. For example, exterior sensor 510 may be a charge coupled device (CCD), photodiode, photoresistor, or photovoltaic cell. One of ordinary skill in the art would appreciate that future developments in photosensor and other sensor technology would also work, as they measure light intensity and provide an electrical output representative of the light level.

In some embodiments, output from exterior sensor 510 may be input to the signal conditioning module 465. The input may be in the form of a voltage signal to signal conditioning module 465. Signal conditioning module 465 passes an output signal to the window controller 450. Window controller 450 determines a tint level of the electrochromic window 505, based on various information from the configuration file 475, output from the signal conditioning module 465, override values. Window controller 450 and then instructs the PWM 460, to apply a voltage and/or current to electrochromic window 505 to transition to the desired tint level.

In disclosed embodiments, window controller 450 can instruct the PWM 460, to apply a voltage and/or current to electrochromic window 505 to transition it to any one of four or more different tint levels. In disclosed embodiments, electrochromic window 505 can be transitioned to at least eight different tint levels described as: 0 (lightest), 5, 10, 15, 20, 25, 30, and 35 (darkest). The tint levels may linearly correspond to visual transmittance values and solar heat gain coefficient (SHGC) values of light transmitted through the electrochromic window 505. For example, using the above eight tint levels, the lightest tint level of 0 may correspond to an SHGC value of 0.80, the tint level of 5 may correspond to an SHGC value of 0.70, the tint level of 10 may correspond to an SHGC value of 0.60, the tint level of 15 may correspond to an SHGC value of 0.50, the tint level of 20 may correspond to an SHGC value of 0.40, the tint level of 25 may correspond to an SHGC value of 0.30, the tint level of 30 may correspond to an SHGC value of 0.20, and the tint level of 35 (darkest) may correspond to an SHGC value of 0.10.

Window controller 450 or a master controller in communication with the window controller 450 may employ any one or more control logic components to determine a desired tint level based on signals from the exterior sensor 510 and/or other input. The window controller 450 can instruct the PWM 460 to apply a voltage and/or current to electrochromic window 505 to transition it to the desired tint level.

III. Introduction to Control Logic

Figure 4A:
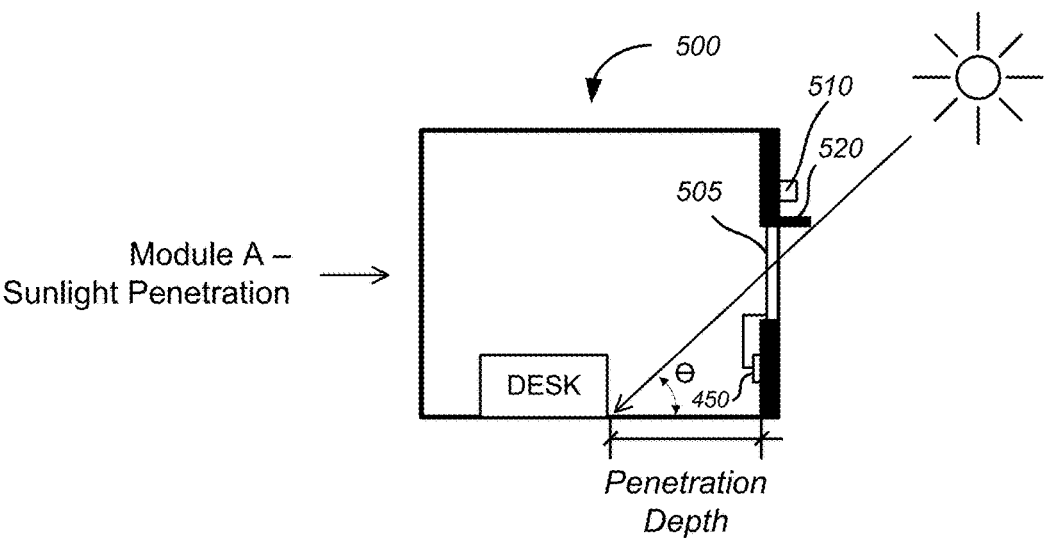
FIGS. 4A-4C include diagrams depicting information collected by each of three Modules A, B, and C of an exemplary control logic, according to disclosed embodiments.
Figure 4B:
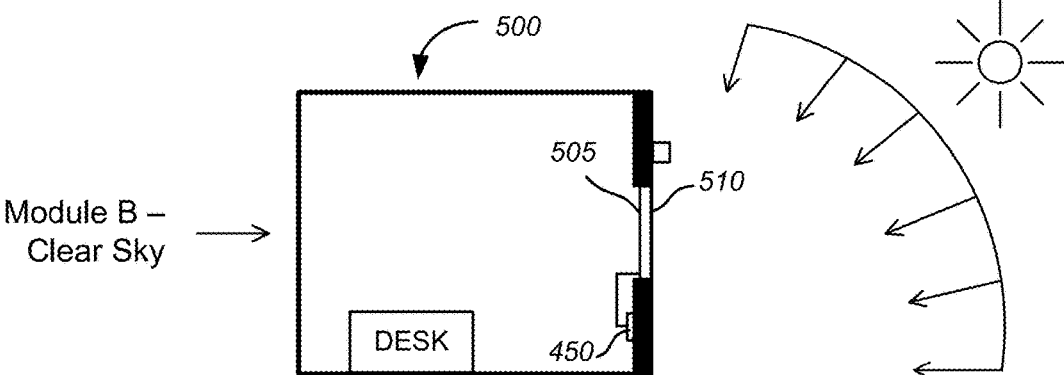
Figure 4C:
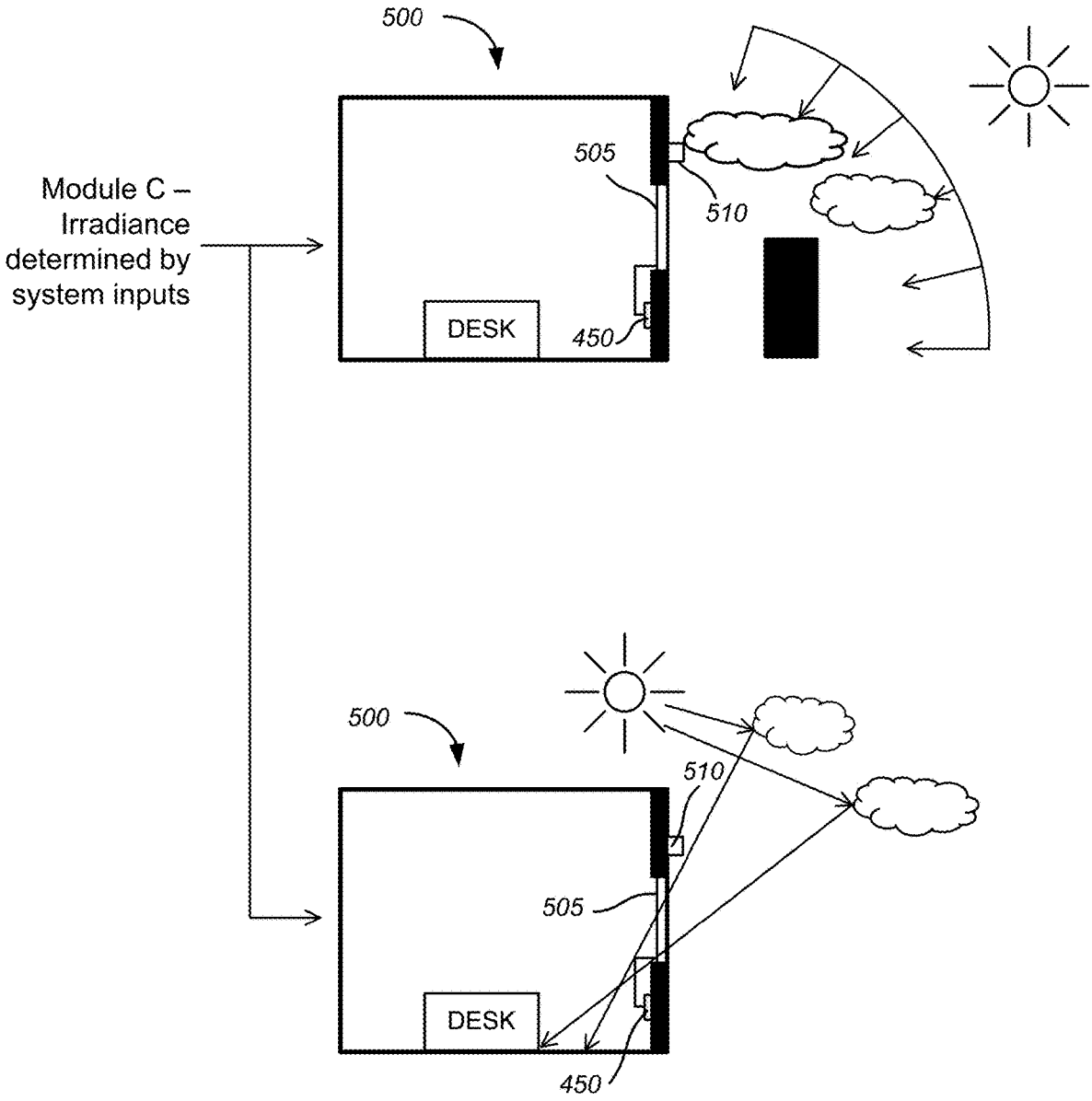

In disclosed embodiments, control logic is used to implement methods for determining and controlling a desired tint level for an electrochromic window or other tintable window that accounts for occupant comfort and/or energy conservation considerations. In some cases, the control logic employs one or more logic modules. FIGS. 4A-4C include diagrams depicting some general information collected by each of three logic Modules A, B, and C of an exemplary control logic of disclosed embodiments.

FIG. 4A shows the penetration depth of direct sunlight into a room 500 through an electrochromic window 505 between the exterior and the interior of a building, which includes the room 500. Penetration depth is a measure of how far direct sunlight will penetrate into the room 500. As shown, penetration depth is measured in a horizontal direction away from the sill (bottom) of window 505. Generally, the window defines an aperture that provides an acceptance angle for direct sunlight. The penetration depth is calculated based upon the geometry of the window (e.g., window dimensions), its position and orientation in the room, any fins or other exterior shading outside of the window, and the position of the sun (e.g. angle of direct sunlight for a particular time of day and date). Exterior shading to an electrochromic window 505 may be due to any type of structure that can shade the window such as an overhang, a fin, etc. In FIG. 4A, there is an overhang 520 above the electrochromic window 505 that blocks a portion of the direct sunlight entering the room 500 thus shortening the penetration depth. The room 500 also includes a local window controller 450 connected to and configured to control the tint level of the electrochromic window 505. An exterior sensor 510 is located on a vertical surface in the exterior of the building.

Module A can be used to determine a tint level that considers occupant comfort from direct sunlight through the electrochromic window 505 onto an occupant or their activity area. The tint level is determined based on a calculated penetration depth of direct sunlight into the room and the space type (e.g., desk near window, lobby, etc.) in the room at a particular instant in time. In some cases, the tint level may also be based on providing sufficient natural lighting into the room. In many cases, the penetration depth is the value calculated at a time in the future to account for glass transition time (the time required for the window to tint, e.g. to 80%, 90% or 100% of the desired tint level). The issue addressed in Module A is that direct sunlight may penetrate so deeply into the room 500 as to show directly on an occupant working at a desk or other work surface in a room. Publicly available programs can provide calculation of the sun's position and allow for easy calculation of penetration depth.

FIG. 4A also shows a desk in the room 500 as an example of a space type associated with an activity area (i.e. desk) and location of the activity area (i.e. location of desk). Each space type is associated with different tint levels for occupant comfort. For example, if the activity is a critical activity such as work in an office being done at a desk or computer, and the desk is located near the window, the desired tint level may be higher than if the desk were further away from the window. As another example, if the activity is non-critical, such as the activity in a lobby, the desired tint level may be lower than for the same space having a desk.

FIG. 4B shows direct sunlight and radiation under clear sky conditions entering the room 500 through the electrochromic window 505. The radiation may be from sunlight scattered by molecules and particles in the atmosphere. Module B determines a tint level based on calculated values of irradiance under clear sky conditions flowing through the electrochromic window 505 under consideration. Various software, such as open source RADIANCE program, can be used to calculate clear sky irradiance at a certain latitude, longitude, time of year, and time of day, and for a given window orientation.

FIG. 4C shows radiant light from the sky that is measured in real-time by an exterior sensor 510 to account for light that may be obstructed by or reflected from objects such as buildings or weather conditions (e.g., clouds) that are not accounted for in the clear sky radiation determinations. The tint level determined by Module C is based on the real-time irradiance based on measurements taken by the exterior sensor 510. Generally, the operations of Module B will determine a tint level that darkens (or does not change) the tint level determined by Module A and the operations of Module C will determine a tint level that lightens (or does not change) the tint level determined by Module B.

The control logic may implement one or more of the logic Modules A, B and C separately for each electrochromic window 505 in the building. Each electrochromic window 505 can have a unique set of dimensions, orientation (e.g., vertical, horizontal, tilted at an angle), position, associated space type, etc. A configuration file with this information and other information can be maintained for each electrochromic window 505. The configuration file 475 (refer to FIG. 2) may be stored in the computer readable medium 470 of the local window controller 450 of the electrochromic window 505 or in the building management system ("BMS") described later in this disclosure. The configuration file 475 can include information such as a window configuration, an occupancy lookup table, information about an associated datum glass, and/or other data used by the control logic. The window configuration may include information such as the dimensions of the electrochromic window 505, the orientation of the electrochromic window 505, the position of the electrochromic window 505, etc.

A lookup table describes tint levels that provide occupant comfort for certain space types and penetration depths. That is, the tint levels in the occupancy lookup table are designed to provide comfort to occupant(s) that may be in the room 500 from direct sunlight on the occupant(s) or their workspace. An example of an occupancy lookup table is shown in FIG. 8.

The space type is a measure to determine how much tinting will be required to address occupant comfort concerns for a given penetration depth and/or provide comfortable natural lighting in the room. The space type parameter may take into consideration many factors. Among these factors is the type of work or other activity being conducted in a particular room and the location of the activity. Close work associated with detailed study requiring great attention might be at one space type, while a lounge or a conference room might have a different space type. Additionally, the position of the desk or other work surface in the room with respect to the window is a consideration in defining the space type. For example, the space type may be associated with an office of a single occupant having a desk or other workspace located near the electrochromic window 505. As another example, the space type may be a lobby.

In certain embodiments, one or more modules of the control logic can determine desired tint levels while accounting for energy conservation in addition to occupant comfort. These modules may determine energy savings associated with a particular tint level by comparing the performance of the electrochromic window 505 at that tint level to a datum glass or other standard reference window. The purpose of using this reference window can be to ensure that the control logic conforms to requirements of the municipal building code or other requirements for reference windows used in the locale of the building. Often municipalities define reference windows using conventional low emissivity glass to control the amount of air conditioning load in the building. As an example of how the reference window 505 fits into the control logic, the logic may be designed so that the irradiance coming through a given electrochromic window 505 is never greater than the maximum irradiance coming through a reference window as specified by the respective municipality. In disclosed embodiments, control logic may use the solar heat gain coefficient (SHGC) value of the electrochromic window 505 at a particular tint level and the SHGC of the reference window to determine the energy savings of using the tint level. Generally, the value of the SHGC is the fraction of incident light of all wavelengths transmitted through the window. Although a datum glass is described in many embodiments, other standard reference windows can be used. Generally the SHGC of the reference window (e.g., datum glass) is a variable that can be different for different geographical locations and window orientations, and is based on code requirements specified by the respective municipality.

Generally, buildings are designed to have a heating, ventilation, and air conditioning ("HVAC") system with the capacity to fulfill the maximum expected heating and/or air-conditioning loads required at any given instance. The calculation of required capacity may take into consideration the datum glass or reference window required in a building at the particular location where the building is being constructed. Therefore, it is important that the control logic meet or exceed the functional requirements of the datum glass in order to allow building designers to confidently determine how much HVAC capacity to put into a particular building. Since the control logic can be used to tint the window to provide additional energy savings over the datum glass, the control logic could be useful in allowing building designers to have a lower HVAC capacity than would have been required using the datum glass specified by the codes and standards.

Particular embodiments described herein assume that energy conservation is achieved by reducing air conditioning load in a building. Therefore, many of the implementations attempt to achieve the maximum tinting possible, while accounting for occupant comfort level and perhaps lighting load in a room having with the window under consideration. However, in some climates, such as those at far northern and for southern latitudes, heating may be more of a concern than air conditioning. Therefore, the control logic can be modified, specifically, road reversed in some matters, so that less tinting occurs in order to ensure that the heating load of the building is reduced.

In certain implementations, the control logic has only two independent variables that can be controlled by an occupant (end user), building designer, or building operator. These are the space types for a given window and the datum glass associated with the given window. Often the datum glass is specified when the control logic is implemented for a given building. The space type can vary, but is typically static. In certain implementations, the space type may be part of the configuration file maintained by the building or stored in the local window controller 450. In some cases, the configuration file may be updated to account for various changes in the building. For example, if there is a change in the space type (e.g., desk moved in an office, addition of desk, lobby changed into office area, wall moved, etc.) in the building, an updated configuration file with a modified occupancy lookup table may be stored in the computer readable medium 470. As another example, if an occupant is hitting manual override repeatedly, then the configuration file may be updated to reflect the manual override.

Figure 5:
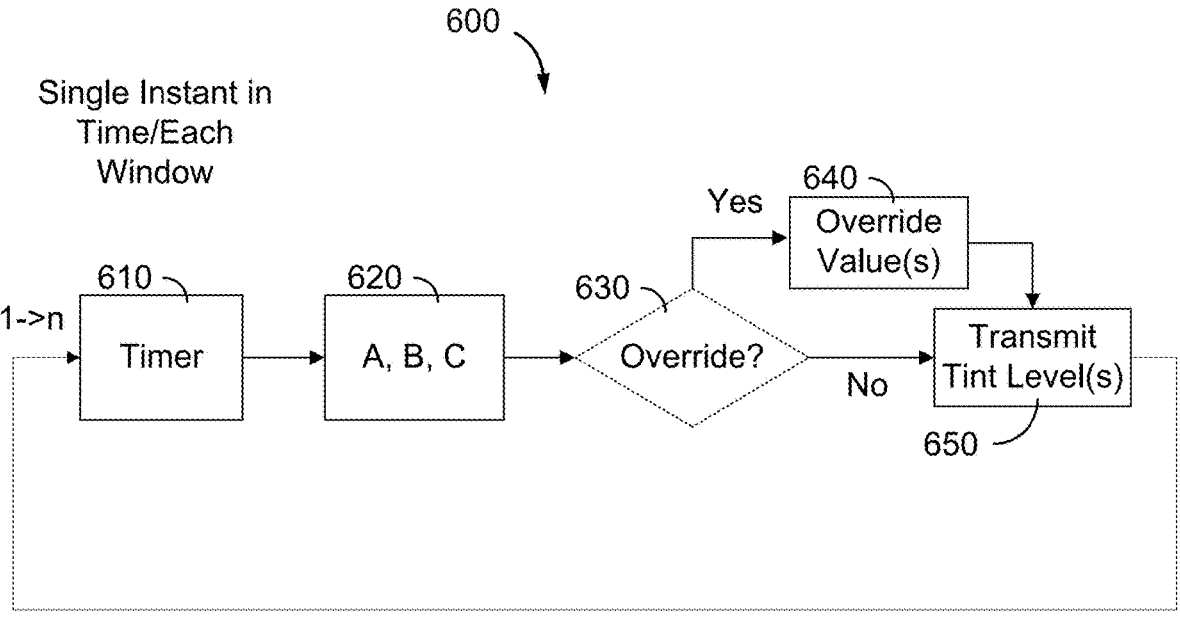
FIG. 5 is a flowchart showing some operations of control logic for a method of controlling one or more electrochromic windows in a building, according to disclosed embodiments.

FIG. 5 is a flowchart showing control logic for a method of controlling one or more electrochromic windows 505 in a building, according to embodiments. The control logic uses one or more of the Modules A, B, and C to calculate tint levels for the window(s) and sends instructions to transition the window(s). The calculations in the control logic are run 1 to n times at intervals timed by the timer at operation 610. For example, the tint level can be recalculated 1 to n times by one or more of the Modules A, B, and C and calculated for instances in time $t_i = t_1, t_2 \ldots t_n$. n is the number of recalculations performed and n can be at least 1. The logic calculations can be done at constant time intervals in some cases. In one cases, the logic calculations may be done every 2 to 5 minutes. However, tint transition for large pieces of electrochromic glass (e.g. up to 6'×10 feet) can take up to 30 minutes or more. For these large windows, calculations may be done on a less frequent basis such as every 30 minutes.

At operation 620, logic Modules A, B, and C perform calculations to determine a tint level for each electrochromic window 505 at a single instant in time $t_i$. These calculations can be performed by the window controller 450. In certain embodiments, the control logic calculates how the window should transition in advance of the actual transition. In these cases, the calculations in Modules A, B, and C are based on a future time, for example, around or after transition is complete. For example, the future time used in the calculations may be a time in the future that is sufficient to allow the transition to be completed after receiving the tint instructions. In these cases, the controller can send tint instructions in the present time in advance of the actual transition. By the completion of the transition, the window will have transitioned to a tint level that is desired for that time.

At operation 630, the control logic allows for certain types of overrides that disengage the algorithm at Modules A, B, and C and define override tint levels at operation 640 based on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the control logic described herein to ensure that all windows have a particularly high level of tinting. Another example of an override may be if there is no occupant in the room example weekends in a commercial office building. In these cases, the building may disengage one or more Modules that relate to occupant comfort and all the windows may have a low level of tinting in cold weather and high level of tinting in warm weather.

At operation 650, the tint levels are transmitted over a network to electrochromic device(s) in one or more electrochromic windows 505 in the building. In certain embodiments, the transmission of tint levels to all windows of a building may be implemented with efficiency in mind. For example, if the recalculation of tint level suggests that no change in tint from the current tint level is required, then there is no transmission of instructions with an updated tint level. As another example, the building may be divided into zones based on window size and/or location in the building. In one case, control logic recalculates tint levels for zones with smaller windows more frequently than for zones with larger windows.

In some embodiments, the control logic in FIG. 5 for implementing the control method(s) for multiple electrochromic windows in an entire building can be on a single device, for example, a single master window controller. This device can perform the calculations for each and every tintable window in the building and also provide an interface for transmitting tint levels to one or more electrochromic devices in individual electrochromic windows 505, for example, in multi-zone windows or on multiple EC lites of an insulated glass unit. Some examples of multi-zone windows can be found in PCT application No. PCT/US14/71314 titled "MULTI-ZONE EC WINDOWS," which is hereby incorporated by reference in its entirety.

Also, there may be certain adaptive components of the control logic of embodiments. For example, the control logic may determine how an end user (e.g. occupant) tries to override the algorithm at particular times of day and makes use of this information in a more predictive manner to determine desired tint levels. In one case, the end user may be using a wall switch to override the tint level provided by the control logic at a certain time each day to an override value. The control logic may receive information about these instances and change the control logic to change the tint level to the override value at that time of day.

Figure 6:
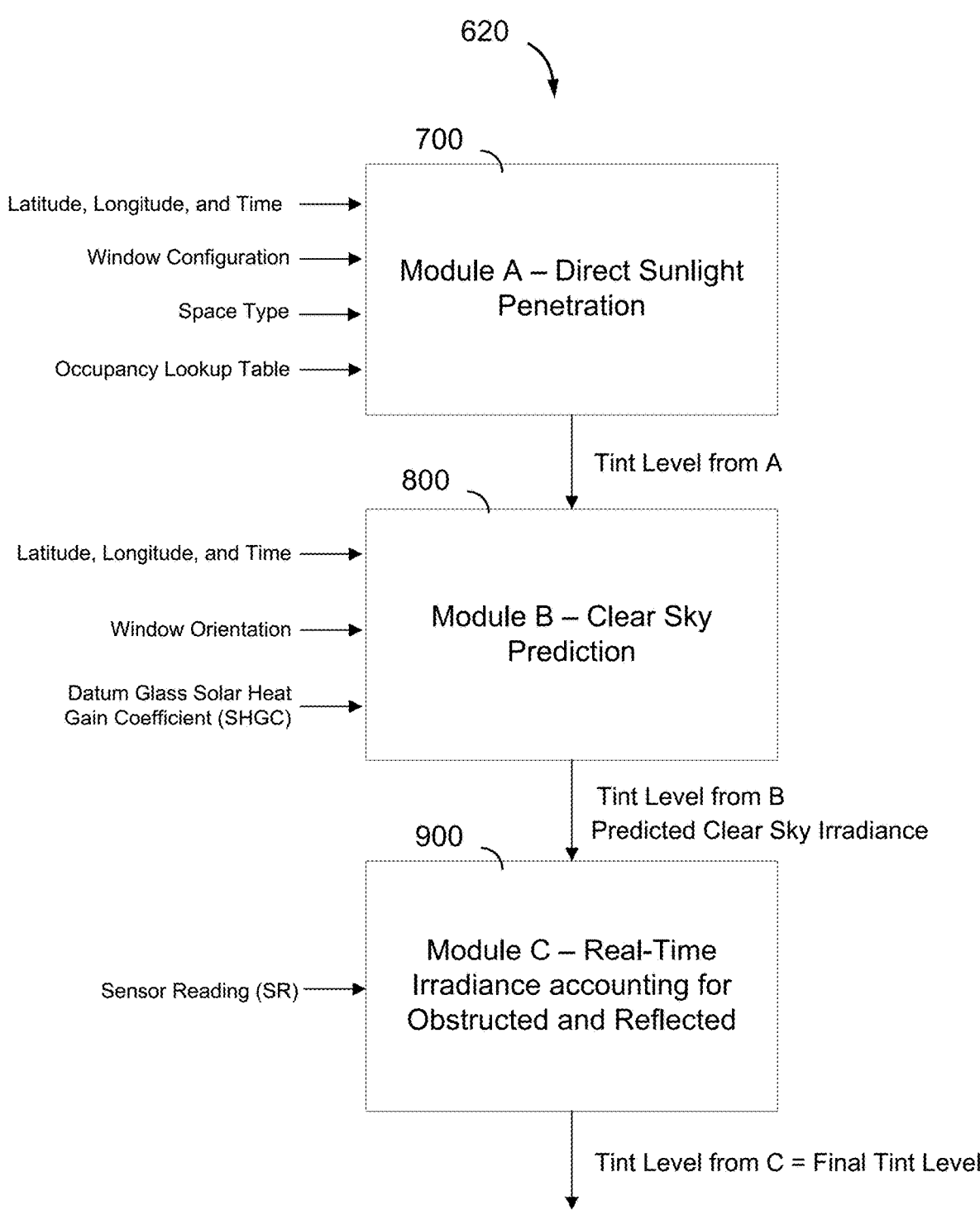
FIG. 6 is a flowchart showing a particular implementation of a portion of the control logic shown in FIG. 5.

FIG. 6 is a diagram showing a particular implementation of block 620 from FIG. 5. This diagram shows a method of performing all three Modules A, B, and C in sequence to calculate a final tint level of a particular electrochromic window 505 for a single instant in time $t_i$. The final tint level may be the maximum permissible transmissivity of the window under consideration. FIG. 6 also includes some exemplary inputs and outputs of Modules A, B, and C. The calculations in Modules A, B, and C are performed by window controller 450 in local window controller 450 in embodiments. In other embodiments, one or more of the modules can be performed by another processor. Although illustrated embodiments show all three Modules A, B, and C being used, other embodiments may use one or more of the Modules A, B, and C or may use additional modules.

At operation 700, window controller 450 uses Module A to determine a tint level for occupant comfort to prevent direct glare from sunlight penetrating the room 500. Window controller 450 uses Module A to calculate the penetration depth of direct sunlight into the room 500 based on the sun's position in the sky and the window configuration from the configuration file. The position of the sun is calculated based on the latitude and longitude of the building and the time of day and date. The occupancy lookup table and space type are input from a configuration file for the particular window. Module A outputs the Tint level from A to Module B.

The goal of Module A is generally to ensure that direct sunlight or glare does not strike the occupant or his or her workspace. The tint level from Module A is determined to accomplish this purpose. Subsequent calculations of tint level in Modules B and C can reduce energy consumption and may require even greater tint. However, if subsequent calculations of tint level based on energy consumption suggest less tinting than required to avoid interfering with the occupant, the logic prevents the calculated greater level of transmissivity from being executed to assure occupant comfort.

At operation 800, the tint level calculated in Module A is input into Module B. Generally Module B determines a tint level that darkens (or does not change) the tint level calculated in Module B. A tint level is calculated based on calculations of irradiance under clear sky conditions (clear sky irradiance). Window controller 450 uses Module B to calculate clear sky irradiance for the electrochromic window 505 based on window orientation from the configuration file and based on latitude and longitude of the building. These calculations are also based on a time of day and date. Publicly available software such as the RADIANCE program, which is an open-source program, can provide the calculations for calculating clear sky irradiance. The SHGC of the datum glass is also input into Module B from the configuration file. Window controller 450 uses Module B to determine a tint level that is darker than the tint level in A and transmits less heat than the datum glass is calculated to transmit under maximum clear sky irradiance. Maximum clear sky irradiance is the highest level of irradiance for all times calculated for clear sky conditions.

At operation 900, a tint level from Module B and calculated clear sky irradiance are input to Module C. Real-time irradiance values are input to Module C based on measurements from an exterior sensor 510. Window controller 450 uses Module C to calculate irradiance transmitted into the room if the window were tinted to the Tint level from Module B under clear sky conditions. Window controller 450 uses Module C to find the appropriate tint level where the actual irradiance through the window with this tint level is less than or equal to the irradiance through the window with the Tint level from Module B. Generally the operations of Module C will determine a tint level that lightens (or does not change) the tint level determined by the operations of Module B. The tint level determined in Module C is the final tint level in this example.

Much of the information input to the control logic is determined from fixed information about the latitude and longitude, time and date. This information describes where the sun is with respect to the building, and more particularly with respect to the window for which the control logic is being implemented. The position of the sun with respect to the window provides information such as the penetration depth of direct sunlight into the room assisted with the window. It also provides an indication of the maximum irradiance or solar radiant energy flux coming through the window. This calculated level of irradiance can be modified by sensor input which might indicate that there is a reduction from the maximum amount of irradiance. Again, such reduction might be caused by a cloud or other obstruction between the window and the sun.

FIG. 7 is a flowchart showing details of operation 700 of FIG. 6. At operation 705, Module A begins. At operation 710, the window controller 450 uses Module A to calculate the position of the sun for the latitude and longitude coordinates of the building and the date and time of day of a particular instant in time, $t_i$. The latitude and longitude coordinates may be input from the configuration file. The date and time of day may be based on the current time provided by the timer. The sun position is calculated at the particular instant in time, $t_i$, which may be in the future in some cases. In other embodiments, the position of the sun is calculated in another component (e.g., module) of the control logic.

At operation 720, window controller 450 uses Module A to calculate the penetration depth of direct sunlight into the room 500 at the particular instant in time used in operation 710. Module A calculates the penetration depth based on the calculated position of the sun and window configuration information including the position of the window, dimensions of the window, orientation of the window (i.e. direction facing), and the details of any exterior shading. The window configuration information is input from the configuration file associated with the electrochromic window 505. For example, Module A can be used to calculate the penetration depth of the vertical window shown in FIG. 4A by first calculating the angle θ of the direct sunlight based on the position of the sun calculated at the particular instant in time. The penetration depth can be determined based on calculated angle θ and the location of the lintel (top of the window).

At operation 730, a tint level is determined that will provide occupant comfort for the penetration depth calculated in operation 720. The occupancy lookup table is used to find a desired tint level for the space type associated with the window, for the calculated penetration depth, and for the acceptance angle of the window. The space type and occupancy lookup table are provided as input from the configuration file for the particular window.

An example of an occupancy lookup table is provided in FIG. 8. The values in the table are in terms of a Tint level and associated SHGC values in parenthesis. FIG. 8 shows the different tint levels (SHGC values) for different combinations of calculated penetration values and space types. The table is based on eight tint levels including 0 (lightest), 5, 10, 15, 20, 25, 30, and 35 (lightest). The lightest tint level of 0 corresponds to an SHGC value of 0.80, the tint level of 5 corresponds to an SHGC value of 0.70, the tint level of 10 corresponds to an SHGC value of 0.60, the tint level of 15 corresponds to an SHGC value of 0.50, the tint level of 20 corresponds to an SHGC value of 0.40, the tint level of 25 corresponds to an SHGC value of 0.30, the tint level of 30 corresponds to an SHGC value of 0.20, and the tint level of 35 (darkest) corresponds to an SHGC value of 0.10. The illustrated example includes three space types: Desk 1, Desk 2, and Lobby and six penetration depths.

Figure 9A:
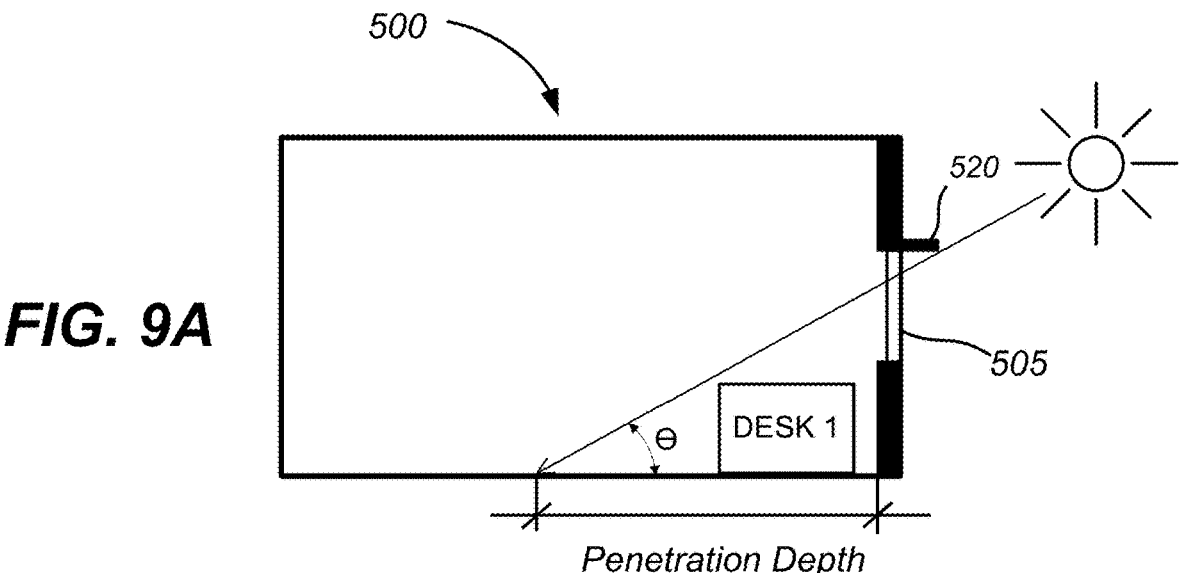
FIG. 9A depicts a schematic diagram of a room including an electrochromic window with a space type based on a Desk 1 located near the window, according to disclosed embodiments.
Figure 9B:
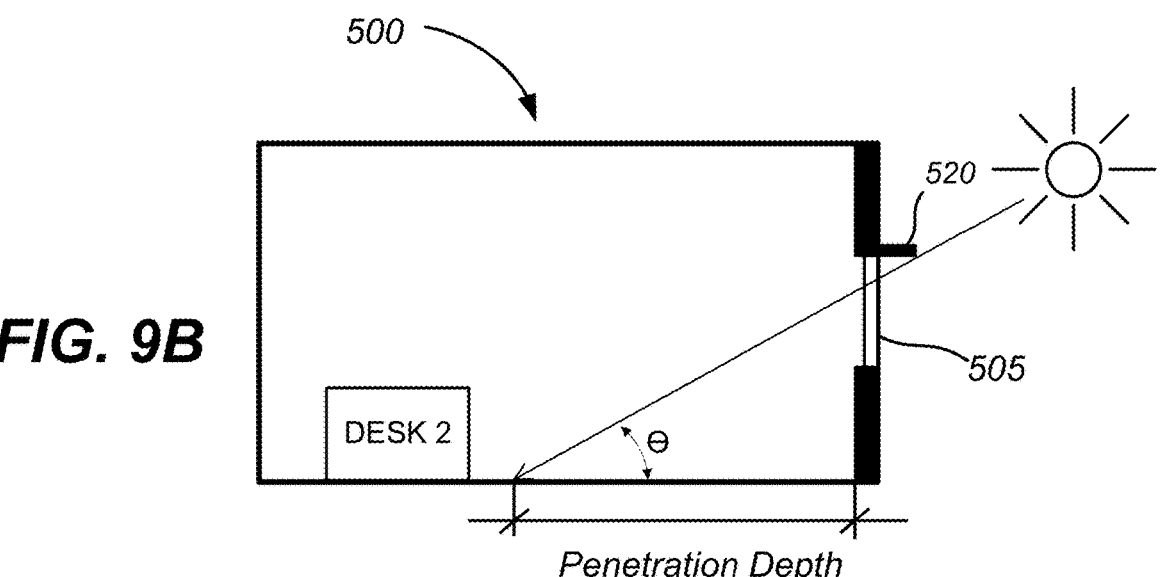
FIG. 9B depicts a schematic diagram of a room including an electrochromic window with a space type based on a Desk 2 located further away from the window than in FIG. 9A, according to disclosed embodiments.
Figure 13:
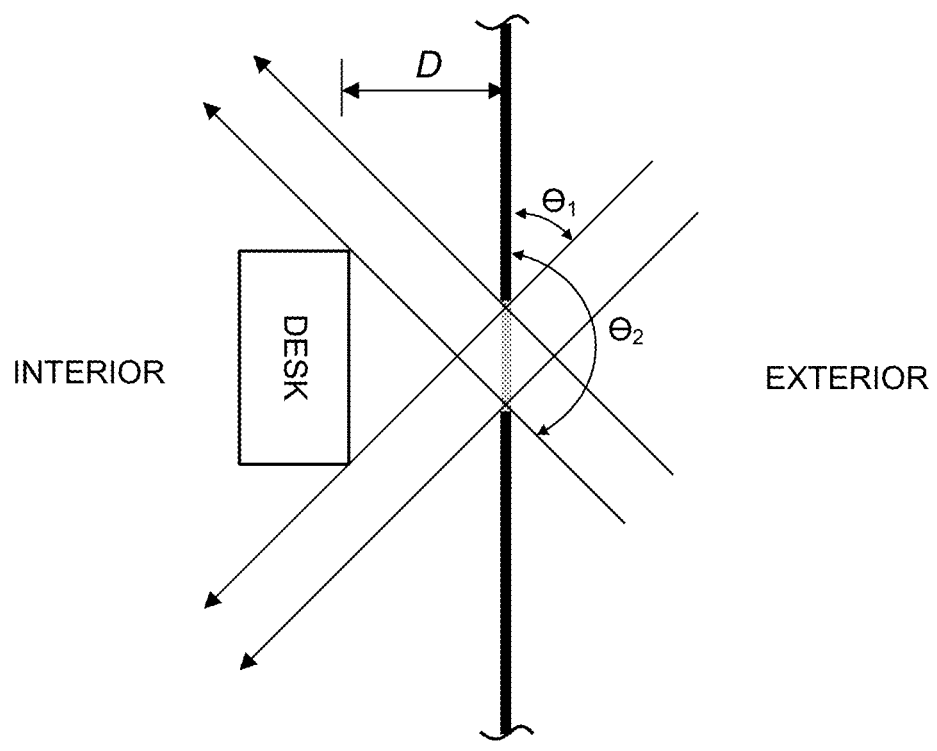
FIG. 13 is an example of an occupancy lookup table and a schematic diagram of a room with a desk and window showing the relationship between acceptance angle, sun angle, and penetration depth, according to embodiments.

FIG. 9A shows the location of Desk 1 in the room 500. FIG. 9B shows the location of Desk 2 in the room 500. As shown in the occupancy lookup table of FIG. 8, the tint levels for Desk 1 close to the window are higher than the tint levels for Desk 2 far from window to prevent glare when the desk is closer to the window. Occupancy lookup tables with other values may be used in other embodiments. For example, one other occupancy lookup table may include only four tint levels associated with the penetration values. Another example of an occupancy table with four tint levels associated with four penetration depths is shown in FIG. 13.

Figure 10:
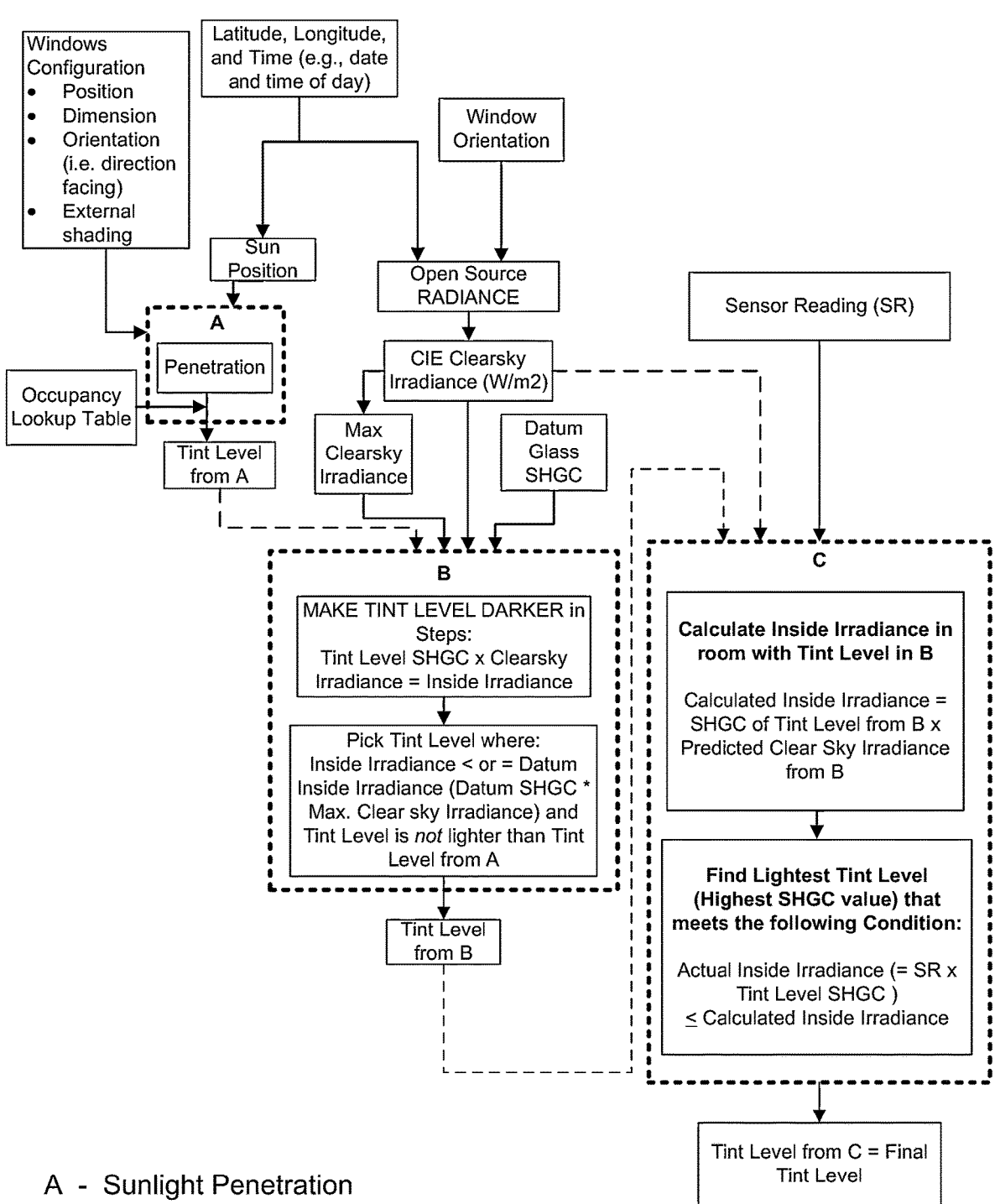
FIG. 10 is a diagram showing another implementation of a portion of the control logic shown in FIG. 5.

FIG. 10 is a diagram includes an example of an implementation of the logic in block 620 shown in FIG. 5. This diagram shows control logic for a method of performing Modules A, B, and C of embodiments. In this method, the position of the sun is calculated based on the latitude and longitude coordinates of the building for a single instant in time $t_i$. The penetration depth is calculated in Module A based on the window configuration including a position of the window, dimensions of the window, orientation of the window, and information about any external shading. Module A uses a lookup table to determine the tint level from Module A based on the calculated penetration and the space type. The tint level from Module A is then input into Module B.

A program such as the open source program Radiance, is used to determine clear sky irradiance based on window orientation and latitude and longitude coordinates of the building for both a single instant in time $t_i$ and a maximum value for all times. The datum glass SHGC and calculated maximum clear sky irradiance are input into Module B. Module B increases the tint level calculated in Module A in steps and picks a tint level where the Inside radiation is less than or equal to the Datum Inside Irradiance where: Inside Irradiance=Tint level SHGC x Clear Sky Irradiance and Datum Inside Irradiance=Datum SHGC x Maximum Clear Sky Irradiance. However, when Module A calculates the maximum tint of the glass, module B doesn't change the tint to make it lighter. The tint level calculated in Module B is then input into Module C. The calculated clear sky irradiance is also input into Module C.

Module C calculates the inside irradiance in the room with an electrochromic window 505 having the tint level from Module B using the equation: Calculated Inside Irradiance=SHGC of Tint Level from B x Calculated Clear Sky Irradiance from Module B. Module C then finds the appropriate tint level that meets the condition where actual inside irradiance is less than or equal to the Calculated Inside Irradiance. The actual inside irradiance is determined using the equation: Actual Inside Irradiance=Sensor reading (SR)x Tint level SHGC. The tint level determined by Module C is the final tint level in tint instructions sent to the electrochromic window.

IV. Building Management Systems (BMSs)

The window controllers described herein also are suited for integration with a BMS. A BMS is a computer-based control system installed in a building that monitors and controls the building's mechanical and electrical equipment such as ventilation, lighting, power systems, elevators, fire systems, and security systems. A BMS consists of hardware, including interconnections by communication channels to a computer or computers, and associated software for maintaining conditions in the building according to preferences set by the occupants and/or by the building manager. For example, a BMS may be implemented using a local area network, such as Ethernet. The software can be based on, for example, internet protocols and/or open standards. One example is software from Tridium, Inc. (of Richmond, Virginia). One communications protocol commonly used with a BMS is BACnet (building automation and control networks).

A BMS is most common in a large building, and typically functions at least to control the environment within the building. For example, a BMS may control temperature, carbon dioxide levels, and humidity within a building. Typically, there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling costs/demand. Thus, a modern BMS is used not only to monitor and control, but also to optimize the synergy between various systems, for example, to conserve energy and lower building operation costs.

In some embodiments, a window controller is integrated with a BMS, where the window controller is configured to control one or more electrochromic windows 505 or other tintable windows. In one embodiment, the one or more electrochromic windows include at least one all solid state and inorganic electrochromic device, but may include more than one electrochromic device, e.g. where each lite or pane of an IGU is tintable. In one embodiment, the one or more electrochromic windows include only all solid state and inorganic electrochromic devices. In one embodiment, the electrochromic windows are multistate electrochromic windows, as described in U.S. patent application Ser. No. 12/851,514, filed on Aug. 5, 2010, and titled "Multipane Electrochromic Windows."

Figure 11:
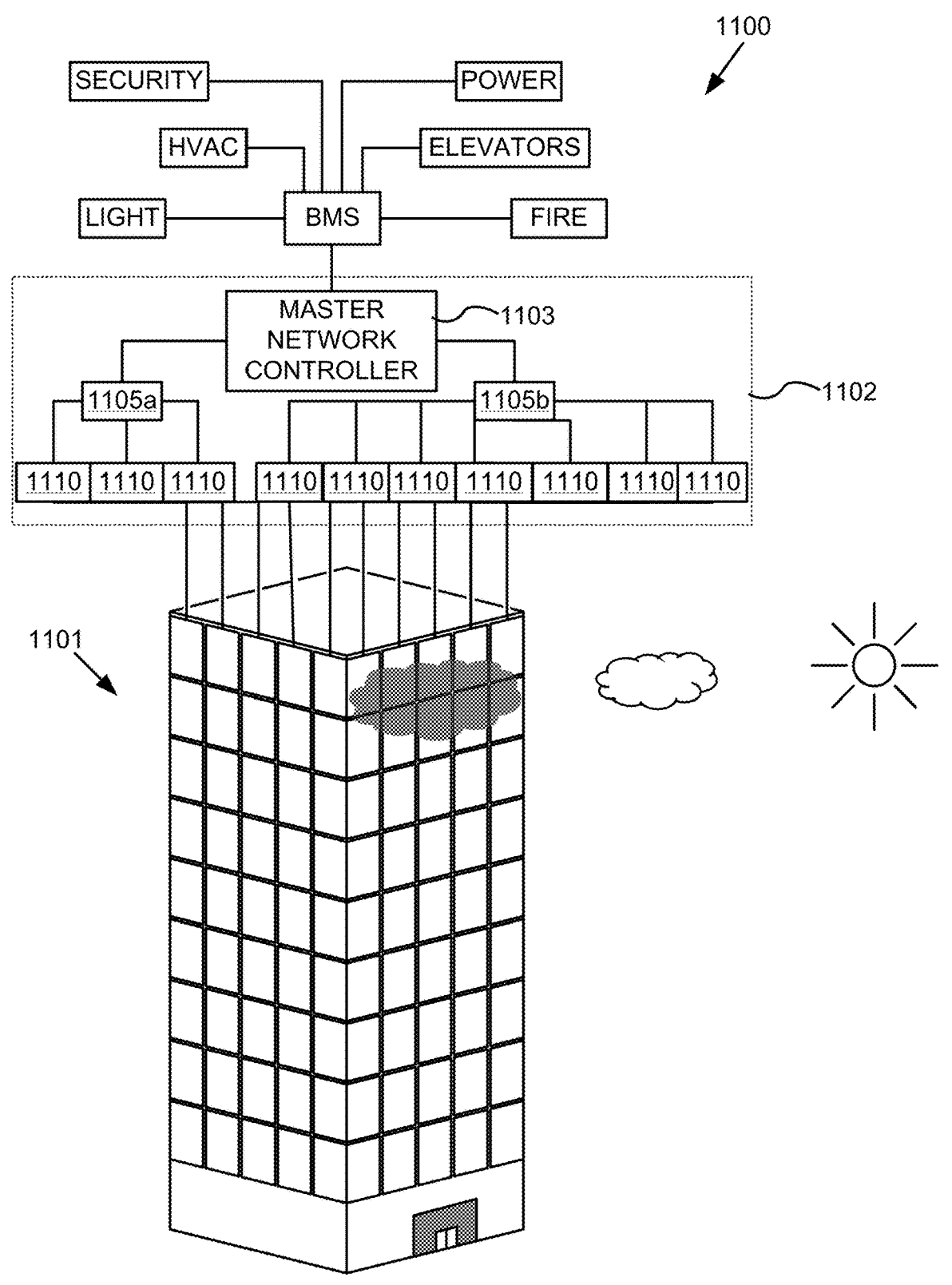
FIG. 11 depicts a schematic diagram of an embodiment of a building management system.

FIG. 11 depicts a schematic diagram of an embodiment of a BMS 1100, that manages a number of systems of a building 1101, including security systems, heating/ventilation/air conditioning (HVAC), lighting of the building, power systems, elevators, fire systems, and the like. Security systems may include magnetic card access, turnstiles, solenoid driven door locks, surveillance cameras, burglar alarms, metal detectors, and the like. Fire systems may include fire alarms and fire suppression systems including a water plumbing control. Lighting systems may include interior lighting, exterior lighting, emergency warning lights, emergency exit signs, and emergency floor egress lighting. Power systems may include the main power, backup power generators, and uninterrupted power source grids.

Also, BMS 1100 manages a master window controller 1102. In this example, master window controller 1102 is depicted as a distributed network of window controllers including a master network controller, 1103, intermediate network controllers, 1105a and 1105b, and end or leaf controllers 1110. End or leaf controllers 1110 may be similar to window controller 450 described with respect to FIG. 2. For example, master network controller 1103 may be in proximity to the BMS 1100, and each floor of building 1101 may have one or more intermediate network controllers 1105a and 1105b, while each window of the building has its own end controller 1110. In this example, each of controllers 1110 controls a specific electrochromic window of building 1101.

Each of controllers 1110 can be in a separate location from the electrochromic window that it controls, or be integrated into the electrochromic window. For simplicity, only ten electrochromic windows of building 1101 are depicted as controlled by master window controller 1102. In a typical setting there may be a large number of electrochromic windows in a building controlled by master window controller 1102. Master window controller 1102 need not be a distributed network of window controllers. For example, a single end controller which controls the functions of a single electrochromic window also falls within the scope of the embodiments disclosed herein, as described above.

One aspect of the disclosed embodiments is a BMS including a multipurpose electrochromic window controller as described herein. By incorporating feedback from a electrochromic window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of, and higher productivity from, staff, and various combinations of these, because the electrochromic windows can be automatically controlled. In some embodiments, a BMS may not be present or a BMS may be present but may not communicate with a master network controller or communicate at a high level with a master network controller. In certain embodiments, maintenance on the BMS would not interrupt control of the electrochromic windows.

In some cases, the systems of a BMS or another building network may run according to daily, monthly, quarterly, or yearly schedules. For example, the lighting control system, the window control system, the HVAC, and the security system may operate on a twenty four (24) hour schedule accounting for when people are in the building during the work day. At night, the building may enter an energy savings mode, and during the day, the systems may operate in a manner that minimizes the energy consumption of the building while providing for occupant comfort. As another example, the systems may shut down or enter an energy savings mode over a holiday period.

The scheduling information may be combined with geographical information. Geographical information may include the latitude and longitude of the building. Geographical information also may include information about the direction that each side of the building faces. Using such information, different rooms on different sides of the building may be controlled in different manners. For example, for east facing rooms of the building in the winter, the window controller may instruct the windows to have no tint in the morning so that the room warms up due to sunlight shining in the room and the lighting control panel may instruct the lights to be dim because of the lighting from the sunlight. The west facing windows may be controllable by the occupants of the room in the morning because the tint of the windows on the west side may have no impact on energy savings. However, the modes of operation of the east facing windows and the west facing windows may switch in the evening (e.g., when the sun is setting, the west facing windows are not tinted to allow sunlight in for both heat and lighting).

Described below is an example of a building, for example, like building 1101 in FIG. 11, including a building network or a BMS, tintable windows for the exterior windows of the building (i.e., windows separating the interior of the building from the exterior of the building), and a number of different sensors. Light from exterior windows of a building generally has an effect on the interior lighting in the building about 20 feet or about 30 feet from the windows. That is, space in a building that is more that about 20 feet or about 30 feet from an exterior window receives little light from the exterior window. Such spaces away from exterior windows in a building are lit by lighting systems of the building.

Further, the temperature within a building may be influenced by exterior light and/or the exterior temperature. For example, on a cold day and with the building being heated by a heating system, rooms closer to doors and/or windows will lose heat faster than the interior regions of the building and be cooler compared to the interior regions.

For exterior sensors, the building may include exterior sensors on the roof of the building. Alternatively, the building may include an exterior sensor associated with each exterior window (e.g., as described in relation to FIG. 3, room 500) or an exterior sensor on each side of the building. An exterior sensor on each side of the building could track the irradiance on a side of the building as the sun changes position throughout the day.

Regarding the methods described with respect to FIGS. 5, 6, 7, 14A, and 16-21, when a window controller is integrated into a building network or a BMS, outputs from exterior sensors 510 may be input to a network of BMS and provided as input to the local window controller 450. For example, in some embodiments, output signals from any two or more sensors are received. In some embodiments, only one output signal is received, and in some other embodiments, three, four, five, or more outputs are received. These output signals may be received over a building network or a BMS.

In some embodiments, the output signals received include a signal indicating energy or power consumption by a heating system, a cooling system, and/or lighting within the building. For example, the energy or power consumption of the heating system, the cooling system, and/or the lighting of the building may be monitored to provide the signal indicating energy or power consumption. Devices may be interfaced with or attached to the circuits and/or wiring of the building to enable this monitoring. Alternatively, the power systems in the building may be installed such that the power consumed by the heating system, a cooling system, and/or lighting for an individual room within the building or a group of rooms within the building can be monitored.

Tint instructions can be provided to change to tint of the tintable window to the determined level of tint. For example, referring to FIG. 11, this may include master network controller 1103 issuing commands to one or more intermediate network controllers 1105a and 1105b, which in turn issue commands to end controllers 1110 that control each window of the building. End controllers 1100 may apply voltage and/or current to the window to drive the change in tint pursuant to the instructions.

In some embodiments, a building including electrochromic windows and a BMS may be enrolled in or participate in a demand response program run by the utility or utilities providing power to the building. The program may be a program in which the energy consumption of the building is reduced when a peak load occurrence is expected. The utility may send out a warning signal prior to an expected peak load occurrence. For example, the warning may be sent on the day before, the morning of, or about one hour before the expected peak load occurrence. A peak load occurrence may be expected to occur on a hot summer day when cooling systems/air conditioners are drawing a large amount of power from the utility, for example. The warning signal may be received by the BMS of the building or by window controllers configured to control the electrochromic windows in the building. This warning signal can be an override mechanism that disengages the Modules A, B, and C as shown in FIG. 5. The BMS can then instruct the window controller(s) to transition the appropriate electrochromic device in the electrochromic windows 505 to a dark tint level to aid in reducing the power draw of the cooling systems in the building at the time when the peak load is expected.

In some embodiments, tintable windows for the exterior windows of the building (i.e., windows separating the interior of the building from the exterior of the building), may be grouped into zones, with tintable windows in a zone being instructed in a similar manner. For example, groups of electrochromic windows on different floors of the building or different sides of the building may be in different zones. For example, on the first floor of the building, all of the east facing electrochromic windows may be in zone 1, all of the south facing electrochromic windows may be in zone 2, all of the west facing electrochromic windows may be in zone 3, and all of the north facing electrochromic windows may be in zone 4. As another example, all of the electrochromic windows on the first floor of the building may be in zone 1, all of the electrochromic windows on the second floor may be in zone 2, and all of the electrochromic windows on the third floor may be in zone 3. As yet another example, all of the east facing electrochromic windows may be in zone 1, all of the south facing electrochromic windows may be in zone 2, all of the west facing electrochromic windows may be in zone 3, and all of the north facing electrochromic windows may be in zone 4. As yet another example, east facing electrochromic windows on one floor could be divided into different zones. Any number of tintable windows on the same side and/or different sides and/or different floors of the building may be assigned to a zone. In embodiments where individual tintable windows have independently controllable zones, tinting zones may be created on a building façade using combinations of zones of individual windows, e.g. where individual windows may or may not have all of their zones tinted.

In some embodiments, electrochromic windows in a zone may be controlled by the same window controller. In some other embodiments, electrochromic windows in a zone may be controlled by different window controllers, but the window controllers may all receive the same output signals from sensors and use the same function or lookup table to determine the level of tint for the windows in a zone.

In some embodiments, electrochromic windows in a zone may be controlled by a window controller or controllers that receive an output signal from a transmissivity sensor. In some embodiments, the transmissivity sensor may be mounted proximate the windows in a zone. For example, the transmissivity sensor may be mounted in or on a frame containing an IGU (e.g., mounted in or on a mullion, the horizontal sash of a frame) included in the zone. In some other embodiments, electrochromic windows in a zone that includes the windows on a single side of the building may be controlled by a window controller or controllers that receive an output signal from a transmissivity sensor.

In some embodiments, a sensor (e.g., photosensor) may provide an output signal to a window controller to control the electrochromic windows of a first zone (e.g., a master control zone). The window controller may also control the electrochromic windows in a second zone (e.g., a slave control zone) in the same manner as the first zone. In some other embodiments, another window controller may control the electrochromic windows in the second zone in the same manner as the first zone.

In some embodiments, a building manager, occupants of rooms in the second zone, or other person may manually instruct (using a tint or clear command or a command from a user console of a BMS, for example) the electrochromic windows in the second zone (i.e., the slave control zone) to enter a tint level such as a colored state (level) or a clear state. In some embodiments, when the tint level of the windows in the second zone is overridden with such a manual command, the electrochromic windows in the first zone (i.e., the master control zone) remain under control of the window controller receiving output from the transmissivity sensor. The second zone may remain in a manual command mode for a period of time and then revert back to be under control of the window controller receiving output from the transmissivity sensor. For example, the second zone may stay in a manual mode for one hour after receiving an override command, and then may revert back to be under control of the window controller receiving output from the transmissivity sensor.

In some embodiments, a building manager, occupants of rooms in the first zone, or other person may manually instruct (using a tint command or a command from a user console of a BMS, for example) the windows in the first zone (i.e., the master control zone) to enter a tint level such as a colored state or a clear state. In some embodiments, when the tint level of the windows in the first zone is overridden with such a manual command, the electrochromic windows in the second zone (i.e., the slave control zone) remain under control of the window controller receiving outputs from the exterior sensor. The first zone may remain in a manual command mode for a period of time and then revert back to be under control of window controller receiving output from the transmissivity sensor. For example, the first zone may stay in a manual mode for one hour after receiving an override command, and then may revert back to be under control of the window controller receiving output from the transmissivity sensor. In some other embodiments, the electrochromic windows in the second zone may remain in the tint level that they are in when the manual override for the first zone is received. The first zone may remain in a manual command mode for a period of time and then both the first zone and the second zone may revert back to be under control of the window controller receiving output from the transmissivity sensor.

Any of the methods described herein of control of a tintable window, regardless of whether the window controller is a standalone window controller or is interfaced with a building network, may be used control the tint of a tintable window.

Wireless or Wired Communication

In some embodiments, window controllers described herein include components for wired or wireless communication between the window controller, sensors, and separate communication nodes. Wireless or wired communications may be accomplished with a communication interface that interfaces directly with the window controller. Such interface could be native to the microprocessor or provided via additional circuitry enabling these functions.

A separate communication node for wireless communications can be, for example, another wireless window controller, an end, intermediate, or master window controller, a remote control device, or a BMS. Wireless communication is used in the window controller for at least one of the following operations: programming and/or operating the electrochromic window, collecting data from the electrochromic window from the various sensors and protocols described herein, and using the electrochromic window as a relay point for wireless communication. Data collected from electrochromic windows also may include count data such as number of times an electrochromic device has been activated, efficiency of the electrochromic device over time, and the like. These wireless communication features is described in more detail below.

In one embodiment, wireless communication is used to operate the associated electrochromic windows, for example, via an infrared (IR), and/or radio frequency (RF) signal. In certain embodiments, the controller will include a wireless protocol chip, such as Bluetooth, EnOcean, WiFi, Zigbee, and the like. Window controllers may also have wireless communication via a network. Input to the window controller can be manually input by an end user at a wall switch, either directly or via wireless communication, or the input can be from a BMS of a building of which the electrochromic window is a component.

In one embodiment, when the window controller is part of a distributed network of controllers, wireless communication is used to transfer data to and from each of a plurality of electrochromic windows via the distributed network of controllers, each having wireless communication components. For example, referring again to FIG. 11, master network controller 1103, communicates wirelessly with each of intermediate network controllers 1105a and 1105b, which in turn communicate wirelessly with end controllers 1110, each associated with an electrochromic window. Master network controller 1103 may also communicate wirelessly with the BMS 1100. In one embodiment, at least one level of communication in the window controller is performed wirelessly.

In some embodiments, more than one mode of wireless communication is used in the window controller distributed network. For example, a master window controller may communicate wirelessly to intermediate controllers via WiFi or Zigbee, while the intermediate controllers communicate with end controllers via Bluetooth, Zigbee, EnOcean, or other protocol. In another example, window controllers have redundant wireless communication systems for flexibility in end user choices for wireless communication.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from electrochromic windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

An Example of System for Controlling Functions of Tintable Windows

Figure 12:
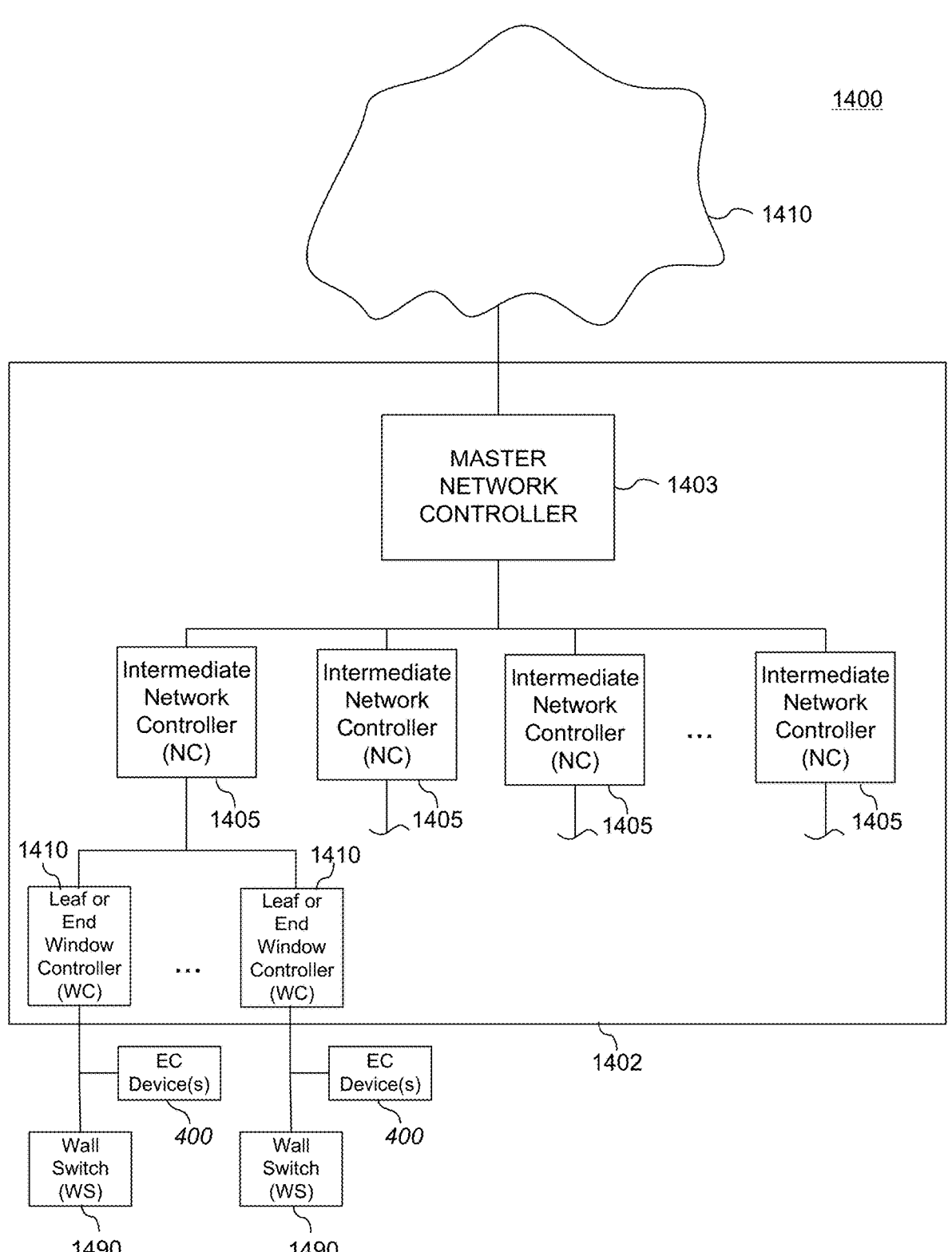
FIG. 12 is a block diagram of components of a system for controlling functions of one or more tintable windows of a building.

FIG. 12 is a block diagram of components of a system 1400 for controlling functions (e.g., transitioning to different tint levels) of one or more tintable windows of a building (e.g., building 1101 shown in FIG. 11), according to embodiments. System 1400 may be one of the systems managed by a BMS (e.g., BMS 1100 shown in FIG. 11) or may operate independently of a BMS.

System 1400 includes a master window controller 1402 that can send control signals to the tintable windows to control its functions. System 1400 also includes a network 1410 in electronic communication with master window controller 1402. The control logic, other control logic and instructions for controlling functions of the tintable window(s), and/or sensor data may be communicated to the master window controller 1402 through the network 1410. Network 1410 can be a wired or wireless network (e.g. cloud network). In one embodiment, network 1410 may be in communication with a BMS to allow the BMS to send instructions for controlling the tintable window(s) through network 1410 to the tintable window(s) in a building.

System 1400 also includes EC devices 400 of the tintable windows (not shown) and wall switches 1490, which are both in electronic communication with master window controller 1402. In this illustrated example, master window controller 1402 can send control signals to EC device(s) 400 to control the tint level of the tintable windows having the EC device(s) 400. Each wall switch 1490 is also in communication with EC device(s) 400 and master window controller 1402. An end user (e.g., occupant of a room having the tintable window) can use the wall switch 1490 to control the tint level and other functions of the tintable window having the EC device(s) 400.

In FIG. 12, master window controller 1402 is depicted as a distributed network of window controllers including a master network controller 1403, a plurality of intermediate network controllers 1405 in communication with the master network controller 1403, and multiple pluralities of end or leaf window controllers 1410. Each plurality of end or leaf window controllers 1410 is in communication with a single intermediate network controller 1405. Although master window controller 1402 is illustrated as a distributed network of window controllers, master window controller 1402 could also be a single window controller controlling the functions of a single tintable window in other embodiments. The components of the system 1400 in FIG. 12 may be similar in some respects to components described with respect to FIG. 11. For example, master network controller 1403 may be similar to master network controller 1103 and intermediate network controllers 1405 may be similar to intermediate network controllers 1105. Each of the window controllers in the distributed network of FIG. 12 may include a processor (e.g., microprocessor) and a computer readable medium in electrical communication with the processor.

In FIG. 12, each leaf or end window controller 1410 is in communication with EC device(s) 400 of a single tintable window to control the tint level of that tintable window in the building. In the case of an IGU, the leaf or end window controller 1410 may be in communication with EC devices 400 on multiple lites of the IGU control the tint level of the IGU. In other embodiments, each leaf or end window controller 1410 may be in communication with a plurality of tintable windows. The leaf or end window controller 1410 may be integrated into the tintable window or may be separate from the tintable window that it controls. Leaf and end window controllers 1410 in FIG. 12 may be similar to the end or leaf controllers 1110 in FIG. 11 and/or may also be similar to window controller 450 described with respect to FIG. 2.

Each wall switch 1490 can be operated by an end user (e.g., occupant of the room) to control the tint level and other functions of the tintable window in communication with the wall switch 1490. The end user can operate the wall switch 1490 to communicate control signals to the EC devices 400 in the associated tintable window. These signals from the wall switch 1490 may override signals from master window controller 1402 in some cases. In other cases (e.g., high demand cases), control signals from the master window controller 1402 may override the control signals from wall switch 1490. Each wall switch 1490 is also in communication with the leaf or end window controller 1410 to send information about the control signals (e.g. time, date, tint level requested, etc.) sent from wall switch 1490 back to master window controller 1402. In some cases, wall switches 1490 may be manually operated. In other cases, wall switches 1490 may be wirelessly controlled by the end user using a remote device (e.g., cell phone, tablet, etc.) sending wireless communications with the control signals, for example, using infrared (IR), and/or radio frequency (RF) signals. In some cases, wall switches 1490 may include a wireless protocol chip, such as Bluetooth, EnOcean, WiFi, Zigbee, and the like. Although wall switches 1490 depicted in FIG. 12 are located on the wall(s), other embodiments of system 1400 may have switches located elsewhere in the room.

Example of Occupancy Lookup Table

FIG. 13 is an illustration including an example of an occupancy lookup table. The tint level in the table is in terms of $T_{vis}$ (visible transmission). The table includes different tint levels ($T_{vis}$ values) for different combinations of calculated penetration depth values (2 feet, 4 feet, 8 feet, and 15 feet) for a particular space type and when the sun angle $\theta_{Sun}$ is between the acceptance angle of the window between $\theta_1=30$ degrees and $\theta_2=120$ degrees. The table is based on four tint levels including 4% (lightest), 20%, 40%, and 63%. FIG. 13 also shows a diagram of a desk near a window and the acceptance angle of the window to sunlight having an angle $\theta_{Sun}$ between the angle of $\theta_1$ and $\theta_2$. This diagram shows the relationship between the sun angle $\theta_{Sun}$ and the location of the desk. When the angle of the sun $\theta_{Sun}$ is between the angle of acceptance between $\theta_1$ and $\theta_2$, then the sunlight could strike the surface of the desk. If the sun angle $\theta_{Sun}$ is between the acceptance angle between $\theta_1$ and $\theta_2$ (If $\theta_1<\theta_{Sun}<\theta_2$) and the penetration depth meets the criteria to tint the window, then that tint level determined by the occupancy lookup table is sent to the window controller, which sends control signals to the EC devices in the window to transition the window to the determined tint level. These two angles $\theta_1$ and $\theta_2$ can be calculated or measured for each window, and stored in the zone/group data 1508 with the other window parameters for that zone. Another example of an occupancy lookup table can be found in FIG. 8.

Figure 14A:
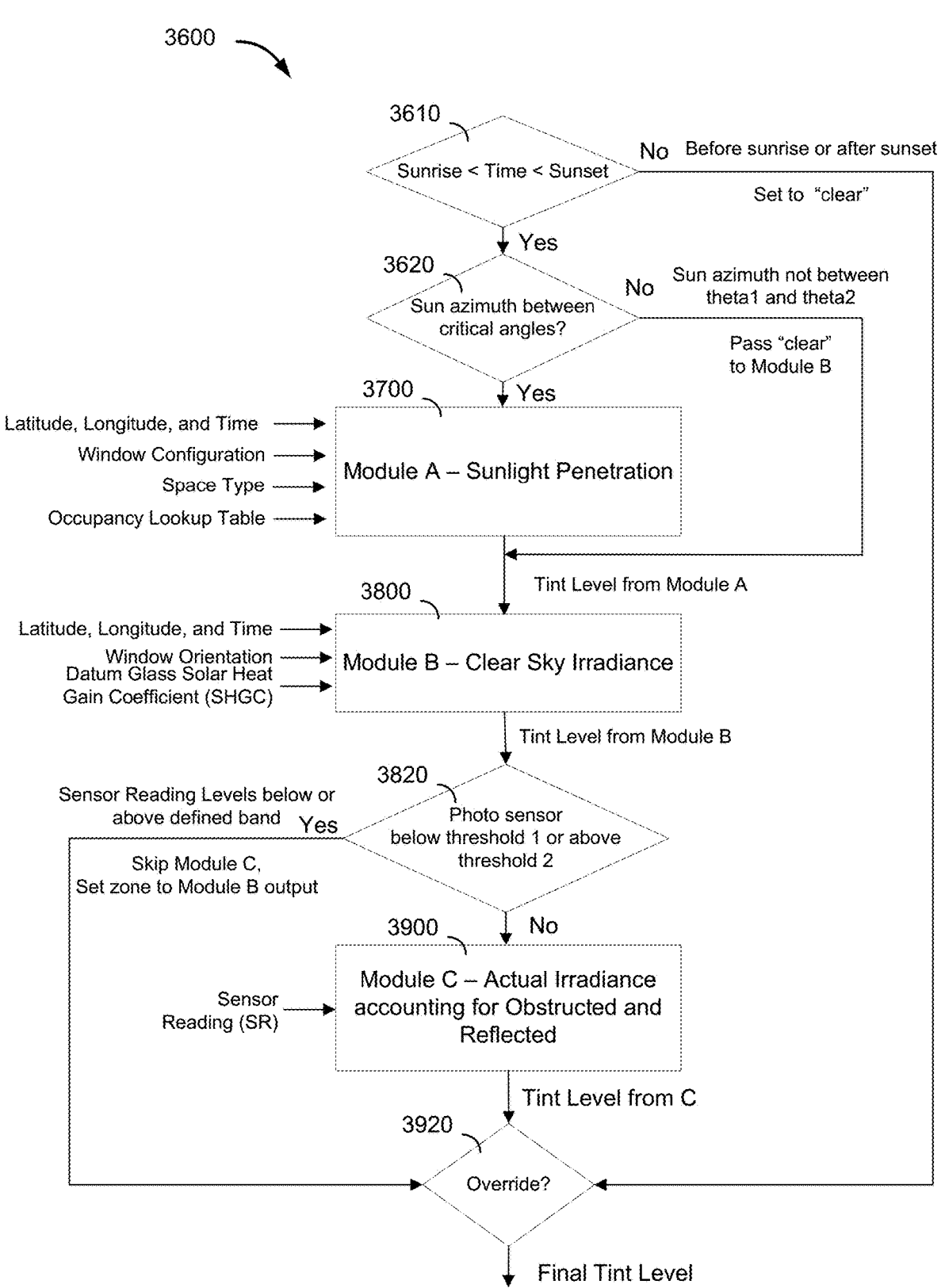
FIG. 14A is a flowchart showing a particular implementation of a portion of the control logic shown in FIG. 5.

V. Example of Control Logic Making Tinting Decisions Based on Whether Current Time is Between Sunrise and Sunset FIG. 14A is a flowchart 3600 showing a particular implementation of the control logic shown in FIG. 5. At operation 3610, the control logic determines whether the current time is between sunrise and sunset. If it is either before sunrise or after sunset at operation 3610, the control logic sends a signal to clear the tint in the tintable window and proceeds to operation 3920 to determine whether there is an override, for example, an override command received in a signal from an operator. If it is determined by the control logic to be between sunrise and sunset at operation 3610, the control logic goes on to determine whether the sun azimuth is between critical angles (operation 3620) of the tintable window. Although certain control methods are described with respect to a single tintable window, it would be understood that these control methods can be used to control one or more tintable windows or a zone of one or more tintable windows.

Figure 15:
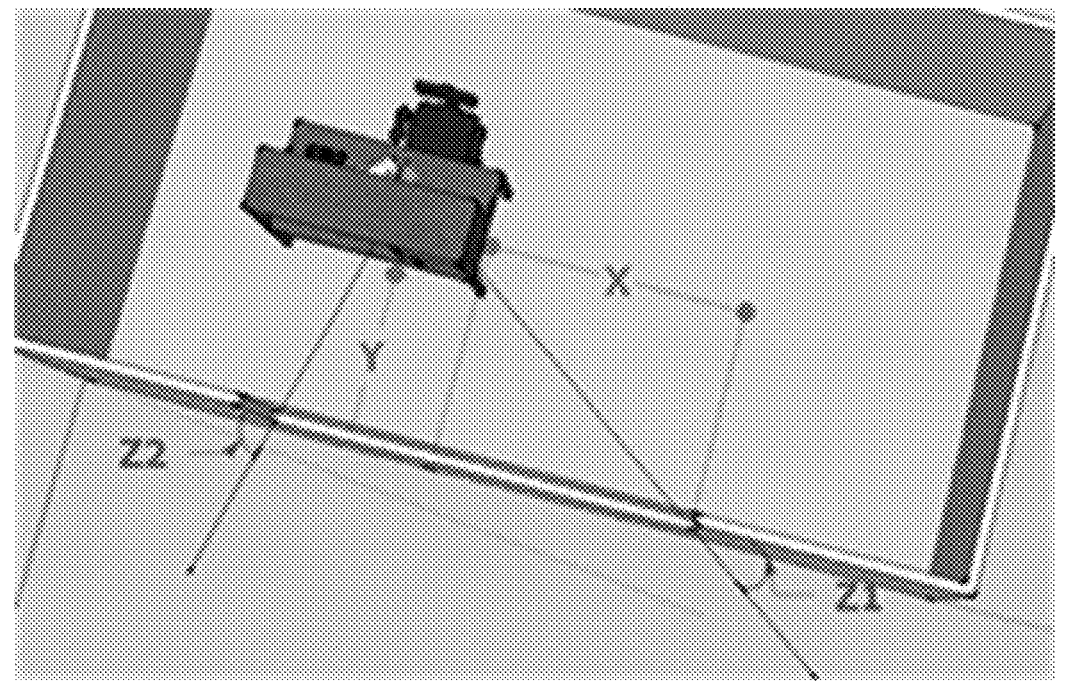
FIG. 15 depicts a room having a desk and the critical angle of the room within which the sun is shining onto an occupant sitting at the desk

FIG. 15 depicts a room having a desk and the critical angles of the tintable window within which solar radiation shines through the tintable window in the room to the occupancy region. When the sun's azimuth is within these critical angles, the sun's glare may shine on the occupancy region defined in this case by an occupant sitting at the desk. In FIG. 25B, the sun's azimuth is shown outside the illustrated critical angles.

Returning to the flowchart in FIG. 14A, if it is determined by the control logic at operation 3620 that the sun azimuth is outside the critical angles, then Module A is bypassed, does bypassed, a "clear" tint level is passed to Module B, and Module B is used to make calculations at operation 3800. If it is determined that the sun azimuth is between the critical angles, Module A is used to make calculations at operation 3700, the tint level from Module A is passed to Module B, and then Module B is used to make calculations at operation 3800, and the tint level from Module B is output.

At operation 3820, the control logic determines whether the sensor value is below a first threshold 1 or above a second threshold 2. If the sensor value is below the first threshold 1 or above the second threshold 2, then the control logic does not use Module C (operation 3900) to make determinations. If the sensor value is above the first threshold 1 and below the second threshold 2, then the control logic uses Module C to make determinations. In either case, the control logic proceeds to operation 3920 to determine whether there is an override in place.

Figure 14B:
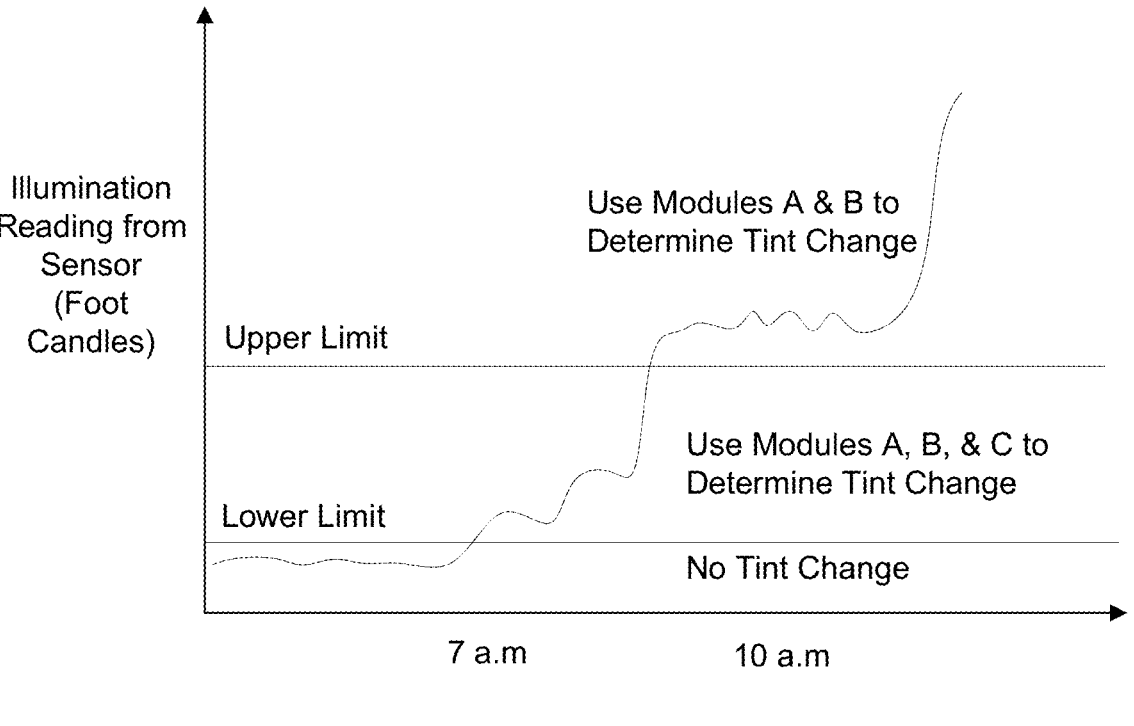
FIG. 14B is a graph of illumination readings during a day that is cloudy early in the day and then sunny later in the day and the corresponding upper and lower limits.

FIG. 14B is a graph of illumination readings from a sensor taken over time, t, during a day that is cloudy (e.g., foggy) early in the day and sunny (clear sky) later in the day. As shown, the values of the illumination readings are below a lower limit before 7 a.m., rise above the lower limit and then above the upper limit, and then as the clouds burn off after 10 a.m. the illumination readings become much higher later in the day. While the sensor reads illumination levels below a lower limit (e.g., 10 Watts/m$^2$) before 7 a.m., the amount of radiation through the tintable window is not significant enough to affect occupant comfort. In this case, a re-evaluation of tint level does not need to be made and a defined tint level (e.g., maximum window transmissivity) is applied. While the sensor reads between the lower and upper limit (e.g., 100 Watts/m$^2$) after 7 a.m. and before 10 a.m., Modules A, B, and C will be used to calculate an end tint state (level). While the sensor reads above the upper limit (e.g., 100 Watts/m2) after 10 a.m., modules A and B will be used to calculate an end tint state.

As mentioned above, FIG. 15 depicts a room having a desk and the critical angles of the occupancy region within which glare from the sun can shine through the tintable window and in the occupancy region defined by the workspace of an occupant sitting at the desk. In the illustration, the sun currently has an azimuthal angle outside the critical angles. If the control logic determines that the sun angle(s) are outside the critical angles, then the control logic uses Module B to determine tint level. If within the critical angles, the control logic uses Modules A and B to determine tint level. If the illumination value is above the lower limit and below the upper limit, the control logic determines whether the sun angle(s) is outside the critical angles. If outside the critical angles, the control logic uses Modules B and C to determine tint level. If within the critical angles, Modules A, B, and C are used to determine tint level.

VI. Control Logic that Makes Tinting Decisions Based on Weather Feed Data

Certain aspects are directed to control methods that implement control logic that makes tinting decisions based on weather feed data received from one or more weather services and/or other data sources. Weather feed data generally includes data associated with weather conditions such as, for example, cloud coverage percentage, visibility data, wind speed data, temperature data, percentage probability of precipitation, and/or humidity. Typically weather feed data is received in a signal through a communication network by a window controller. The window controller has a processor for performing instructions for carrying out the control logic that can use the weather feed data to make tinting decisions. The tint decisions are sent in a control signal to one or more tintable windows. The instructions for performing the operations of the control logic are stored on memory of the window controller or another memory accessible by the window controller.

According to certain aspects, the window controller can send a signal with a request for the weather feed data through a communication interface over the communication network to one or more weather services (e.g., two weather services). The request usually includes at least the longitude and latitude of the location of the tintable window(s) being controlled by the control method implementing the control logic. In response, the one or more weather services send a signal with weather feed data based on the specified longitude and latitude through the communication network through a communication interface to the window controller.

The communication interface and network may be in wired or wireless form. In some cases, a weather service may be accessible through a weather website. An example of a weather website can be found at www.forecast.io. Another example is the National Weather Service (www.weather-.gov). The weather feed data may be based on a current time or may be forecasted at a future time.

According to certain aspects, control logic uses weather feed data from multiple weather services. For example, the control logic may use weather feed data from two weather services. As another example, the control logic to use weather feed data from three weather services, and so on. Using weather feed data from multiple weather services may be preferable in certain cases to account for the difference sources of data that are used by the weather services to generate the weather feed data. Also, weather services may also differ in their granularity of their weather feed data based on location. That is, certain weather services may offer more accurate data based on a specific location than other services. In one example, a control logic can analyze data from multiple weather services using statistical techniques to determine a probable weather condition.

Since weather services may provide different weather feed data, control methods according to certain aspects include a preferential selection of weather services to use for weather feed data. For example, a control method may retrieve a stored listing of an order of preference of its weather services and then select available weather services based on this preferential order. In some cases, weather services may be placed in a preferential order based on historical accuracy or location granularity of weather feed data provided by those services. After selecting one or more weather services, the control method sends a signal(s) with requests for weather feed data to the selected weather services over the communication network. In one case, an override command may override the use of the preferential order of the multiple weather sources. For example, an operator of the window controller may issue an override command to select a particular weather source in making tint decisions instead of using the weather sources selected based on the preferential order.

In certain aspects, control logic combines weather feed data from multiple weather data sources, and/or combine multiple types of weather feed data (e.g., cloud coverage percentage, visibility data, wind speed data, temperature data, percentage probability of precipitation, and humidity) from the same weather source to use in making a tinting decision. In some cases, control logic may apply different threshold levels or weighting factors to the weather feed data from different weather services. In some cases, the control logic may apply different filters to weather feed data depending on the weather source.

Control logic that use weather feed data to make tinting decisions may use one type of weather feed data or may use a combination of different types of weather feed data. For example, certain control logic use cloud coverage percentage as a metric in tinting decisions. In another example, certain control logic uses a combination of wind speed and percentage of cloud cover to make tint decisions. In some cases, the control logic can infer an accurate metric of determining cloudiness for use in its tinting decisions by using a percentage cloud cover, wind speed, and/or other weather feed data.

In one aspect, a control method implements control logic that makes tinting decisions by combining weather feed data received from a communication network with data received from another local source such as a rooftop camera (e.g. a ring sensor) and/or terrestrial data. In some cases, the combined data may be preferred for a particular location.

In some embodiments, control logic uses weather feed data to determine a tint level at (or just after) sunrise and/or at (or just before) sunset based on a determination of whether it is dark outside due to lack of sun or due to clouds based on cloud coverage percentage from weather feed data. For example, if the cloud cover percentage is higher than a predetermined threshold level, the control logic determines that it is "cloudy." If the cloud cover percentage is lower than the predetermined low threshold level, the control logic determines it is "not cloudy." In one case, the method may send a control signal to increase tint if it is just after sunrise and it is determined to be "not cloudy." Similarly, the control logic may send a control signal to decrease tint (e.g., clear window) if it is determined to be "cloudy."

Although control logic that uses weather feed data are described, in many cases, with respect to weather feed data associated with the current time, some control methods can forecast weather feed data at a future time based on the weather feed data received from one or more weather services or other data sources. For example, the control logic may analyze trends in the weather feed data from selected one or more weather sources and extrapolate a forecasted future value.

In one aspect, a control method uses control logic that refers to a table (e.g., lookup table) listing tint levels corresponding to different ranges of cloud coverage percentages and/or other ranges of values of weather feed data. For example, the table may list a darkest tint level corresponding to a range of 0%-10% cloud coverage percentage and a clear tint level corresponding to a range of 80%-100% cloud coverage percentage. In one exemplary implementation of such a table, control logic may determine a value of the cloud coverage percentage from weather feed data received from one or more weather services, determine the range of cloud coverage percentage within which the determined value belongs, and then determine the tint level in that table that corresponds to that determined range.

In certain aspects, control logic uses weather feed data to augment tint decisions made based on current time of day calculations. In some of these aspects, control logic uses weather feed data to augment tinting decisions made by Module A and/or Module B (e.g., control logic shown in FIG. 5, FIG. 14A, and FIG. 17-21) based on the current time of day calculations made at or near sunrise and sunset.

In one example, control logic uses weather feed data to determine a tint level in advance of sunrise and/or sunset based on a determination of whether it is dark outside due to lack of sun or due to clouds based on cloud coverage percentage from weather feed data. If the cloud cover percentage is higher than a predetermined threshold level (e.g., 80%, 70%, 60%, 90%, etc.), the control logic determines that it is "cloudy." If the cloud cover percentage is lower than the predetermined threshold level, the control method determines it is "not cloudy." In one case, the control logic may send a control signal to increase tint if it is approaching sunrise and it is determined to be "not cloudy." Similarly, the control logic may send a control signal to decrease tint (e.g., clear window) if it is approaching sunset and it is determined to be "cloudy."

In another example, during a time delay period between sunrise to a predefined first time delay ($T_{delay1}$) after sunrise (i.e. just after the sun comes up) and/or a time delay period between sunset and a predefined second time delay ($T_{delay2}$) before sunset (i.e. just before the sun goes down), control logic uses weather feed data from one or more weather services to determine whether it is "cloudy" or "not cloudy." The time delay period before sunset is determined by: the period between the calculated time of sunset and the calculated time of sunset–the predefined time delay ($T_{delay2}$). The time delay period after sunrise is determined by: the period between the calculated time of sunrise and the calculated time of sunrise+time delay 1 ($T_{delay1}$). $T_{delay1}=T_{delay2}$ in certain cases. The calculated time of sunrise/sunset may be determined based on the current date (day and year) and latitude and longitude at the location of the tintable window. If the control logic determines that a cloud coverage percentage is higher than a predetermined threshold level (e.g., 80%, 70%, 60%, 90%, etc.), the control logic makes the determination that it is "cloudy." If the control logic determines the cloud cover percentage to be lower than the predetermined threshold level, the control logic determines that it is "not cloudy." If the control logic determines that it is "not cloudy" during the time delay period, the control logic sends a signal to use the tint level output from Module B. If the control logic determines that it is "cloudy" during the time delay period, the control logic sends a signal to clear glass.

Control Methods without Available Sensor Readings and/ or Module C Delay

In certain circumstances, sensor readings may not be available to determine the current solar radiation level at the tintable window. For example, a tintable window may not have a sensor for measuring solar radiation levels. As another example, the tintable window may have a sensor, but the sensor may not be functioning (e.g. turned off or malfunctioning). In this last example, the control logic may include monitoring operations to determine when the sensor is not functioning.

In situations where the tintable window does not have sensor readings available, its window controller can perform instructions with logic for certain control methods described herein that can make tinting decisions without sensor readings based on weather feed data received over a communication network from one or more weather services or other sources of data. On a periodic basis (e.g., every five minutes, every two minutes, etc.), the control logic sends request(s) for weather feed data over the communication network to the one or more weather services. In response, the one or more weather services send signal(s) with weather feed data over the communication network to the window controller. The control logic determines whether it is "cloudy" or "not cloudy" based on the received weather feed data. For example, the control logic may determine whether it is "cloudy" or "not cloudy" based on cloud coverage percentage from the one or more weather services. If the cloud cover percentage is determined to be higher than a threshold level (e.g., 80% cloud cover), the control logic determines that it is "cloudy." If the cloud cover percentage is determined to be lower than a threshold level, the control logic determines that it is "not cloudy." The threshold level of cloudiness may be about 70% in some cases, about 80% in some cases, about 90% in some cases, or about 95% in some cases. If the control logic determines that it is "cloudy," the control method overrides (does not use) the clear sky radiation determinations from Module B and/or penetration level calculations from Module A and decreases the tint level. In one case, the control logic decreases the tint level based on the level of cloud coverage percentage. For example, the control logic may lookup an end tint level corresponding to a particular cloud coverage percentage in a lookup table stored in memory at the window controller.

In certain aspects, control logic includes a Module C delay operation that sets a time delay before performing operations of Module C that may decrease tint level. Implementation of the Module C delay operation can avoid an inappropriately low tint level in certain situations. For example, there may be a situation where Module C has sent a tint command to decrease tint level just before sunrise and the duration of time that it would take to transition (transition time) to the lower tint level is long enough that the transition is complete after sunrise. In this situation the tintable window may be tinted inappropriately low just after sunrise when the sun radiation may shine at a low angle through the tintable window causing glare. In these cases, the control logic can implement a Module C delay operation to delay implementing the operations of Module C that might reduce tint level inappropriately. In one example, the time delay ($T_{delay}$) is for a period of time such as, for example, from sunrise until just after sunrise or as another example, just before sunset until sunset. In another example, the time delay ($T_{delay}$) is for a period of time such as, for example, just before sunrise until just after sunrise or as another example, just before sunset until just after sunset. During the Module C delay, the control logic uses the results from the determinations made in Modules A and/or B to determine the tint level and Module C is bypassed. The value of the $T_{delay}$ can be, for example, one hour, two hours, three hours, 15 minutes, 20 minutes, 30 minutes, etc. In one example, the $T_{delay}$ is set to the transition time of the tintable window which is stored in memory at the window controller.

1. Example of Control Method with Module C Delay

Figure 16:
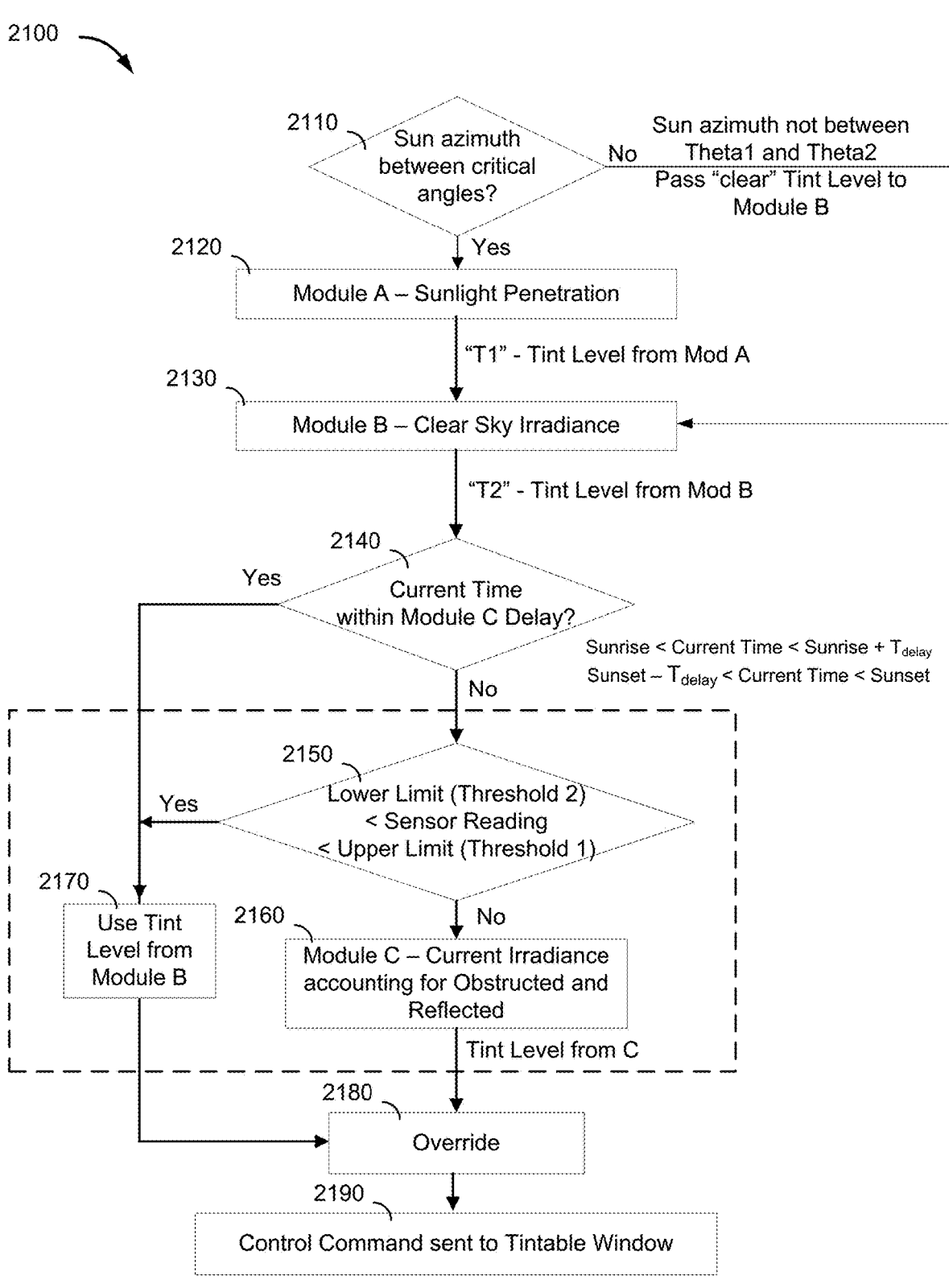
FIG. 16 is a flowchart showing a particular implementation of the control logic shown in FIG. 5, according to an embodiment.

FIG. 16 is a flowchart 2100 showing a particular implementation of control logic shown in FIG. 5, according to an embodiment. The control logic uses Modules A, B, and C to determine tint levels for a tintable window and sends instructions to transition the tintable window. In this example, the control logic is for a control method that uses a Module C delay.

Although this illustrated control logic in FIG. 16 and other control logic described herein (e.g., logic in FIGS. 14A, 16, 17, 18, 19, 20, 21) is described with respect to a single tintable window, it would be understood that the control logic can be used to determine the tint level for multiple tintable windows or a zone of one or more tintable windows. When determining the tint level for a zone, a representative tintable window may be used in certain logic operations to determine the tint level and the determined tint level may be implemented at the one or more windows of that zone.

At operation 2110, the control logic determines whether the sun azimuth is between the critical angles of the tintable window at the current time. An example of a room having a desk and the associated critical angles of the sun shining through the tintable window is illustrated in FIG. 15. If the sun's azimuth is within the critical angles, then the sun's glare is shining on the occupancy region. In FIG. 15, the occupancy region is defined by an occupant sitting at the desk and the sun's azimuth angle is shown outside the critical angles of the tintable window. Although this control method and other control methods are described herein with respect to a single tintable window, it would be understood that these control methods can be used to control multiple tintable windows or a zone of one or more tintable windows.

If it is determined at operation 2110 that the sun azimuth is outside the critical angles at the current time, the control logic bypasses the operations of Module A, passing a "clear" level to Module B. The control logic then uses the operations of Module B to determine and output a tint level based on a clear sky irradiance calculation ("T2") (operation 2130).

If it is determined at operation 2110 that the sun azimuth is between the critical angles, the operations of Module A are used to determine and output a tint level ("T1") based on sunlight penetration (operation 2120). Then, the operations of Module B are used (operation 2130) to determine and output a tint level from Module B based on a clear sky irradiance calculation ("T2"), and the control logic proceeds to operation 2140. Typically, the operations of Module B increase the tint from the tint level ("T1") output from the operations of Module A.

In the example shown in FIG. 16, the control logic has a Module C delay that avoids using (bypasses) the operations of Module C which might reduce tint level from the output in Modules A/B, for a Module C delay time period, which is a period of time near sunrise or sunset based on the Module C delay, $T_{delay}$. At operation 2140, the control logic determines whether the current time is within the Module C delay by determining whether the current time is within the time delay period. For example, the Module C delay time period may be defined as a period of time starting at sunrise and lasting a $T_{delay}$ after sunrise. In this example, the control logic determines whether Sunrise<Current Time<Sunrise+ $T_{delay1}$. As another example, the Module C delay time period may be defined as a period of time starting at a predefined time before sunset and lasting until sunset. In this example, the control logic determines whether Sunset– $T_{delay2}$<Current Time<Sunset. The control logic calculates the time of sunrise and/or sunset based on an astronomical calculator using the current date. $T_{delay}$ can be, for example, one hour, two hours, three hours, 15 minutes, 20 minutes, 30 minutes, etc. $T_{delay}$ can be set to the transition time of the window.

Although the control logic described in FIGS. 16-21 is described with a Module C time delay at sunrise and/or at sunset, other time delay periods may be used with this control logic according to another aspect.

If it is determined by the control logic at operation 2140 that the current time is within the Module C delay, the tint level output from Module B determined at operation 2130 is used (2170), Module C is bypassed, and the control logic proceeds to operation 2180 to determine whether there is an override in place. If an override is determined to be in place, the control logic sends a control command at operation 2190 to the voltage source of the tintable window to provide a voltage profile that transitions tint to the override tint level. If no override is in place, the control logic sends a control command at operation 2190 to the voltage source for the tintable window to provide a voltage profile that transitions tint to the tint level determined by Module B at operation 2130.

If it is determined by the control logic at operation 2140 that the current time is outside the Module C delay time period, the control logic determines whether the current sensor reading is between a lower limit (Threshold 2) and an upper limit (Threshold 1) (i.e. Lower Limit (Threshold 2)<Current Sensor Reading<Upper Limit (Threshold 1) at operation 2150. If the current sensor reading is between the lower limit (Threshold 2) and the upper limit (Threshold 1), the tint level output from Module B is used (operation 2170), Module C is bypassed, and the control logic proceeds to operation 2180 to determine whether there is an override in place. If an override is determined to be in place, the control logic sends a control command at operation 2190 to the voltage source of the tintable window to provide a voltage profile that transitions tint to the override tint level. If no override is in place, the control logic sends a control command at operation 2190 to the voltage source for the tintable window to provide a voltage profile that transitions tint to the tint level determined by Module B at operation 2130.

If the control logic determines at operation 2150 that the current sensor reading is above the upper limit (Threshold 1) or below the lower limit (Threshold 2), then the operations of Module C are implemented (operation 2160) to augment the tint level based on the current sensor reading of irradiance to account for obstructed and/or reflected radiation. Generally, Module C reduces tint from the tint level output from Module A/B since it accounts for obstructed and reflected radiation. The control logic then proceeds to operation 2180 to determine whether there is an override in place. If an override is determined to be in place, the control logic sends a control command at operation 2190 to the voltage source of the tintable window to provide a voltage profile that transitions tint to the override tint level. If no override is in place, the control logic sends a control command at operation 2190 to the voltage source of the tintable window to provide a voltage profile that transitions tint to the tint level output by Module C at operation 2160.

2. Example of Control Method with Module C Delay

Figure 17:
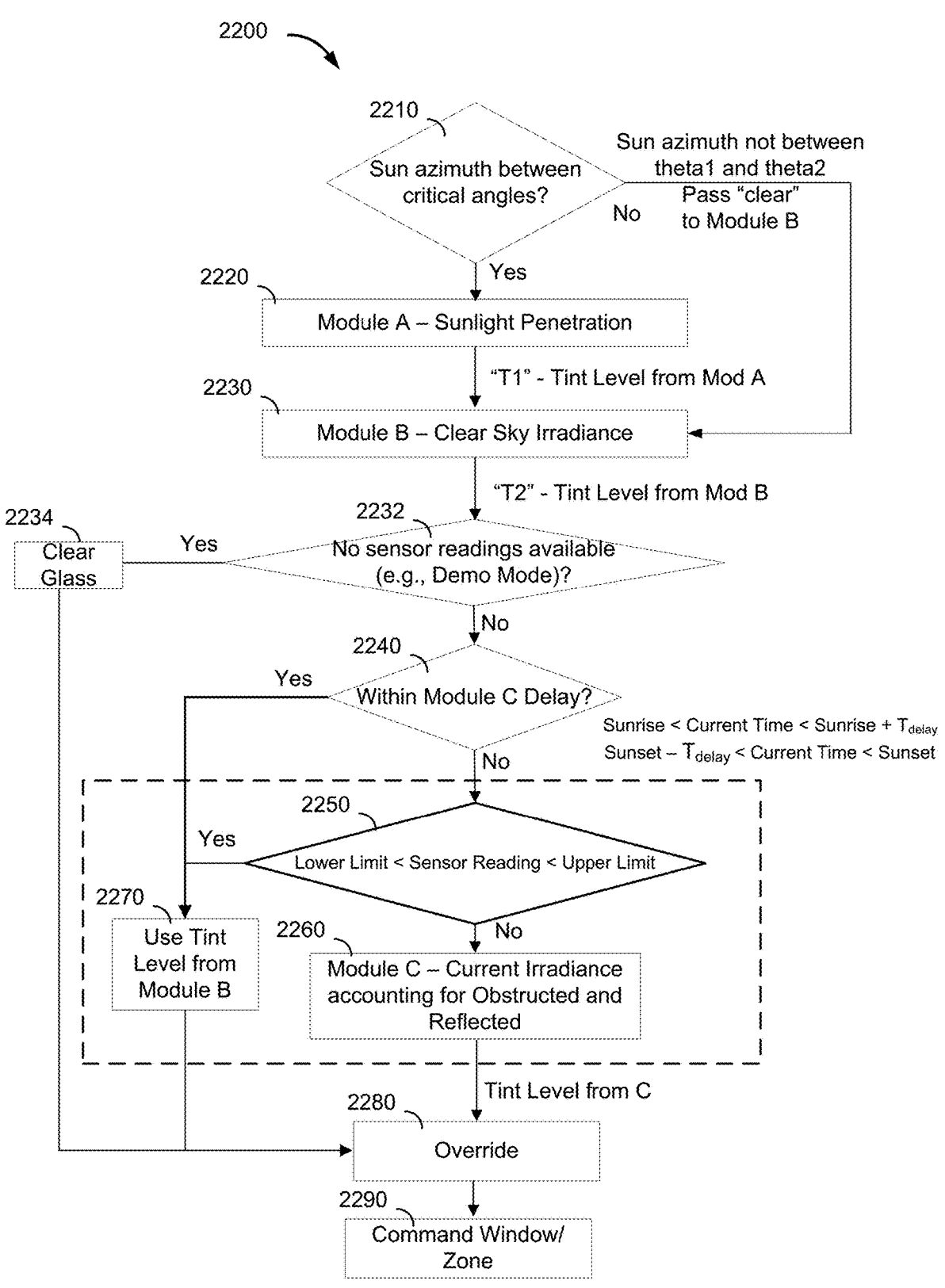
FIG. 17 is a flowchart showing a particular implementation of the control logic shown in FIG. 5, according to an embodiment.

FIG. 17 is a flowchart 2200 showing a particular implementation of the control logic shown in FIG. 5, according to an embodiment. The control logic uses Modules A, B, and C to determine tint levels for a tintable window and sends instructions to transition the window. In this example, the control logic is for a control method that uses a Module C delay. Although the control logic is described in terms of a single tintable window, it would be understood that the control logic can be used to determine the tint level for multiple tintable windows or a zone of one or more tintable windows. When determining the tint level for a zone, a representative tintable window may be used in certain logic operations to determine the tint level and the determined tint level may be implemented at the one or more windows of that zone.

At operation 2210, the control logic determines whether the sun azimuth is between the critical angles of the tintable window at the current time. Although this control method and other control methods are described herein with respect to a single tintable window, it would be understood that these control methods can be used to control multiple tintable windows or a zone of one or more tintable windows.

If it is determined at operation 2210 that the sun azimuth is outside the critical angles at the current time, the control logic bypasses the operations of Module A, passing a "clear" level is passed to Module B. The control logic then uses the operations of Module B to determine and output a tint level based on a clear sky irradiance calculation ("T2").

If it is determined at operation 2210 that the sun azimuth is between the critical angles, the operations of Module A determine and output a tint level ("T1") based on sunlight penetration (operation 2220). Then, the operations of Module B are used (operation 2230) to determine and output a tint level from Module B based on a clear sky irradiance calculation ("T2"), and the control logic proceeds to operation 2232. Then, Module B is used at operation 2230 to determine a tint level from Module B based on a clear sky irradiance calculation ("T2"), and the control logic proceeds to operation 2232. Typically, the operations of Module B increase the tint from the tint level ("T1") output from the operations of Module A.

At operation 2232, the control logic determines whether there are no sensor readings available (e.g., when the tintable window is in demonstration mode). For example, the control logic may determine that sensor readings are not available if the tintable window is a demonstration window or an infill window without a sensor. In another example, the control logic may determine that sensor readings are not available if the tintable window has a sensor, but the sensor is not functioning.

If the control logic determines that the tintable window does not have sensor readings available, the control logic proceeds to set the tint level to clear the glass at operation 2234, and then proceeds to operation 2280 to determine whether there is an override in place. If an override is determined to be in place, the control logic sends a control command at operation 2290 to the voltage source of the tintable window to provide a voltage profile that transitions tint to the override tint level. If no override is in place, the control logic sends a control command at operation 2190 to the voltage source for the tintable window to provide a voltage profile that transitions tint to the tint level to clear the glass.

If, however, the control logic determines at operation 2232 that sensor readings are available, the control logic proceeds to operation 2240. At operation 2240, the control logic determines whether the current time is within the time period of the Module C delay. For example, the Module C delay time period may be defined as a period of time starting at sunrise and lasting a $T_{delay}$ after sunrise. In this example, the control logic determines whether Sunrise<Current Time<Sunrise+$T_{delay1}$. As another example, the Module C delay time period may be defined as a period of time starting at a predefined time before sunset and lasting until sunset. In this example, the control logic determines whether Sunset–$T_{delay2}$<Current Time<Sunset. The control logic calculates the time of sunrise and/or sunset based on an astronomical calculator using the current date. $T_{delay}$ can be, for example, one hour, two hours, three hours, 15 minutes, 20 minutes, 30 minutes, etc. $T_{delay}$ can be set to the transition time of the window.

If it is determined by the control logic at operation 2240 that the current time is within the Module C delay, then the tint level output from Module B determined at operation 2230 is used (2270), Module C is bypassed, and the control logic proceeds to operation 2280 to determine whether there is an override in place. If an override is determined to be in place, the control logic sends a control command at operation 2290 to the voltage source of the tintable window to provide a voltage profile that transitions tint to the override tint level. If no override is in place, the control logic sends a control command at operation 2290 to the voltage source for the tintable window to provide a voltage profile that transitions tint to the tint level determined by Module B at operation 2230.

If an override is determined to be in place, the control logic sends a command at operation 2290 to the voltage source of the window to provide a voltage profile that transitions tint to the override tint level at operation 2290. If it is determined that no override is in place, the control logic sends a control command at operation 2290 to the voltage source for window to provide a voltage profile that transitions tint to the tint level determined by Modules B.

If it is determined by the control logic at operation 2240 that the current time is outside the Module C delay, the control logic determines whether the current sensor reading is between a lower limit (Threshold 2) and an upper limit (Threshold 1) (i.e. Lower Limit (Threshold 2)<Current Sensor Reading<Upper Limit (Threshold 1) at operation 2250.

If the current sensor reading is between the lower limit (Threshold 2) and the upper limit (Threshold 1), the tint level output from Module B is used (operation 2270), Module C is bypassed, and the control logic proceeds to operation 2280 to determine whether there is an override in place. If an override is determined to be in place, the control logic sends a control command at operation 2290 to the voltage source of the tintable window to provide a voltage profile that transitions tint to the override tint level. If no override is in place, the control logic sends a control command at operation 2290 to the voltage source for the tintable window to provide a voltage profile that transitions tint to the tint level determined by Module B at operation 2230.

If the control logic determines at operation 2250 that the current sensor reading is above the upper limit (Threshold 1) or below the lower limit (Threshold 2), then the operations of Module C are implemented (operation 2260) to augment the tint level based on the current sensor reading of irradiance to account for obstructed and/or reflected radiation. Generally, Module C reduces tint from the tint level output from Module A/B since it accounts for obstructed and reflected radiation. Then, the control logic proceeds to operation 2280 to determine whether there is an override in place. If an override is in place, the control method sends a command operation 2290 to the voltage source of the window to provide a voltage profile that transitions tint to the override tint level. If no override is in place, the control method sends a control command operation 2290 to the voltage source for window or zone to provide a voltage profile that transitions tint to the tint level output by Module C at operation 2160.

3. Example of Control Method with Module C Delay and Weather Feed Data

Figure 18:
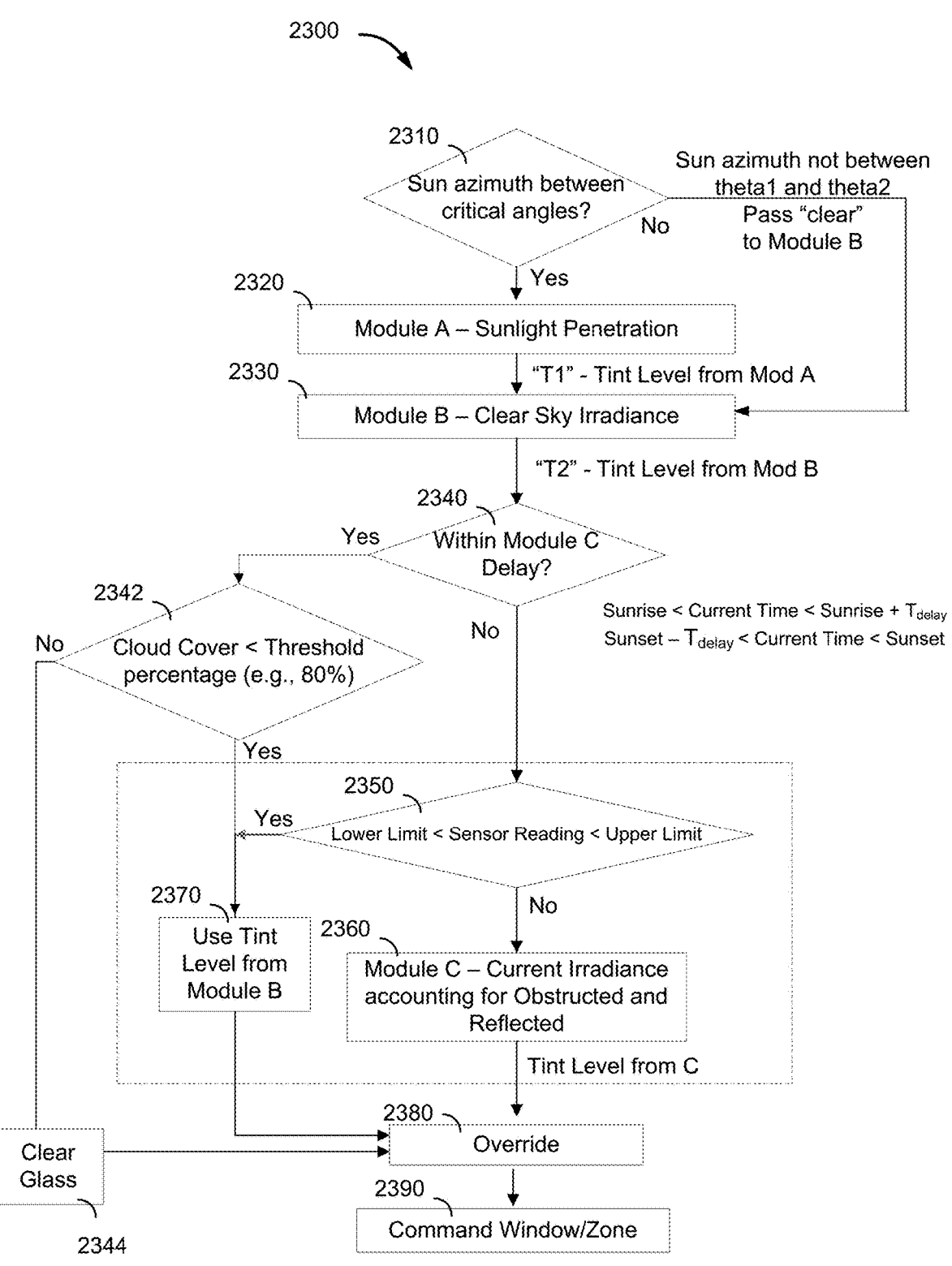
FIG. 18 is a flowchart showing a particular implementation of the control logic shown in FIG. 5, according to an embodiment.

FIG. 18 is a flowchart 2300 showing a particular implementation of control logic shown in FIG. 5, according to an embodiment. The control logic uses Modules A, B, and C to determine tint levels for a tintable window and sends instructions to transition the window. In this example, the control logic is for a control method that uses a Module C delay and weather feed data. Although the control logic is described in terms of a single tintable window, it would be understood that the control logic can be used to determine the tint level for multiple tintable windows or a zone of one or more tintable windows. When determining the tint level for a zone, a representative tintable window may be used in certain logic operations to determine the tint level and the determined tint level may be implemented at the one or more windows of that zone.

At operation 2310, the control logic determines whether the sun azimuth is between the critical angles of the tintable window at the current time. If it is determined at operation 2310 that the sun azimuth is outside the critical angles at the current time, the control logic bypasses the operations of Module A, passing a "clear" level is passed to Module B. The control logic then uses the operations of Module B to determine and output a tint level based on a clear sky irradiance calculation ("T2").

If it is determined at operation 2310 that the sun azimuth is between the critical angles, the operations of Module A determine and output a tint level ("T1") based on sunlight penetration (operation 2320). Then, the operations of Module B are used (operation 2330) to determine and output a tint level from Module B based on a clear sky irradiance calculation ("T2"), and the control logic proceeds to operation 2340. Then, Module B is used at operation 2330 to determine a tint level from Module B based on a clear sky irradiance calculation ("T2"), and the control logic proceeds to operation 2232. Typically, the operations of Module B increase the tint from the tint level ("T1") output from the operations of Module A.

In certain examples such as the one shown in FIGS. 17 and 18, the control logic sets a Module C delay that bypasses the operations of Module C which might reduce tint level for a period of time ($T_{delay}$) at sunrise and/or sunset. At operation 2340, the control logic determines whether the current time is within the time period of the Module C delay period. For example, the Module C delay time period may be defined as a period of time starting at sunrise and lasting a $T_{delay}$ after sunrise. In this example, the control logic determines whether Sunrise<Current Time<Sunrise+$T_{delay1}$. As another example, the Module C delay time period may be defined as a period of time starting at a predefined time before sunset and lasting until sunset. In this example, the control logic determines whether Sunset−$T_{delay2}$<Current Time<Sunset. The control logic calculates the time of sunrise and/or sunset based on an astronomical calculator using the current date. $T_{delay}$ can be, for example, one hour, two hours, three hours, 15 minutes, 20 minutes, 30 minutes, etc. $T_{delay}$ can be set to the transition time of the window.

If it is determined by the control logic at operation 2340 that the current time is within the time period of the Module C delay, then Module C is bypassed, and the control logic uses weather feed data to determine whether there is cloud cover at operation 2342. In one example, the control logic sends a request for weather feed data to one or more weather services over a communication network. In response, the one or more weather services sends weather feed data to the window controller executing the instructions for the control logic. The control logic determines the current cloud over percentage from the weather feed data.

At operation 2342, the control logic determines whether the current cloud cover percentage is less than a threshold percentage level such as, for example, 80%. If the control logic determines that the cloud cover percentage is less than the threshold level, the control logic determines that it is a "not cloudy" condition and proceeds to operation 2370 to use the tint level output from Module B at operation 2330. Then, the control logic proceeds to operation 2380 to determine whether there is an override in place. If an override is determined to be in place, the control logic sends a control command at operation 2390 to the voltage source of the tintable window to provide a voltage profile that transitions tint to the override tint level. If no override is in place, the control logic sends a control command at operation 2390 to the voltage source for the tintable window to provide a voltage profile that transitions tint to the tint level output from Module B at operation 2330.

If, at operation 2342, the control logic determines that the cloud cover percentage is greater than the threshold level, the control logic determines it is a "cloudy" condition and determines sets the tint level to clear the tintable window at operation 2344. Then, the control logic proceeds to operation 2380 to determine whether there is an override in place. If an override is determined to be in place, the control logic sends a control command at operation 2390 to the voltage source of the tintable window to provide a voltage profile that transitions tint to the override tint level. If no override is in place, the control logic sends a control command at operation 2390 to the voltage source for the tintable window to provide a voltage profile that transitions tint to the tint level to clear the tintable window (e.g., transition to a bleached end state).

If it is determined by the control logic at operation 2340 that the current time is outside the Module C delay time period, the control logic determines whether the current sensor reading is between a lower limit (Threshold 2) and an upper limit (Threshold 1) (i.e. Lower Limit (Threshold 2)<Current Sensor Reading<Upper Limit (Threshold 1) at operation 2350. If the current sensor reading is between the lower limit (Threshold 2) and the upper limit (Threshold 1), the tint level output from Module B is used (operation 2370), Module C is bypassed, and the control logic proceeds to operation 2380 to determine whether there is an override in place. If an override is determined to be in place, the control logic sends a control command at operation 2390 to the voltage source of the tintable window to provide a voltage profile that transitions tint to the override tint level. If no override is in place, the control logic sends a control command at operation 2390 to the voltage source for the tintable window to provide a voltage profile that transitions tint to the tint level determined by Module B at operation 2330.

If the control logic determines at operation 2350 that the current sensor reading is above the upper limit (Threshold 1) or below the lower limit (Threshold 2), then the operations of Module C are implemented (operation 2360) to augment the tint level based on the current sensor reading of irradiance to account for obstructed and/or reflected radiation. Generally, Module C reduces tint from the tint level output from Module A/B since it accounts for obstructed and reflected radiation. The control logic then proceeds to operation 2380 to determine whether there is an override in place. If an override is determined to be in place, the control logic sends a control command at operation 2390 to the voltage source of the tintable window to provide a voltage profile that transitions tint to the override tint level. If no override is in place, the control logic sends a control command at operation 2390 to the voltage source of the tintable window to provide a voltage profile that transitions tint to the tint level output by Module C at operation 2360.

4. Example of Control Method with Module C Delay and Weather Feed Data

Figure 19:
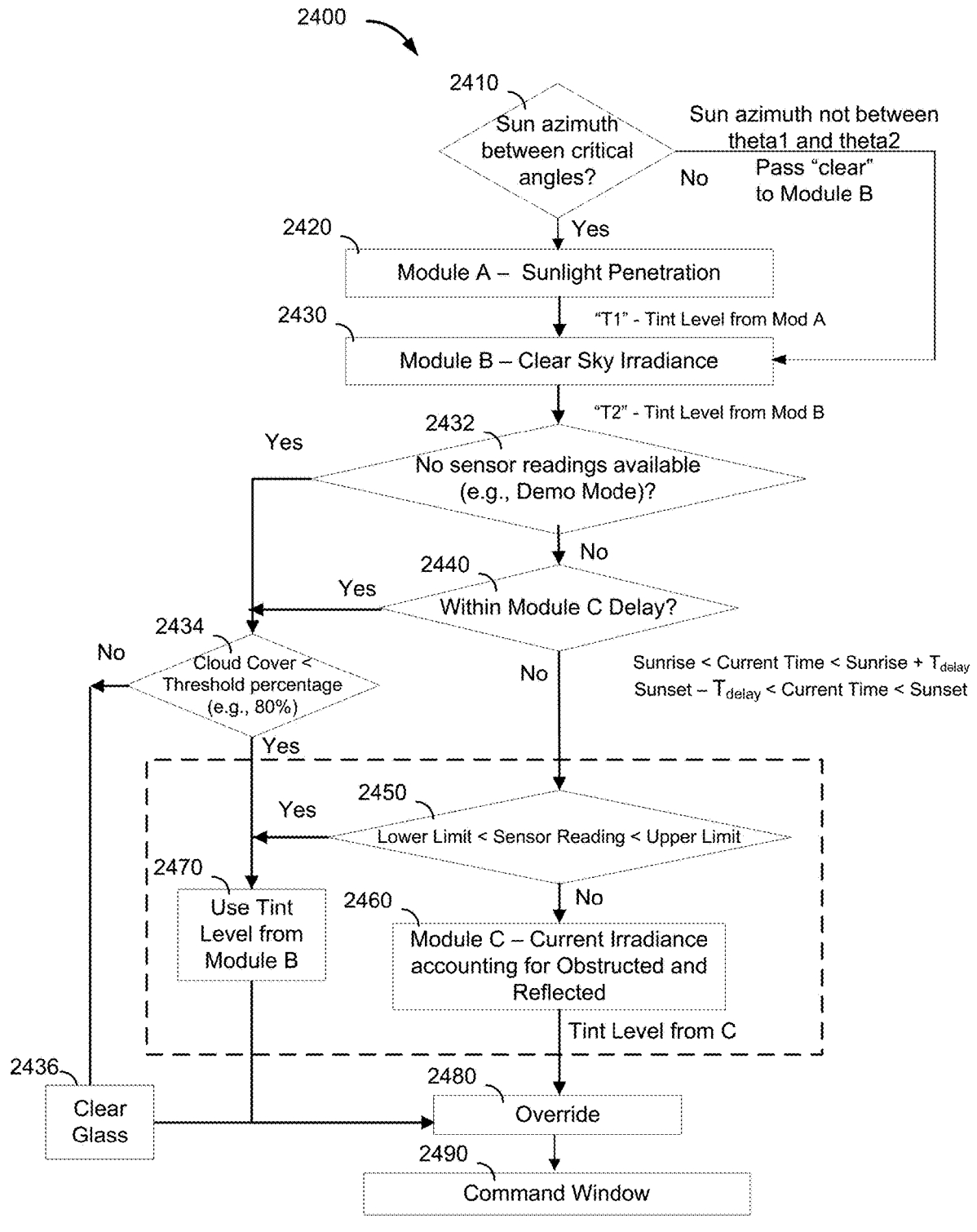
FIG. 19 is a flowchart showing a particular implementation of the control logic shown in FIG. 5, according to an embodiment.

FIG. 19 is a flowchart 2400 showing a particular implementation of control logic shown in FIG. 5, according to an embodiment. The control logic uses Modules A, B, and C to determine tint levels for a tintable window and sends instructions to transition the window. In this example, the control logic is for a control method that uses a Module C delay and weather feed data.

At operation 2410, the control logic determines whether the sun azimuth is between the critical angles of the tintable window at the current time. If it is determined at operation 2410 that the sun azimuth is outside the critical angles at the current time, the control logic bypasses the operations of Module A, passing a "clear" level is passed to Module B. The control logic then uses the operations of Module B to determine and output a tint level based on a clear sky irradiance calculation ("T2") (operation 2430) and the control logic proceeds to operation 2432.

If it is determined at operation 2410 that the sun azimuth is between the critical angles, the operations of Module A are used to determine and output a tint level ("T1") based on sunlight penetration (operation 2420). Then, the operations of Module B are used (operation 2430) to determine and output a tint level from Module B based on a clear sky irradiance calculation ("T2"), and the control logic proceeds to operation 2432. Typically, the operations of Module B increase the tint from the tint level ("T1") output from the operations of Module A.

At operation 2432, the control logic determines whether there are no sensor readings available (e.g., when the tintable window is in demonstration mode). For example, the control logic may determine that sensor readings are not available if the tintable window is a demonstration window or an infill window without a sensor. In another example, the control logic may determine that sensor readings are not available if the tintable window has a sensor, but the sensor is not functioning.

If the control logic determines there are no sensor readings available, the control logic proceeds to operation 2434 to use weather feed data to determine whether there is cloud cover. The control logic determines whether there is cloud cover by determining whether the cloud cover percentage is less than a threshold level such as, for example, 80%. If the control logic determines that the cloud cover percentage is less than the threshold level, the control logic determines that it is a "not cloudy" condition and proceeds to operation 2470 to use the tint level output from Module B at operation 2430. Then, the control logic proceeds to operation 2480 to determine whether there is an override in place. If an override is determined to be in place, the control logic sends a control command at operation 2490 to the voltage source of the tintable window to provide a voltage profile that transitions tint to the override tint level. If no override is in place, the control logic sends a control command at operation 2490 to the voltage source for the tintable window to provide a voltage profile that transitions tint to the tint level output from Module B at operation 2430.

If, at operation 2434, the control logic determines that the cloud cover percentage is greater than the threshold level, the control logic determines it is a "cloudy" condition and determines sets the tint level to clear the tintable window at operation 2436. Then, the control logic proceeds to operation 2480 to determine whether there is an override in place. If an override is determined to be in place, the control logic sends a control command at operation 2490 to the voltage source of the tintable window to provide a voltage profile that transitions tint to the override tint level. If no override is in place, the control logic sends a control command at operation 2490 to the voltage source for the tintable window to provide a voltage profile that transitions tint to the tint level to clear the tintable window (e.g., transition to a bleached end state).

If, however, the control logic determines at operation 2432 that sensor readings are available, the control logic proceeds to operation 2440. At operation 2440, the control logic determines whether the current time is within the Module C delay period. For example, the Module C delay time period may be defined as a period of time starting at sunrise and lasting a $T_{delay}$ after sunrise. In this example, the control logic determines whether Sunrise<Current Time<Sunrise+$T_{delay1}$. As another example, the Module C delay time period may be defined as a period of time starting at a predefined time before sunset and lasting until sunset. In this example, the control logic determines whether Sunset−$T_{delay2}$<Current Time<Sunset. The control logic calculates the time of sunrise and/or sunset based on an astronomical calculator using the current date. $T_{delay}$ can be, for example, one hour, two hours, three hours, 15 minutes, 20 minutes, 30 minutes, etc. $T_{delay}$ can be set to the transition time of the window.

If it is determined at operation 2440 that the current time is within the time period of the Module C delay, then Module C is bypassed, and the control logic proceeds to operation 2434 to use weather feed data to determine whether there is cloud cover. For example, the control logic may send a request for weather feed data to one or more weather services over a communication network. In response, the one or more weather services sends weather feed data to the window controller executing the instructions for the control logic. The control logic determines the current cloud over percentage from the weather feed data.

If it is determined by the control logic at operation 2440 that the current time is outside the Module C delay time period, the control logic determines whether the current sensor reading is between a lower limit (Threshold 2) and an upper limit (Threshold 1) (i.e. Lower Limit (Threshold 2)<Current Sensor Reading<Upper Limit (Threshold 1) at operation 2450. If the current sensor reading is between the lower limit (Threshold 2) and the upper limit (Threshold 1), the tint level output from Module B is used (operation 2470), Module C is bypassed, and the control logic proceeds to operation 2480 to determine whether there is an override in place. If an override is determined to be in place, the control logic sends a control command at operation 2490 to the voltage source of the tintable window to provide a voltage profile that transitions tint to the override tint level. If no override is in place, the control logic sends a control command at operation 2490 to the voltage source for the tintable window to provide a voltage profile that transitions tint to the tint level determined by Module B at operation 2430.

If the control logic determines at operation 2450 that the current sensor reading is above the upper limit (Threshold 1) or below the lower limit (Threshold 2), then the operations of Module C are implemented (operation 2460) to augment the tint level based on the current sensor reading of irradiance to account for obstructed and/or reflected radiation. Generally, Module C reduces tint from the tint level output from Module A/B since it accounts for obstructed and reflected radiation. The control logic then proceeds to operation 2480 to determine whether there is an override in place. If an override is determined to be in place, the control logic sends a control command at operation 2490 to the voltage source of the tintable window to provide a voltage profile that transitions tint to the override tint level. If no override is in place, the control logic sends a control command at operation 2490 to the voltage source of the tintable window to provide a voltage profile that transitions tint to the tint level output by Module C at operation 2460.

5. Example of Control Method with Module C Delay and Weather Feed Data

Figure 20:
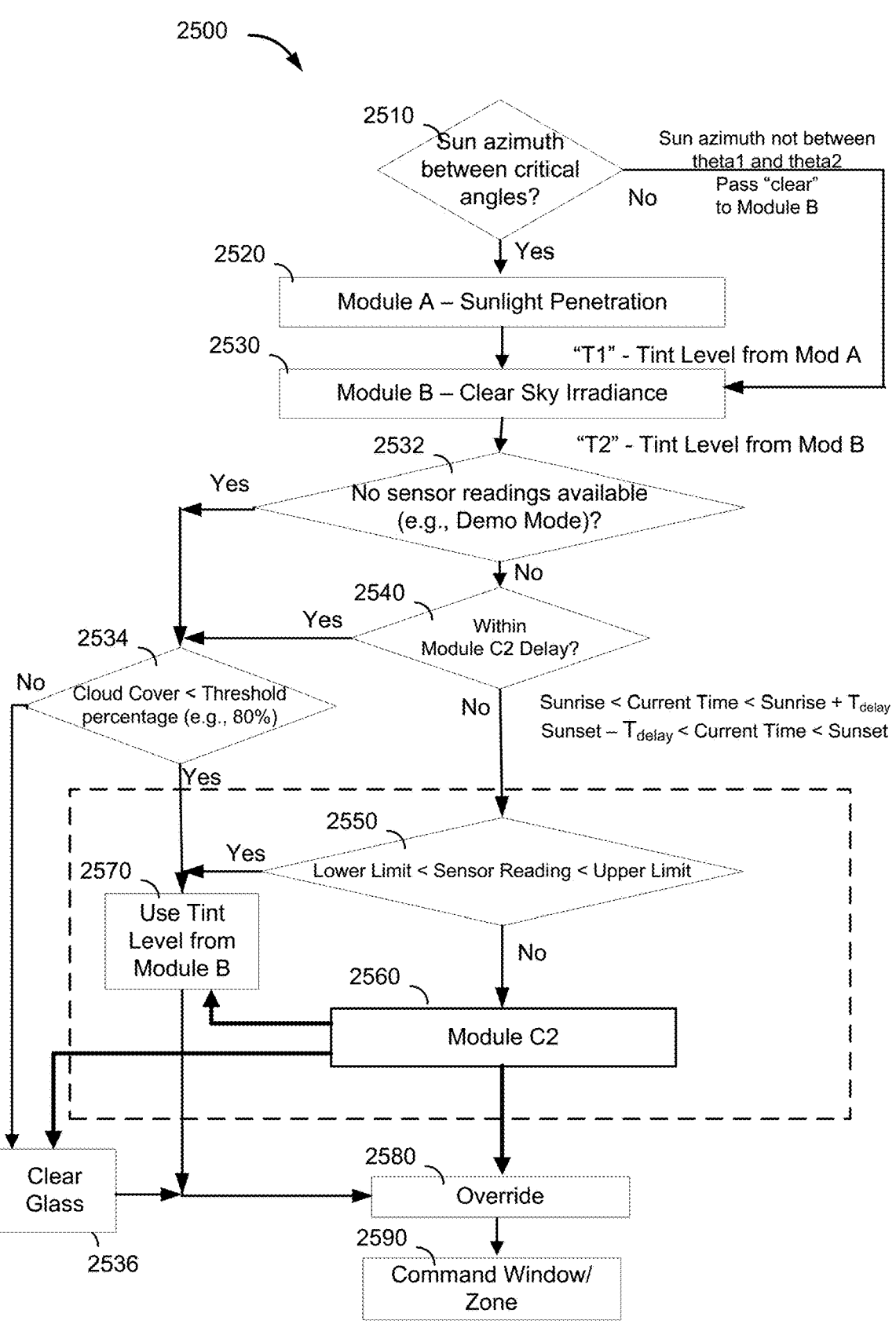
FIG. 20 is a flowchart showing a particular implementation of the control logic shown in FIG. 5, according to an embodiment.
Figure 21:
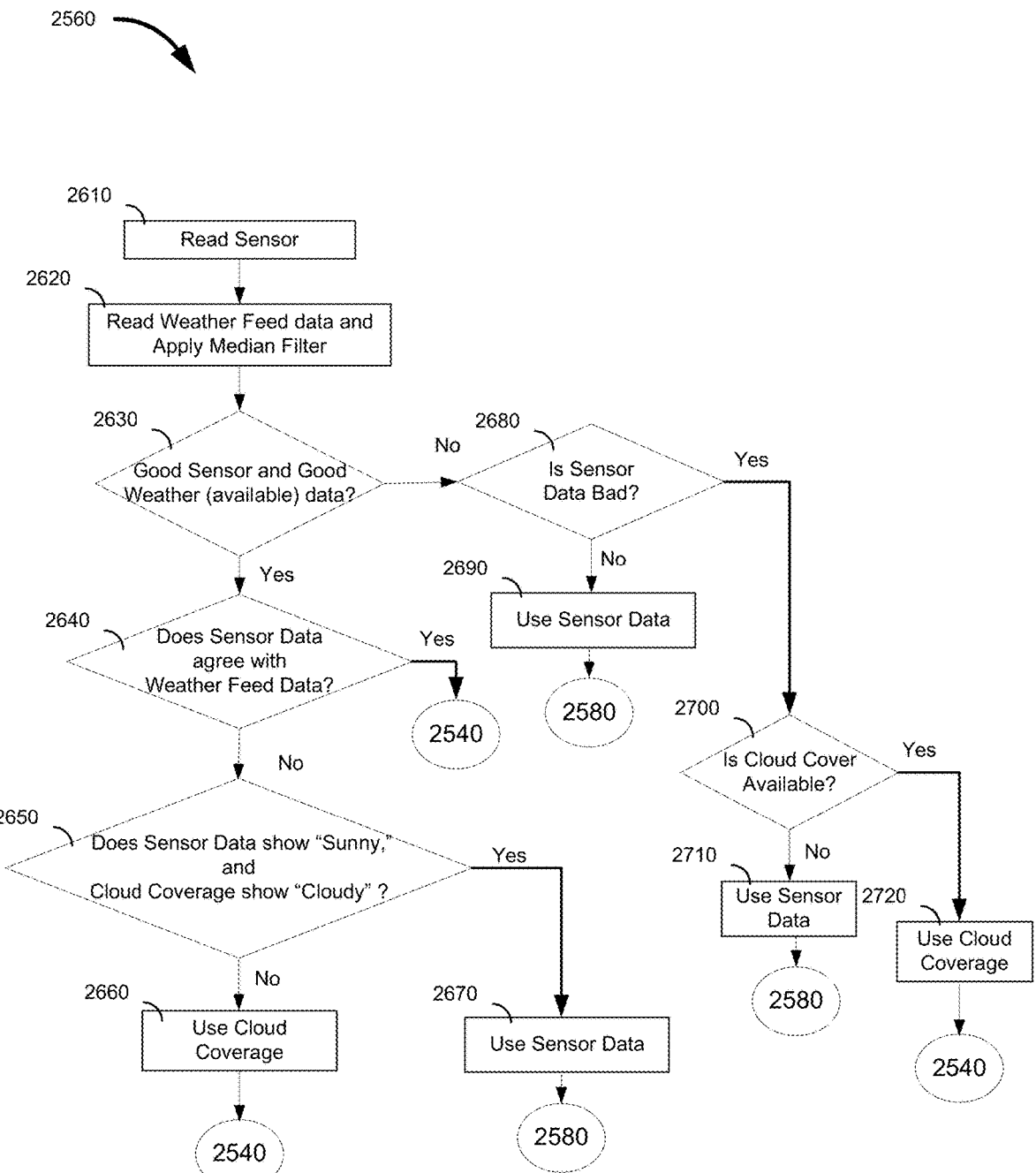
FIG. 21 is a flowchart of the operations within Module C2 of the flowchart in FIG. 20, according to an embodiment.

FIG. 20 is a flowchart 2500 showing a particular implementation of control logic shown in FIG. 5, according to an embodiment. FIG. 21 is a flowchart of the operations within Module C2 2560 of the flowchart shown in FIG. 20, according to an embodiment. The control logic uses Modules A, B, and C2 to determine tint levels for a tintable window and sends instructions to transition the tintable window. In this example, the control logic is for a control method that uses a Module C2 delay and weather feed data. Although the control logic is described in terms of a single tintable window, it would be understood that the control logic can be used to determine the tint level for multiple tintable windows or a zone of one or more tintable windows.

At operation 2510, the control logic determines whether the sun azimuth is between the critical angles of the tintable window at the current time. If it is determined at operation 2510 that the sun azimuth is outside the critical angles at the current time, the control logic bypasses the operations of Module A, passing a "clear" level to Module B. The control logic then uses the operations of Module B to determine and output a tint level based on a clear sky irradiance calculation ("T2") (operation 2530).

If it is determined at operation 2510 that the sun azimuth is between the critical angles, the operations of Module A are used to determine and output a tint level ("T1") based on sunlight penetration (operation 2520). Then, the operations of Module B are used (operation 2530) to determine and output a tint level from Module B based on a clear sky irradiance calculation ("T2"), and the control logic proceeds to operation 2532. Typically, the operations of Module B increase the tint from the tint level ("T1") output from the operations of Module A.

At operation 2532, the control logic determines whether there are no sensor readings available (e.g., when the tintable window is in demonstration mode). For example, the control logic may determine that sensor readings are not available if the tintable window is a demonstration window or an infill window without a sensor. In another example, the control logic may determine that sensor readings are not available if the tintable window has a sensor, but the sensor is not functioning.

If the control logic determines there are no sensor readings available, the control logic proceeds to operation 2534 to use weather feed data to determine whether there is cloud cover. The control logic determines whether there is cloud cover by determining whether the cloud cover percentage is less than a threshold level such as, for example, 80%. If the control logic determines that the cloud cover percentage is less than the threshold level, the control logic determines that it is a "not cloudy" condition and proceeds to operation 2570 to use the tint level output from Module B at operation 2530. Then, the control logic proceeds to operation 2580 to determine whether there is an override in place. If an override is determined to be in place, the control logic sends a control command at operation 2590 to the voltage source of the tintable window to provide a voltage profile that transitions tint to the override tint level. If no override is in place, the control logic sends a control command at operation 2590 to the voltage source for the tintable window to provide a voltage profile that transitions tint to the tint level output from Module B at operation 2530.

If, at operation 2534, the control logic determines that the cloud cover percentage is greater than the threshold level, the control logic determines it is a "cloudy" condition and determines sets the tint level to clear the tintable window at operation 2536. Then, the control logic proceeds to operation 2580 to determine whether there is an override in place. If an override is determined to be in place, the control logic sends a control command at operation 2590 to the voltage source of the tintable window to provide a voltage profile that transitions tint to the override tint level. If no override is in place, the control logic sends a control command at operation 2590 to the voltage source for the tintable window to provide a voltage profile that transitions tint to the tint level to clear the tintable window (e.g., transition to a bleached end state).

If, however, the control logic determines at operation 2532 that sensor readings are available, the control logic proceeds to operation 2540. At operation 2540, the control logic determines whether the current time is within the Module C2 delay by determining whether the current time is within the time delay period. For example, the Module C2 delay time period may be defined as a period of time starting at sunrise and lasting a $T_{delay}$ after sunrise. In this example, the control logic determines whether Sunrise<Current Time<Sunrise+$T_{delay1}$. As another example, the Module C delay time period may be defined as a period of time starting at a predefined time before sunset and lasting until sunset. In this example, the control logic determines whether Sunset–$T_{delay2}$<Current Time<Sunset. The control logic calculates the time of sunrise and/or sunset based on an astronomical calculator using the current date. $T_{delay}$ can be, for example, one hour, two hours, three hours, 15 minutes, 20 minutes, 30 minutes, etc. $T_{delay}$ can be set to the transition time of the window.

If it is determined at operation 2540 that the current time is within the module C delay, then Module C2 is bypassed, and the control logic proceeds to operation 2534 to use weather feed data to determine cloud cover. For example, the control logic may send a request for weather feed data to one or more weather services over a communication network. In response, the one or more weather services sends weather feed data to the window controller executing the instructions for the control logic. The control logic determines the current cloud over percentage from the weather feed data.

If it is determined at operation 2540 that the current time is outside the Module C2 delay time period, the control logic determines whether the current sensor reading is between a lower limit (Threshold 2) and an upper limit (Threshold 1) (i.e. Lower Limit (Threshold 2)<Current Sensor Reading<Upper Limit (Threshold 1) at operation 2550. If the current sensor reading is between the lower limit (Threshold 2) and the upper limit (Threshold 1), the tint level output from Module B is used (operation 2570), Module C2 is bypassed, and the control logic proceeds to operation 2580 to determine whether there is an override in place. If an override is determined to be in place, the control logic sends a control command at operation 2590 to the voltage source of the tintable window to provide a voltage profile that transitions tint to the override tint level. If no override is in place, the control logic sends a control command at operation 2590 to the voltage source for the tintable window to provide a voltage profile that transitions tint to the tint level determined by Module B at operation 2530.

If the control logic determines at operation 2550 that the current sensor reading is above the upper limit (Threshold 1) or below the lower limit (Threshold 2), then the operations of Module C2 are implemented (operation 2560) to augment the tint level based on the current sensor reading of irradiance to account for obstructed and/or reflected radiation.

Generally, Module C2 reduces tint from the tint level output from Module A/B since it accounts for obstructed and reflected radiation. Depending on the operations from Module C2 as described with reference to FIG. 21, the control logic may proceed to operation 2570 to use the tint level output from Module B, to operation 2536 to set a tint level to clear ("clear the glass"), or to operation 2580 to determine whether there is an override in place. If the operations of Module C2 in FIG. 21 indicate that the control logic proceeds to operation 2580 and an override is determined to be in place, the control logic sends a control command at operation 2590 to the voltage source of the tintable window to provide a voltage profile that transitions tint to the override tint level. If the operations of Module C2 in FIG. 21 indicate that the control logic proceeds to operation 2580 and no override is in place, the control logic sends a control command at operation 2590 to the voltage source of the tintable window to provide a voltage profile that transitions tint to the tint level output by Module C2 at operation 2560.

FIG. 21 illustrates the details of the operations of Module C2. At operation 2610, the control logic sends a signal to a sensor to take a reading. In response, the sensor takes a measurement and sends a signal to the window controller with the sensor reading. At operation 2620, the control logic sends a signal with a request for weather feed data to the one or more weather services (or other sources of weather feed data) over a communications network. In response, the one or more weather services send a signal or signals with weather feed data to the window controller. The control logic also applies a median filter to the weather feed data if multiple weather services are used. The medial filter calculates a single value from the multiple values received from multiple weather feed services. In one example, a median filter may determine a mean value from the weather feed data received from multiple weather services. As another example, a median filter may determine an average value of the weather feed data received from multiple weather services.

At operation 2630, the control logic determines whether the sensor readings and the weather feed data are good. In some cases, information is considered good if it is available.

At operation 2640, the control logic determines whether the sensor readings agree with the weather feed data. The control logic may determine what condition the sensor readings are showing and what condition the weather feed data is showing. For example, the control logic may determine that cloud coverage percentage of the weather feed data is showing "cloudy" if it is above a cloud coverage threshold level and "not cloudy/sunny" if it is below a cloud coverage threshold level. In this example, the control logic may also determine that the sensor readings are showing "cloudy" if below a radiation threshold level and "not cloudy/sunny" if above a radiation threshold level. If the control logic determines that the sensor readings agree with the weather feed data by showing the same condition (both "cloudy" or both "not cloudy/sunny"), the control logic proceeds to operation 2540. If the control logic determines that the sensor readings do not agree with the weather feed data, the control logic proceeds to operation 2650.

At operation 2650, the control logic determines whether the sensor readings are showing "sunny" and the cloud coverage percentage is showing "cloudy." If the sensor readings are showing "sunny" and the cloud coverage percentage is showing "cloudy," then the control logic uses sensor readings and not the cloud coverage percentage to determine a tint level and the control logic proceeds to operation 2580. If the sensor readings are showing "cloudy"

and the cloud coverage percentage is showing "sunny," then the control logic uses the cloud coverage percentage to determine a tint level and the control logic proceeds to operation 2540. In this way, the control logic uses the more conservative (darker) tint level for a "sunny" condition if the sensor readings do not agree with the cloud coverage data.

If, at operation 2630, the control logic determines that the sensor readings or the weather feed data is bad, then the control logic proceeds to operation 2680. At operation 2680, the control logic determines whether the sensor readings are bad. If the sensor readings are not bad, then the control logic proceeds to operation 2692 to use the good sensor data, and proceed to operation 2580. The data may be considered bad if it is not available.

If the control logic determines that the sensor readings are bad at operation 2680, the control logic determines whether there is percentage cloud coverage data available. If the percentage cloud coverage data is available, the control logic uses the cloud coverage data at operation 2720 and proceeds to operation 2540. If the percentage cloud coverage data is not available, the control logic uses the sensor readings at operation 2710 and proceeds to operation 2580.

The control methods described herein make tinting decisions based on statistically assessments of macro-oscillations in the photosensor readings and other input data. In one embodiment, tint decisions based by the control method may also take into account micro-oscillations such as by including box cars. An example of control methods that use boxcars can be found in PCT application PCT/US15/29675 titled "CONTROL METHOD FOR TINTABLE WINDOWS," and filed on Nov. 12, 2015, which is hereby incorporated by reference in its entirety.

Modifications, additions, or omissions may be made to any of the above-described control logic, other control logic and their associated control methods (e.g., logic described with respect to FIGS. 5, 6, 7, 10, 14, and 17-21 without departing from the scope of the disclosure. Any of the logic described above may include more, fewer, or other logic components without departing from the scope of the disclosure. Additionally, the operations of the described logic may be performed in any suitable order without departing from the scope of the disclosure.

Also, modifications, additions, or omissions may be made to the above-described systems (e.g., system described with respect to FIG. 12) or components of a system without departing from the scope of the disclosure. The components of the may be integrated or separated according to particular needs. For example, the master network controller 1403 and intermediate network controller 1405 may be integrated into a single window controller. Moreover, the operations of the systems can be performed by more, fewer, or other components. Additionally, operations of the systems may be performed using any suitable logic comprising software, hardware, other logic, or any suitable combination of the preceding.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Python using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. A method of controlling tint of one or more zones of tintable windows in a building, the method comprising:
   determining a tint level for a first zone of one or more tintable windows based at least in part on (i) a calculation of clear sky irradiance; (ii) weather data generated by an external data source; and (iii) an internal space type associated with the first zone of one or more tintable windows; and
   sending a tint command to transition the first zone of one or more tintable windows to the tint level determined.

2. The method of claim 1, wherein the determination of the tint level is based at least in part on the weather data combined with sensor data.

3. The method of claim 2, wherein the sensor data is (A) received from a ring sensor and/or (B) received from a plurality of photosensors.

4. The method of claim 1, wherein the first zone of one or more tintable windows is in a subdivided location of the building.

5. The method of claim 1, wherein the internal space type is associated with occupant comfort in a room of the building.

6. The method of claim 5, further comprising:
   implementing, when no occupant is present in the room, an override such that the internal space type is disengaged from being associated with occupant comfort in the room of the building.

7. The method of claim 1, wherein the first zone of one or more tintable windows includes multiple tintable windows (A) facing at least one direction and/or (B) on at least one side of the building.

8. The method of claim 1, further comprising determining a tint level for a second zone of one or more tintable windows based at least in part on the calculation of clear sky irradiance and the weather data generated by the external data source.

9. The method of claim 8, wherein the second zone of one or more tintable windows is in another subdivided location of the building.

10. The method of claim 8, wherein one or more tintable windows in the first zone faces a first direction and one or more tintable windows in the second zone faces a second direction.

11. The method of claim 10, wherein the first zone and the second zone are associated with the same internal space of the building.

12. The method of claim 1, further comprising:
    determining the clear sky irradiance; and
    augmenting the clear sky irradiance determined with the weather data generated by the external data source.

13. The method of claim 1, wherein the internal space type is associated with occupant comfort.

14. A method of controlling tint of one or more zones of tintable windows in a building, the method comprising:
    determining a tint level for a first zone of one or more tintable windows based at least in part on (i) a calculation of clear sky irradiance and (ii) weather data generated by an external data source; and sending a tint command to transition the first zone of one or more tintable windows to the tint level determined; and
    determining a tint level for a second zone of one or more tintable windows based at least in part on the calculation of clear sky irradiance and the weather data generated by the external data source,
    wherein the first zone of one or more tintable windows faces a first direction and/or is on a first side of the building, and wherein the second zone of one or more tintable windows faces a second direction and/or is on a second side of the building.

15. A system for controlling tint of one or more zones of tintable windows in a building, the system comprises a network configured to:
    operatively couple to the one or more zones of tintable windows;
    transmit a determination of a tint level for a first zone of one or more tintable windows based at least in part on (i) a calculation of clear sky irradiance and (ii) weather data generated by an external data source;
    transmit instructions to transition the first zone of one or more tintable windows to the tint level determined;
    transmit a determination of the clear sky irradiance; and
    transmit a determination of an augmentation of the clear sky irradiance determined with the weather data generated by the external data source.

16. The system of claim 15, wherein the determination of the tint level is based at least in part on the weather data combined with sensor data.

17. The system of claim 16, wherein the sensor data is (A) received from a ring sensor and/or (B) received from a plurality of photosensors.

18. The system of claim 15, wherein the first zone of one or more tintable windows is in a subdivided location of the building.

19. The system of claim 15, wherein the determination of the tint level is further based on an internal space type associated with the first zone of tintable windows, and wherein the internal space type is associated with occupant comfort in a room of the building.

20. The system of claim 15, wherein the first zone of one or more tintable windows includes multiple tintable windows (A) facing at least one direction and/or (B) on at least one side of the building.

21. The system of claim 15, wherein the network is further configured to transmit a determination of a tint level for a second zone of one or more tintable windows based at least in part on the calculation of clear sky irradiance and the weather data generated by the external data source.

22. The system of claim 21, wherein the second zone of one or more tintable windows is in another subdivided location of the building.

23. The system of claim 21, wherein the first zone of one or more tintable windows faces a first direction and the second zone of one or more tintable windows faces a second direction.

24. The system of claim 23, wherein the first zone and the second zone are associated with the same internal space of the building.

25. The system of claim 21, wherein the first zone of one or more tintable windows faces a first direction and/or is on a first side of the building, and wherein the second zone of one or more tintable windows faces a second direction and/or is on a second side of the building.

\*   \*   \*   \*   \*